US010945417B2

(12) United States Patent
Odlin et al.

(10) Patent No.: US 10,945,417 B2
(45) Date of Patent: Mar. 16, 2021

(54) SYSTEMS AND METHODS FOR THE CULTIVATION OF AQUATIC ANIMALS

(71) Applicant: Running Tide Technologies, Inc., Portland, ME (US)

(72) Inventors: Matthew Jordan Odlin, Freeport, ME (US); Nate Merrill, Portland, ME (US); Stephen Zadesky, Portola Valley, CA (US)

(73) Assignee: Running Tide Technologies, Inc., Portland, ME (US)

( * ) Notice: Subject to any disclaimer, the term of this patent is extended or adjusted under 35 U.S.C. 154(b) by 0 days.

(21) Appl. No.: 16/520,890

(22) Filed: Jul. 24, 2019

(65) Prior Publication Data

US 2020/0029536 A1 Jan. 30, 2020

Related U.S. Application Data

(60) Provisional application No. 62/841,509, filed on May 1, 2019, provisional application No. 62/794,048, filed (Continued)

(51) Int. Cl.
*A01K 61/60* (2017.01)
*B63B 35/00* (2020.01)

(52) U.S. Cl.
CPC .............. *A01K 61/60* (2017.01); *B63B 35/00* (2013.01); *B63B 2207/02* (2013.01)

(58) Field of Classification Search
CPC ........ A01K 61/60; A01K 61/75; B63B 35/00; B63B 2207/02
See application file for complete search history.

(56) References Cited

U.S. PATENT DOCUMENTS 2,283,472 A * 5/1942 Tuxhorn ................ A01K 61/60
119/223
3,653,358 A * 4/1972 Fremont ................ A01K 61/60
119/223
(Continued)

FOREIGN PATENT DOCUMENTS

CA 2319746 A1 * 9/2001 ............. A01K 61/60
CA 2354225 A1 * 3/2002 ............. A01K 61/60
(Continued)

OTHER PUBLICATIONS

International Search Report and Written Opinion for International Application no. PCT/US2019/043252, dated Nov. 18, 2019, 12 pages.
(Continued)

*Primary Examiner* — Magdalena Topolski
*Assistant Examiner* — Morgan T Barlow
(74) *Attorney, Agent, or Firm* — Cooley LLP

(57) ABSTRACT

An aquaculture system which has a pen, a control system, a pumping mechanism coupled to the pen, and a set of buoyancy tanks coupled to the pen. The pen can be disposed in a body of water and at least temporarily stores aquatic animals during development. The control system receives electric power from a power source and provides electric power to the pumping mechanism to provide a flow of water through the pen. A portion of the control system is in fluid communication with the set of buoyancy tanks and adjusts a volume of fluid in at least one buoyancy tank to move the pen from a first position in which the pen is partially submerged in the body of water to a second position in which the pen is fully submerged in the body of water.

22 Claims, 31 Drawing Sheets

Related U.S. Application Data on Jan. 18, 2019, provisional application No. 62/702,569, filed on Jul. 24, 2018.

(56) References Cited

U.S. PATENT DOCUMENTS

| | | | | |
|---|---|---|---|---|
| 3,691,994 | A * | 9/1972 | McPherson | A01K 61/60 119/223 |
| 4,084,543 | A * | 4/1978 | Pequegnat | A01K 61/60 119/200 |
| 4,395,970 | A | 8/1983 | Kunkle et al. | |
| 4,872,782 | A * | 10/1989 | Streichenberger | A01K 61/54 405/24 |
| 4,930,444 | A * | 6/1990 | Vasile | A01K 61/60 119/223 |
| 4,982,681 | A * | 1/1991 | Jarlan | B63B 1/041 114/125 |
| 5,095,851 | A * | 3/1992 | Bourg | B63B 35/26 119/223 |
| 5,251,571 | A * | 10/1993 | Willinsky | A01K 61/60 119/215 |
| RE34,971 | E * | 6/1995 | Loverich | A01K 73/12 119/223 |
| 5,438,958 | A * | 8/1995 | Ericsson | A01K 61/54 119/223 |
| 5,628,280 | A * | 5/1997 | Ericsson | A01K 61/54 119/239 |
| 5,970,917 | A * | 10/1999 | Keith, Jr. | A01K 61/70 119/223 |
| 6,024,050 | A | 2/2000 | Rheault | |
| 6,062,170 | A | 5/2000 | Finch et al. | |
| 6,209,474 | B1 * | 4/2001 | Foss | E02B 17/00 206/403 |
| 6,267,079 | B1 * | 7/2001 | Eby | A01K 63/00 119/226 |
| 6,539,894 | B1 | 4/2003 | Byrne et al. | |
| 6,892,672 | B2 * | 5/2005 | Klein | A01K 61/60 119/223 |
| 8,424,491 | B2 | 4/2013 | Page | |
| 9,339,016 | B1 * | 5/2016 | Donovan | A01K 61/54 |
| 2002/0162515 | A1 * | 11/2002 | Boyd | A01K 61/60 119/223 |
| 2003/0094141 | A1 | 5/2003 | Davis | |
| 2006/0033674 | A1 * | 2/2006 | Essig, Jr. | B01D 61/06 343/912 |
| 2006/0096548 | A1 * | 5/2006 | Ytterland | A01K 61/60 119/223 |
| 2008/0110408 | A1 | 5/2008 | Thorvardarson et al. | |
| 2009/0159010 | A1 * | 6/2009 | Spartz | A01K 63/00 119/200 |
| 2010/0018471 | A1 * | 1/2010 | Murdza | A01K 61/54 119/240 |
| 2011/0174232 | A1 * | 7/2011 | Hoie | A01K 61/60 119/223 |
| 2012/0006277 | A1 * | 1/2012 | Troy | A01K 61/65 119/223 |
| 2012/0117850 | A1 * | 5/2012 | Panovic | A01K 74/00 43/4.5 |
| 2013/0255585 | A1 * | 10/2013 | Hamman | A01K 61/54 119/200 |
| 2013/0299040 | A1 * | 11/2013 | Atz | A01K 75/00 140/3 R |
| 2014/0283754 | A1 * | 9/2014 | Maabo | A01K 61/60 119/223 |
| 2015/0272018 | A1 * | 10/2015 | Menard | A01G 31/02 119/223 |
| 2017/0027136 | A1 * | 2/2017 | Newell | A01G 31/02 |
| 2017/0245479 | A1 | 8/2017 | DePaola et al. | |
| 2018/0026579 | A1 * | 1/2018 | Kania | F24S 30/422 136/248 |
| 2018/0242726 | A1 * | 8/2018 | Lindgren | A01K 63/10 |
| 2019/0274289 | A1 * | 9/2019 | Leow | B63B 21/50 |
| 2019/0289832 | A1 * | 9/2019 | DePaola | A01K 61/55 |

FOREIGN PATENT DOCUMENTS

| | | | | |
|---|---|---|---|---|
| CN | 105192047 | B | 7/2017 | |
| DE | 3726988 | A1 * | 2/1989 | A01K 61/10 |
| EP | 0076151 | A2 * | 4/1983 | A01K 61/60 |
| EP | 0146518 | A2 * | 6/1985 | A01K 61/60 |
| EP | 0299900 | A1 * | 1/1989 | A01K 61/60 |
| FR | 2421553 | A1 * | 11/1979 | A01K 61/60 |
| FR | 2440689 | A2 * | 6/1980 | A01K 61/65 |
| FR | 2458216 | A2 * | 1/1981 | A01K 61/60 |
| FR | 2639511 | A1 * | 6/1990 | A01K 61/60 |
| WO | WO-8704319 | A1 * | 7/1987 | A01K 79/00 |
| WO | WO-8808665 | A1 * | 11/1988 | A01K 63/10 |
| WO | WO-9806254 | A1 * | 2/1998 | A01K 61/60 |
| WO | WO 2002/067664 | | 9/2002 | |
| WO | WO 2004/071184 | | 8/2004 | |
| WO | WO-2006121075 | A1 * | 11/2006 | A01K 61/60 |
| WO | WO-2013047061 | A1 * | 4/2013 | A01K 63/10 |
| WO | WO-2014123424 | A1 * | 8/2014 | A01K 61/60 |
| WO | WO 2017/173543 | | 10/2017 | |
| WO | WO 2018/016968 | | 1/2018 | |
| WO | WO-2018169407 | A1 * | 9/2018 | A01K 61/60 |
| WO | WO-2019040787 | A1 * | 2/2019 | A01K 61/55 |

OTHER PUBLICATIONS

National Geographic Society Newsroom, "Oysters Built the East Coast. Now Entrepreneurs are Rebuilding the Oysters," Aug. 11, 2017, 4 pages, [Online], Retrieved from the Internet: <URL: https://blog.nationalgeographic.org/2017/04/11/oysters-built-the-east-coast-now-entrepreneurs-are-rebuilding-the-oysters/>.

Hennig, J. et al., FISH2.0 Investment Insights, "Building Value in the Oyster Industry," Jul. 2017, 1 page, [Online], Retrieved from the Internet: <URL: http://www.fish20.org/images/resources/Fish2.0-OYSTERS-Investor-Insights.pdf>.

Lu, C., "The Different Methods of Growing Oysters," Pangea Shellfish Company, Jul. 3, 2015, 8 pages, [Online], Retrieved from the Internet: <URL: https://www.pangeashellfish.com/blog/the-different-methods-of-growing-oysters>.

Chesapeake Bay Oyster Company, "Upwelling and Upwellers," Feb. 2010, 10 pages, [Online], Retrieved from the Internet: <URL: http://chesbayoysterco.blogspot.com/2010/02/upwelling-and-upwellers.html>.

Chesapeake Bay Oyster Company, "Equipment," 2017, 7 pages, [Online], Retrieved from the Internet: <URL: http://www.bayoyster.com/equipment.html>.

Andersons Neck, LLC DBA Anderson's Neck Oyster Company, "Our Oyster Farming Process," 2019, 4 pages, [Online], Retrieved from the Internet: <URL: https://www.andersonsneck.com/process/>.

Island Creek Oysters, "How Do We Grow Our Oysters?", 2019, 3 pages, [Online], Retrieved from the Internet: <URL: https://www.islandcreekoysters.com/process/>.

\* cited by examiner

SYSTEMS AND METHODS FOR THE CULTIVATION OF AQUATIC ANIMALS

CROSS-REFERENCE TO RELATED APPLICATIONS

This application claims priority to and the benefit of U.S. Provisional Patent Application Ser. No. 62/702,569 entitled, "Aquaculture System for the Cultivation of Aquatic Animals," filed Jul. 24, 2018, the disclosure of which is incorporated herein by reference in its entirety.

This application also claims priority to and the benefit of U.S. Provisional Patent Application Ser. No. 62/794,048 entitled, "Aquaculture System for the Cultivation of Aquatic Animals," filed Jan. 18, 2019, the disclosure of which is incorporated herein by reference in its entirety.

This application also claims priority to and the benefit of U.S. Provisional Patent Application Ser. No. 62/841,509 entitled, "System for the Cultivation of Aquatic Animals," filed May 1, 2019, the disclosure of which is incorporated herein by reference in its entirety.

BACKGROUND

Embodiments described herein relate to an aquaculture system and method to cultivate aquatic animals, for example, animals of the phylum Mollusca, such as but not limited to oysters, clams, mussels, and scallops.

Aquaculture can be a sustainable and environmentally friendly approach to producing protein-rich sources of food. For the cultivation of mollusks, conventional approaches to aquaculture involve placing mollusks onto beds located at the bottom of a body of water. In such approaches, however, the mollusks can be attacked by predators, can be lost due to fluctuating water currents, and/or can be suffocated if buried by mud. Harvesting mollusks using techniques such as dredging can also be time-consuming and labor-intensive. In other approaches, mollusks are grown using a series of enclosures, such as upwelling systems, cages, racks, or bags, suspended in water. While these approaches may provide some protection to the mollusks during development, a single type of enclosure is typically used for only a portion of the development cycle of mollusks. It is common practice to move developing mollusks between multiple enclosures during development, which can be expensive and labor-intensive.

SUMMARY

Embodiments described herein relate generally to an aquaculture system for the cultivation of aquatic animals, for example, animals of the phylum Mollusca. In some embodiments, an aquaculture system includes a pen, a control system, a pumping mechanism, and a set of buoyancy tanks. The pen is configured to be disposed in a body of water and to at least temporarily store aquatic animals during development. The control system is configured to receive electric power from a power source. The pumping mechanism is coupled to the pen and is configured to provide a flow of water through the pen in response to receiving electric power from the control system. The set of buoyancy tanks are coupled to the pen and are configured to place the pen in a desired position in the body of water. A portion of the control system is in fluid communication with the set of buoyancy tanks and is configured to adjust a volume of fluid in at least one buoyancy tank in response to an input to move the pen from a first position in which the pen is partially submerged in the body of water to a second position in which the pen is fully submerged in the body of water.

DETAILED DESCRIPTION

Figure 1:
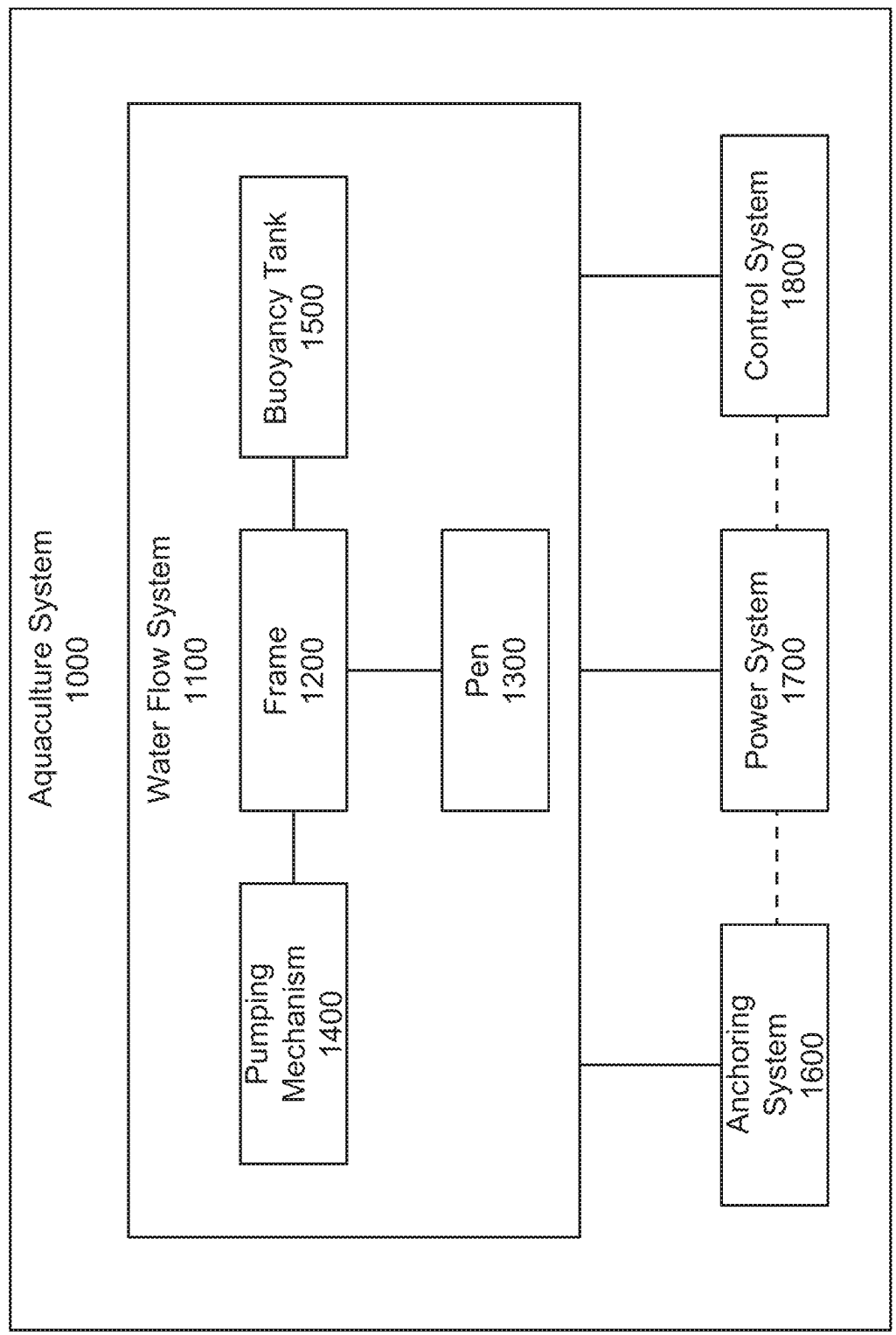
FIG. 1 is a schematic illustration of an aquaculture system, according to an embodiment.

Aquaculture is the farming of various aquatic species including fish, crustaceans, mollusks, aquatic plants, algae, and other organisms. Compared to the farming of livestock, aquaculture can be a more sustainable and environmentally friendly approach to producing protein-rich sources of food. In the aquaculture of aquatic animals, for example, animals of the phylum Mollusca, including but not limited to oysters, clams, mussels, and scallops, cultivation typically starts with larvae attached to a surface (e.g., spat). The spat is placed in an environment where nutrient-rich water flows across the spat, thus feeding the larvae. Over time, the larvae can continue to feed until maturing into an adult mollusk sufficient for harvesting.

One conventional approach to cultivating mollusks involves placing the mollusks on a bed located at the bottom of a body of water where the mollusks can grow naturally, similar to wild mollusks. However, in this approach, mollusks can be vulnerable to predators, can be buried under mud at the bottom of the body of water causing suffocation, and can be moved to deeper waters by water currents, which can all result in the loss of mollusks. Additionally, mollusks grown in this manner are typically harvested by dredging, which can be time consuming, labor intensive, and limited to shallow water environments.

In another approach, mollusks can be grown using a series of enclosures (e.g., upwelling systems, cages, racks, or bags) suspended in a body of water during different stages of mollusk development. The enclosures can provide greater protection from predators and reduce the number of mollusks lost to the environment. For example, an upwelling system, which can be a container with an inlet and an outlet coupled to a pump to facilitate the flow of water, is typically used during the early stages of developing mollusks. Upwelling systems can protect the mollusks and can better control environmental conditions during development. However, once the mollusks grow to a certain size, the mollusks are typically transferred to a larger upwelling system, a cage, a bag, or a rack to facilitate further development. The use of multiple enclosures in this manner can be expensive and labor intensive, particularly since mollusks are transferred between multiple enclosures over the course of development. As a result, this approach is generally restricted near shore, where water conditions (e.g., tidal conditions, wind, and ocean currents) are less severe and thus, the enclosure can be more easily accessed for operation and maintenance.

Therefore, it is desirable for an aquaculture system to have an enclosure that can protect the aquatic animals from predators, contain the aquatic animals to reduce loss to the environment, and can be used during a substantial portion of the development cycle of a mollusk, preferably from spat to a fully matured adult mollusk. An aquaculture system exhibiting these features can simplify the cultivation of aquatic animals by reducing the number of enclosures used, thus reducing cost and labor compared to previous approaches. Additionally, an aquaculture system that is self-contained in this manner does not need to be accessed as frequently. Thus, the aquaculture system can be operated for long periods of time without human intervention. This can allow for the deployment of the aquaculture system in a deep water environment where the quality of water is generally better compared to water near shore due to lower pollution and stronger water circulation, the risk of disease is reduced since aquaculture systems can be separated farther apart, and the greater depths can allow the aquaculture system to be submerged (e.g., fully submerged) during storm conditions to avoid damage to the system.

The present disclosure is thus directed towards aquaculture systems and methods configured to support the cultivation of aquatic animals through a substantial portion of their development cycle. The aquaculture systems can include one or more connected containers to protect and contain the aquatic animals during development. The aquaculture systems can be modular such that the size and number of containers can be changed. The depth of the aquaculture systems can also be controllably adjusted to accommodate various conditions such as growing, drying, and protection during storm conditions. The aquaculture systems can also be deployed in a deep-water environment with power, control, and/or communication systems to facilitate operation of the aquaculture systems without direct human intervention. In particular, the control system can be used to monitor and/or remotely control the aquaculture systems by a human operator.

In some embodiments, an aquaculture system includes a water flow system used to cultivate aquatic animals. The water flow system includes a frame configured to mechanically support various components in the water flow system. A pumping mechanism can be coupled to the frame and used to generate a flow of water through the water flow system. At least one buoyancy tank can be coupled to the frame and can be configured to provide floatation to the water flow system. A pen can be disposed in and/or supported by the frame and configured to store the aquatic animals during development. The aquaculture system also can include a power system configured to supply power to the water flow system and a control system configured to monitor and control the water flow system. An anchoring system can be included and used to restrict a movement of the water flow system, the power system, and/or the control system, in a body of water during operation.

In some embodiments, an aquaculture system includes a pen, a control system, a pumping mechanism, and a set of buoyancy tanks. The pen is configured to be disposed in a body of water and to at least temporarily store aquatic animals during development. The control system is configured to receive electric power from a power source. The pumping mechanism is coupled to the pen and is configured to provide a flow of water through the pen in response to receiving electric power from the control system. The set of buoyancy tanks are coupled to the pen and are configured to place the pen in a desired position in the body of water. A portion of the control system is in fluid communication with the set of buoyancy tanks and is configured to adjust a volume of fluid in at least one buoyancy tank in response to an input to move the pen from a first position in which the pen is partially submerged in the body of water to a second position in which the pen is fully submerged in the body of water.

In some embodiments, an aquaculture system includes a pen, a first buoyancy, a second buoyancy tank, and a control system. The pen is configured to at least temporarily store aquatic animals during development and is configured to be disposed in a body of water such that water is allowed to flow through therethrough. The first buoyancy tank is coupled to the pen on a first side of a longitudinal axis defined by the pen and the second buoyancy tank is coupled to the pen on a second side of the longitudinal axis opposite the first side. The buoyancy tanks are configured to at least temporarily contain a volume of fluid. The control system is in fluid communication with the buoyancy tanks and is configured to adjust a volume of fluid in at least one of the first buoyancy tank or the second buoyancy tank to adjust at least one of an amount of the pen submerged below a surface of the body of water or an orientation of the pen relative to the longitudinal axis.

In some embodiments, an aquaculture system includes a pen that defines a longitudinal axis and that is configured to at least temporarily store aquatic animals. A method of using the aquaculture system includes submerging at least a portion of the pen in a body of water. A flow of electric power is provided to a pumping mechanism of the aquaculture system such that water flows through the pen via an inlet of the pen and the pumping mechanism. A volume of air in a first buoyancy tank coupled to the pen on a first side of the longitudinal axis is increased and a volume of air in a second buoyancy tank coupled to the pen on a second side of the longitudinal axis is decreased. The pen is rotated about the longitudinal axis in response to the increase in the volume of air in the first buoyancy tank and the decrease in the volume of air in the second buoyancy tank.

As used in this specification and in the claims, the singular forms "a," "an," and "the" include plural referents unless the context clearly dictates otherwise. Thus, for example, the term "a member" is intended to mean a single member or a combination of members, "a material" is intended to mean one or more materials or a combination thereof, etc.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the phrase "and/or," should be understood to mean "either or both" of the elements so conjoined (e.g., elements that are conjunctively present in some cases and disjunctively present in other cases). Multiple elements listed with "and/or" should be construed in the same fashion (e.g., "one or more" of the elements so conjoined). Other elements may optionally be present other than the elements specifically identified by the "and/or" clause, whether related or unrelated to those elements specifically identified. Thus, as a non-limiting example, a reference to "A and/or B", when used in conjunction with open-ended language such as "including," "comprising," etc., can refer, in one implementation, to A only (optionally including elements other than B); in another implementation, to B only (optionally including elements other than A); and in yet another implementation, to both A and B (optionally including other elements).

As used herein, the term "or" should be understood to have the same meaning as "and/or" as defined above. For example, when separating items in a list, "or" or "and/or" shall be interpreted as being inclusive (e.g., the inclusion of at least one, but also including more than one) of a number or list of elements, and, optionally, additional unlisted items.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

FIG. 1 is a schematic block diagram of an aquaculture system 1000 for the cultivation of aquatic animals, especially mollusk species, according to an embodiment. The aquaculture system 1000 can include a water flow system 1100, an anchoring system 1600, a power system 1700, and a control system 1800. The water flow system 1100 is configured to incubate the aquatic animals during development. The water flow system 1100 can include a frame 1200 configured to provide structural support and to facilitate assembly of the water flow system 1100. The water flow system 1100 can include a pen 1300 coupled to the frame 1200 to contain and protect the aquatic animals during development. A pumping mechanism 1400 can be coupled to the frame 1200 and used to generate a flow of water across the aquatic animals in the pen 1300. A buoyancy tank 1500 can also be coupled to the frame 1200 and used to float the water flow system 1100 on and/or in a body of water. The anchoring system 1600 can be coupled to the water flow system 1100, the power system 1700, and the control system 1800 to limit drift between the various systems in the aquaculture system 1000. The power system 1700 can be operably coupled to the water flow system 1100 to supply electrical power to various components, such as the pumping mechanism 1400, during operation. The control system 1800 can also be operably coupled to the water flow system 1100 to monitor and control operation of the aquaculture system 1000.

The frame 1200 can be used to mechanically support various components in the water flow system 1100, such as the pen 1300, the pumping mechanism 1400, and the buoyancy tank 1500. The frame 1200 can also have sufficient mechanical strength to withstand tidal waves and ocean currents to increase the operational lifetime of the aquaculture system 1000. In some embodiments, the frame 1200 can be a rigid frame structure formed from any number of struts (e.g., rod-shaped elements). The struts of the frame 1200 can define a three-dimensional shape with an interior cavity. The frame 1200 can have dimensions sufficient to at least partially fit other components (e.g., the pen 1300 or the pumping mechanism 1400) in the cavity. In this manner, the frame 1200 can be used to mechanically support and protect the components disposed in the interior cavity. For example, the frame 1200 can be an assembly of struts forming a substantially rectangular box with struts disposed along the edges of the rectangular box. Additional struts can be disposed along the surface of the rectangular box to increase structural rigidity and/or to support other components.

The struts can include one or more tabs disposed along the length of the strut, which can function as mounting points to couple other components internally (e.g., the pen 1300) and/or externally (e.g., the buoyancy tank 1500) to the frame 1200. The tabs can also be used to couple two or more frames 1200 together. In this manner, the water flow system 1100 can be modular where any number of frames 1200 can be coupled together with each frame 1200 configured to support a particular component in the water flow system 1100. For example, the water flow system 1100 can include a first frame 1200 supporting the pumping mechanism 1400 coupled to a second frame 1200 supporting the pen 1300. If a larger storage capacity is desired, a third frame 1200 supporting another pen 1300 can be coupled to the water flow system 1100.

The struts can be coupled together using various coupling mechanisms including, but not limited to bolt fasteners, welding, brazing, adhesives, or any combination thereof. In some embodiments, a number of struts can be formed from a single component to simplify assembly. For example, a rod can be bent to form an L-shaped strut rather than coupling two separate struts together. The struts can be formed from various metals, plastics, and composites including, but not limited to aluminum, steel, stainless steel, polyethylene, polyvinyl chloride, polycarbonates, poly(methyl methacrylate), fiberglass, carbon fiber, and/or the like. A coating can also be applied to improve the corrosion resistance of the frame 1200 to salt water and/or fresh water. The coating can be various materials including, but not limited to polyurethane, epoxies, polytetrafluoroethylene (Teflon), zinc oxide, copper, and/or the like.

The pen 1300 can be used to contain and enclose the aquatic animals during development. In some embodiments, the pen 1300 can be a substantially enclosed structure (e.g., a trough-like structure) with enclosed sidewalls, a closed bottom surface, and an open top surface. The pen 1300 can be dimensioned and shaped to fit substantially in the interior cavity defined by the frame 1200, as described above. The pen 1300 can include any number of tabs configured to align to corresponding tabs disposed on the frame 1200. The pen 1300 can thus be coupled to the frame 1200 via the tabs using various coupling mechanisms including, but not limited to bolt fasteners, welding, brazing, adhesives, or any combination thereof.

Aquatic animals, for example, from the phylum Mollusca, can be disposed on the bottom surface of the pen 1300 during development. To generate a flow of water across the aquatic animals, the bottom surface can include one or more inlets (not shown) where water is flowed into the pen 1300 from the surrounding body of water. The pen 1300 can also include one or more outlets (not shown) where water can flow out of the pen 1300. In some embodiments, the one or more inlets and/or the one or more outlets can be, for example, any number of openings, perforations, louvers, slots, and/or any other structure or defined void configured to allow flow therethrough. To generate a flow of water, the pumping mechanism 1400 can be coupled to the outlet and configured to generate a pressure difference such that water is continually flowed across the aquatic animals during operation from the inlet to the outlet, corresponding to an upwelling configuration. The water flow system 1100 can also be operated in a downwelling configuration where the flow of water is reversed (e.g., water flows from the outlet to the inlet through the pen 1300). The downwelling configuration can be used to help younger aquatic animals attach to the pen 1300 during initial stages of development.

In some embodiments, the pen 1300 can also include one or more connecting ports (not shown) to allow water to flow between multiple pens 1300 coupled together. In some embodiments, the shape and dimensions of the connecting port and the outlet can be substantially similar in order to facilitate mating between adjacent pens 1300. One or more connecting members (not shown) can be used to securely couple the adjacent pens 1300 together. In some embodiments, the one or more connecting members can be a rigid frame structure with dimensions and a shape similar to the connecting port and/or the outlet. The connecting members can form an enclosed passage between the adjacent pens 1300 where water can flow. The one or more connecting members can include one or more tabs configured to couple to the sidewalls of the pen 1300 using various coupling mechanisms including, but not limited to bolt fasteners, welding, brazing, adhesives, or any combination thereof. In this manner, a single pumping mechanism 1400 can be used to generate a flow of water across multiple pens 1300.

In some embodiments, the pen 1300 can include any number of compartments (not shown) that subdivide the interior space of the pen 1300 into smaller portions of space where aquatic animals can be stored. The compartments can be shaped and dimensioned such that the flow of water within the compartment flows across the aquatic animals along a preferred direction. The compartments can also be used to compensate for possible variations in pressure within the larger interior space of the pen 1300, which can lead to undesirable current flow. Each compartment can include one or more inlets on the bottom surface of the pen 1300, where water is flowed into the compartment and one or more side openings (not shown) where water is flowed out of the compartment. The one or more inlets can have dimensions smaller than the average size of aquatic animals to sufficiently contain the aquatic animals while providing a sufficient flow of water for nourishment. In some embodiments, the one or more inlets can be any number of openings, perforations, louvers, slots, and/or any other structure or defined void configured to allow flow therethrough. In some embodiments, the compartments can be arranged such that a portion of the interior space of the pen 1300 forms a channel (not shown) used to facilitate a flow of water between the compartments and the one or more outlets of the pen 1300. The one or more side openings of each compartment can interface with the walls of the channel such that water from each compartment flows directly into the channel. In some embodiments, the one or more side openings can be any number of openings, perforations, louvers, slots, and/or any other structure or defined void configured to allow flow therethrough.

In some embodiments, the compartments can be configured to grow aquatic animals at different stages of development. For example, smaller compartments can be used for aquatic animals at earlier stages of development. However, as the aquatic animals grow larger, they can be moved into larger compartments in the pen 1300. The one or more inlets in each compartment can be dimensioned such that the water flow varies between compartments based on the development stage of the aquatic animals. For example, the total area of the one or more inlets can be larger in compartments configured for more mature aquatic animals to supply a higher water flow. Additionally, the flow rate of water can be varied between different compartments based on the arrangement of the compartments and the shape and dimensions of the channels between the compartments, which can affect the pressure drop between the inlet of the compartment and the outlet of the pen 1300. In some embodiments, the compartments can be removable from the pen 1300 to improve ease of harvesting, inspection, maintenance, and greater flexibility to configure the water flow system 1100. For example, each compartment can be a substantially enclosed structure with an open top surface, one or more inlets on the bottom surface, and one or more side openings on at least one sidewall. The compartment can be disposed and aligned to corresponding inlets on the bottom surface of the pen 1300.

The pen 1300, and the compartments contained therein, can be formed from various metals, polymers, and/or composite materials including, but not limited to aluminum, steel, stainless steel, polyethylene, polyvinyl chloride, polycarbonates, poly(methyl methacrylate), fiberglass, carbon fiber, and/or the like. The exterior surface of the pen 1300 can be coated with an anti-fouling coating to reduce unwanted growth of aquatic organisms, which can potentially restrict the flow of water through the inlet over time. The anti-fouling coating can be formed from various coatings including, but not limited to, silicone, Teflon, graphite, and/or the like. The materials can be chosen to reduce environmental impact and to avoid contamination of developing aquatic animals in the aquaculture system 1000.

While the water flow system 1100 is described above as including the frame 1200 configured to provide structural support to the pen 1300, in other embodiments, a water flow system need not include a frame. For example, in some embodiments, a water flow system can include a pen that can include an integrated frame and/or that can have a monocoque construction in which one or more exterior walls of the pen provide structural support for the pen.

In some embodiments, the water flow system 1100 can include one or more buoyancy tanks 1500 for floatation. The buoyancy tank(s) 1500 can be, for example, sealed container(s) disposed along the periphery of the water flow system 1100. The one or more buoyancy tanks 1500 can be dimensioned to have a total volume such that if the volume is substantially filled with air at standard or atmospheric temperature and pressure, the resultant buoyant forces applied to the one or more buoyancy tanks 1500 (e.g., by the water in which the water flow system 1100 is disposed) is greater than a force associated with the total weight of the water flow system 1100. In some embodiments, the buoyancy tank 1500 can be configured to float the water flow system 1100 in an environment with substantially pure water (e.g., generally referred to a "fresh water" and/or water with a density of approximately 1000 kg/m$^3$). For salt water environments, the density of salt water is higher than fresh water, thus, buoyant forces applied to the buoyancy tank 1500 will be greater than the buoyant forces of substantially pure water (e.g., fresh water) and/or brackish water (e.g., a mixture of fresh water and salt water). An additional safety margin can be incorporated into the design of the buoyancy tank 1500 to ensure buoyant forces are also sufficient to counteract external forces applied to the water flow system 1100 during operation (e.g., tidal forces, ocean currents, wind, tension from the anchoring system 1600, etc.).

The one or more buoyancy tanks 1500 can be disposed on and/or in the water flow system 1100 such that any resultant torque caused by the buoyant forces on a particular buoyancy tank 1500 is substantially cancelled by a corresponding torque originating from an opposing buoyancy tank 1500. In this manner, the water flow system 1100 can remain in a preferred orientation during operation. For example, the preferred orientation of the water flow system 1100 can be to have the pen 1300 substantially horizontal such that the aquatic animals rest towards the bottom of the pen 1300. In some embodiments, a single buoyancy tank 1500 can be used where the tank is shaped and dimensioned to substantially surround the water flow system 1100. For example, the buoyancy tank 1500 can be a circular or ellipsoidal toroid. The frame 1200, the pumping mechanism 1400, and the pen 1300 can be disposed within the central opening of the toroid. In some embodiments, one or more buoyancy tanks 1500 can be disposed along the periphery of the water flow system 1100. For example, the buoyancy tank 1500 can be a pair of substantially cylindrical tanks disposed on opposing sides of the water flow system 1100. The length of each buoyancy tank 1500 can be comparable to the total length of the one or more frames 1200 in the water flow system 1100. In another example, any number of spheroidal or ellipsoidal shaped buoyancy tanks 1500 can be disposed uniformly along the periphery of the water flow system 1100.

The use of multiple buoyancy tanks 1500 can provide an additional safety margin in the operation of the water flow system 1100. For example, if a buoyancy tank 1500 were to fail due to a leak or rupture, the remaining buoyancy tanks 1500 can still provide sufficient buoyancy to float the water flow system 1100 while maintaining a preferred orientation. In some embodiments, each buoyancy tank 1500 can also include multiple internal compartments that are sealed from adjacent compartments. A leak or rupture in the buoyancy tank 1500 can be localized to a single or a few compartments, thus the integrity of the buoyancy tank 1500 is maintained.

The buoyancy tank 1500 can be coupled to the frame 1200 using various coupling mechanisms including, but not limited to, clamps, bolt fasteners, metal straps, ropes with buckles, and/or the like. For example, one or more ropes can be tied around a portion of the buoyancy tank 1500 and the frame 1200. The one or more ropes can be secured and tightened by a buckle such that sufficient frictional force is applied to constrain the buoyancy tank 1500 to the frame 1200. In another example, one or more ring clamps can be disposed around a portion of the buoyancy tank 1500 and tightened by a bolt fastener or a ratcheting mechanism. The ring clamp can include one or more tabs that can be coupled to the frame 1200 using various coupling mechanisms including, but not limited to bolt fasteners, welding, brazing, adhesives, and/or the like. In some embodiments, the buoyancy tank 1500 can be coupled to a deck (not shown). The deck can be disposed above the buoyancy tank 1500 and to the sides of the pen 1300, providing a platform to support a human operator when interacting with the water flow system 1100.

In some embodiments, the buoyancy tank 1500 can also be used to control the depth of the water flow system 1100. For example, the buoyancy tank 1500 can be coupled to a pump (not shown) configured to pump air, water, and/or any other suitable fluid in and out of the buoyancy tank 1500 via one or more valves disposed on the buoyancy tank 1500. In some embodiments, the pump can be disposed on board the water flow system 1100 and powered by the power system 1700. In other embodiments, the pump can be coupled to and/or a part of the control system 1800. One or more valves can be disposed along the buoyancy tank 1500 such that fluid (e.g., air, water, etc.) can flow into or out of the buoyancy tank 1500 without affecting the stability of the water flow system 1100. For example, the one or more valves can be arranged such that the water flow system 1100 remains substantially horizontal when raised or submerged in the water. In some embodiments, the buoyancy tank 1500 can be coupled to a compressed gas container (not shown) via a valve disposed on or in the buoyancy tank 1500 or disposed on the compressed gas container and/or otherwise included in the water flow system 1100 or the control system 1800. In some instances, the valve can be configured to allow a gas into the buoyancy tank 1500 from the compressed gas container to displace water in the buoyancy tank 1500. A second valve (not shown) can be disposed on or in the buoyancy tank 1500 and configured to allow fluid (e.g., gas and/or liquid) release from the buoyancy tank 1500. In some instances, the second valve can be configured to not allow water to return to the buoyancy tank 1500, creating a partial vacuum within the buoyancy tank 1500. In some instances, the second valve can allow water to return to the buoyancy tank 1500 as gas is released. In some embodiments, the second valve can be a one-way valve that releases the gas out of the buoyancy tank 1500 and the buoyancy tank 1500 can further include a third valve that is configured to open to allow water into the buoyancy tank 1500.

The depth of the water flow system 1100 can thus be dynamically controlled (e.g., by the control system 1800 and/or any other suitable device or system, or combination thereof) to adapt to different operating conditions. For example, the buoyancy tank 1500 can be substantially filled with air to raise the pen 1300 out of the water to dry the aquatic animals for harvesting or for inspection. The buoyancy tank 1500 can be partially filled with water and air such that that the pen 1300 is substantially submerged or at least partially submerged below the water when growing the aquatic animals without affecting the water flow through the pen 1300. In storm conditions or other weather conditions that can damage the water flow system 1100, the buoyancy tank 1500 can be filled with additional water or emptied of gas such that the water flow system 1100 is submerged (e.g., fully submerged) below the surface of the water at a desired depth. The control system 1800 can be coupled to the pump and the buoyancy tank 1500 to facilitate remote control of the depth of the water flow system 1100 by a human operator, control algorithm, artificial intelligence, and/or the like.

In some embodiments, the buoyancy tank 1500 can be a rigid, thin-walled vessel whose shape and dimensions remain substantially unchanged when filled with air or water and can support pressurized fluids. In some embodiments, the buoyancy tank 1500 can be an inflatable tank with deformable walls configured to withstand pressures greater than one atmosphere (atm). Depending on the form factor, the buoyancy tank 1500 can be formed from various metals, polymers, composites, etc., including, but not limited to aluminum, steel, stainless steel, rubber, polyethylene, polyvinyl chloride, polycarbonates, poly(methyl methacrylate), fiberglass, carbon fiber, and/or the like. In some embodiments, the buoyancy tank 1500 can be sealed once filled with air either during manufacture or during deployment.

In some embodiments, one or more valves can be incorporated on the buoyancy tank 1500 to allow water, air, and/or any other suitable fluid to be flowed into or out of the buoyancy tank 1500 during operation. In some embodiments, water can be flowed into the buoyancy tank 1500 in order to reduce buoyancy and water can be flowed out of the buoyancy tank 1500 in order to increase buoyancy. In some embodiments, air can be flowed into the buoyancy tank 1500 to increase buoyancy and air can be flowed out of the buoyancy tank 1500 in order to reduce buoyancy. In some embodiments, water can be flowed into the buoyancy tank 1500 in order to reduce buoyancy and air can be flowed into the buoyancy tank 1500 in order to increase buoyancy. In some embodiments, water can be flowed out of the buoyancy tank 1500 by flowing air into the buoyancy tank 1500 to increase buoyancy. In some embodiments, air can be flowed out of the buoyancy tank 1500 by flowing water into the buoyancy tank 1500 to reduce buoyancy.

In some embodiments, the aquaculture system 1000 can include a water pump (e.g., pumping mechanism 1400) configured to flow water into and/or out of the buoyancy tank 1500. In some embodiments, the aquaculture system 1000 can include a compressor or other pneumatic pumping device and a compressed air tank such that air from an external source or from the atmosphere (when the aquaculture system 1000 is not submerged) can be flowed into the compressed air tank for use later to displace water in the buoyancy tank 1500. In other embodiments, the aquaculture system 1000 can be configured to adjust and/or control an amount of buoyancy (e.g., float) of the buoyancy tank 1500 using only air. For example, in some embodiments, a volume of air contained in the buoyancy tank 1500 can be increased to increase buoyancy of the buoyancy thank 1500 or decreased to decrease buoyancy of the buoyancy tank 1500.

As described above, in some embodiments, the water flow system 1100 can include multiple buoyancy tanks 1500 with at least a first buoyancy tank 1500 coupled to the frame 1200 (or pen 1300) on a first side of the pen 1300 and a second buoyancy tank 1500 coupled to the frame (or pen 1300) on a second side of the pen 1300 opposite the first side. In some instances, the arrangement of the first and second buoyancy tanks 1500 can be such that the first and second buoyancy tanks 1500 are substantially parallel to and disposed on opposite sides of a longitudinal axis of the pen 1300 and/or the frame 1200. In such embodiments, in addition to controlling a depth or amount of floatation of the water flow system 1100, a volume of fluid (air, water, and/or the like) contained in the first and second buoyancy tanks can be controlled to rotate at least the pen 1300 about the longitudinal axis, thereby changing an orientation of at least the pen 1300, as described in further detail herein.

The pumping mechanism 1400 can be used to generate a flow of water through the water flow system 1100 in order to continuously replenish nutrient-rich water for the developing aquatic animals. Based on the dimensions and geometry of the pen 1300, the pumping mechanism 1400 can be configured to generate a pressure differential such that the flow rate of water in the pen 1300 results in improved growth rates for a majority of aquatic animals in the pen 1300. In some instances, a desired flow rate of water into and/or through one or more of the pens 1300 can be, for example, about 1 gallon per minute (gpm), about 2 gpm, about 3 gpm, about 4 gpm, about 5 gpm, about 6 gpm, about 7 gpm, about 8 gpm, about 9 gpm, about 10 gpm, about 11 gpm, about 12 gpm, about 13 gpm, about 14 gpm, about 15 gpm, about 16 gpm, about 17 gpm, about 18 gpm, about 19 gpm, about 20 gpm, about 21 gpm, about 22 gpm, about 23 gpm, about 24 gpm, about 25 gpm, about 26 gpm, about 27 gpm, about 28 gpm, about 29 gpm, and/or about 30 gpm, and/or any suitable fraction therebetween. For example, in some instances, it may be desirable to allow a flow of water into and/or through one or more of the pens at a flow rate of about 20 gpm. In still other instances, it may be desirable to have a flow rate that is less than 1 gpm or greater than 30 gpm.

The pumping mechanism 1400 can be various types of pumps including, but not limited to rotary pumps, reciprocating pumps, paddle wheel systems, and/or the like. The pumping mechanism 1400 can be operably coupled to the power system 1700 to receive electrical power to drive the pump. In some embodiments, the pumping mechanism 1400 can receive electrical power by a cable (not shown) operably coupled to the pumping mechanism 1400 at one end and the power system 1700 at another end.

The pumping mechanism 1400 can be disposed substantially inside a housing for protection from the surrounding environment. As described above, the frame 1200 can be configured to have struts with tabs arranged to couple to the pumping mechanism 1400 to facilitate ease of assembly. In some embodiments, a portion of the pumping mechanism 1400 can be submerged into the water with the remaining portion extending beyond the boundaries of the frame 1200. For example, the pumping mechanism 1400 can be a paddle wheel system where one or more paddle wheel blades are disposed below the surface of the water. The motor, axle, and the remainder of the paddle wheel blades can be disposed above the surface of the water.

In some embodiments, the pumping mechanism 1400 can be configured to transition between two or more operating states based on a flow of electric power and/or one or more control signals received from the control system 1800. For example, in some embodiments, the pumping mechanism 1400 can have a first operating state or a first configuration in which the pumping mechanism 1400 generates a pressure differential that is operable to draw a flow of water into the pen 1300 through the one or more inlets thereof, through at least a portion of the pen 1300, and out of the pen 1300 via the pumping mechanism 1400 and/or a portion of the pen 1300 adjacent to and/or otherwise housing the pumping mechanism 1400. In other words, the pumping mechanism 1400 can be configured to draw or pull a flow of water into and through the pen 1300 when in the first operating state and/or configuration. In some embodiments, the pumping mechanism 1400 can have a second operating state or second configuration in which the pumping mechanism 1400 generates a pressure differential that is operable to draw a flow of water into the pen 1300 via the pumping mechanism 1400, through at least a portion of the pen 1300, and out of the pen 1300 via the one or more inlets thereof. In other words, the pumping mechanism 1400 can be configured to push or urge a flow of water into and through the pen 1300 when in the second operating state and/or configuration.

In some embodiments, the pumping mechanism 1400 can also have a third operating state and/or third configuration in which the pumping mechanism 1400 is in a substantially "powered off" configuration. In other words, the third operating state and/or third configuration can be associated with the pumping mechanism 1400 being turned off and/or otherwise not drawing or pushing water into the pen 1300. In some embodiments, the power system 1700 and/or any other suitable portion of the aquaculture system 1000 can be configured to withhold a flow of electric power otherwise provided to the pumping mechanism 1400 to place the pumping mechanism in the third operating state and/or configuration. For example, in some embodiments, it may be desirable to place the pumping mechanism 1400 in the third operating state and/or configuration when a natural current of the body of water provides sufficient flow of water into and/or through the pen 1300.

The aquaculture system 1000 can include one or more anchoring systems 1600 to moor the water flow system 1100, the power system 1700, and the control system 1800 such that these various systems are kept in close proximity to one another during operation. Multiple anchoring systems 1600 can be coupled to the periphery of the water flow system 1100, the power system 1700, or the control system 1800 to constrain the motion of these systems in a stable manner. For example, an anchoring system 1600 can be disposed on and/or coupled to a front portion and a rear portion of water flow system 1100 to limit undesirable rotation and/or other movement of the water flow system 1100 during operation.

In some embodiments, the anchoring system 1600 can include an anchor deployed to rest on the bottom of a body of water (e.g., a relatively shallow body of water). Any suitable form of anchor may be used, including Danforth, Fluke, spade, delta, claw, plow, helical, mushroom, and/or the like. In some embodiments, the anchor can be and/or can include an auger, block-based underwater mooring, weighted mooring, and/or any other suitable approach to provide an underwater mooring attachment point. The anchor can be directly tethered to one or more systems in the aquaculture system 1000 using a rope, a chain, a cable, or a combination thereof. For deeper waters, however, the use of longer ropes or chain can lead to excessive drift between the one or more systems in the aquaculture system 1000. In some such embodiments, a mooring buoy can instead be coupled to the anchor, which can then serve as an anchoring point for the one or more systems in the aquaculture system 1000. In this manner, shorter ropes or chains can be used to anchor the systems in the aquaculture system 1000 to the mooring buoy, thus limiting the distance the systems can drift from each other.

In some embodiments, the aquaculture system 1000 can be configured to operate near shore. The anchoring system 1600 can thus be a land-based feature used for mooring including, but not limited to a quay, a wharf, a jetty, a pier, and/or the like. For deep-water environments (e.g., an ocean), the use of a permanent fixture to secure the aquaculture system 1000 may not be possible. In these environments, the anchoring system 1600 can be a floating buoy, which can serve as an anchoring point for one or more systems in the aquaculture system 1000. Although the buoy is not fixed in location, the aquaculture system 1000 can collectively drift together in deep waters by securing the various systems in the aquaculture system 1000 to the buoy. In some embodiments, the various systems in the aquaculture system 1000 can be directly coupled together using ropes or chains to limit drift between the various systems. A drogue can also be coupled to the buoy or the various systems in the aquaculture system 1000 to reduce the amount drift that occurs during operation. In some embodiments, the buoy can be a spar type buoy, the spar type buoy having a unique shape such that hydrostatic and hydrodynamic interactions of the buoy with the ocean or other waterway are decoupled enough so that extreme weather or ocean conditions do not induce extreme buoy motions. In some embodiments, at least one of the buoys coupled to the aquaculture system 1000 can be a spar type buoy. In some embodiments, the anchoring system 1600 can include a propulsion device configured to change and/or maintain a position of the aquaculture system 1000. In some embodiments, the propulsion device can include a rotatable propeller or water jet dimensioned and configured to provide properly directed and sufficiently powerful hydraulic thrust such that, on demand or in response to a change in position, the propulsion device can be engaged to reposition the aquaculture system 1000.

The power system 1700 can supply electrical power to various components in the aquaculture system 1000, such as the pumping mechanism 1400, control system 1800, etc. In some embodiments, the power system 1700 can be mounted on or to a portion of the water flow system 1100. In other embodiments, the power system 1700 can be physically separate from the water flow system 1100. For example, in some embodiments, at least a portion of the power system 1700 can be included in or mounted to the spar type buoy and/or any other suitable portion of the anchoring system 1600. In order to supply power, a cable (not shown) can be used to connect the power system 1700 to the water flow system 1100. The cable can include multiple electrical lines to supply power independently to various components in the water flow system 1100. For example, the power system 1700 can be configured to supply power continuously to the pumping mechanism 1400 and periodically to pumps coupled to one or more buoyancy tanks 1500.

In some embodiments, the power system 1700 can be disposed inside or at least partially inside a buoy that floats on water near the water flow system 1100. The cable connecting the power system 1700 to the water flow system 1100 can be sufficiently compliant to reduce tensile forces that can be applied to either the water flow system 1100 and/or the power system 1700. The power system 1700 can include and/or can be coupled to at least a portion of the anchoring system 1600, as described above. The power system 1700 can thus operate in deep water environments (e.g., the ocean). In another example, the power system 1700 can be located on land near a body of water. A cable can again be used to connect the power system 1700 to the water flow system 1100 deployed in the body of water. This configuration can be used, for example, for a power system 1700 that includes a power source that needs to be periodically refueled such as a generator or the like.

The power system 1700 can be various types of power generation systems including, but not limited to, solar panels, wind turbines, tidal generators, gas generators, and/or hybrid power systems based on combinations thereof. In some embodiments, the power system 1700 can be used to power any suitable portion of the water flow system 1100, any suitable number of water flow systems 1100, and/or any suitable number of aquaculture systems 1000. For example, power can be distributed from the power system 1700 using multiple cables that each power a separate water flow system 1100 in the aquaculture system 1000. The power system 1700 can be configured to independently control the power supplied to each water flow system 1100. For example, a particular water flow system 1100 can be shut down during inspection while the remaining water flow systems 1100 remain operational. In some embodiments, the power system 1700 can be included in and/or housed together with the control system 1800. For example, in some embodiments, the power system 1700 or at least a portion thereof and the control system 1800 or at least a portion thereof can each be disposed in or on a buoy such as the spar type buoy described above.

The control system 1800 can be used to and/or otherwise configured to monitor and control the aquaculture system 1000 locally and/or remotely. In some embodiments, the control system 1800 can be configured to monitor and/or control the aquaculture system 1000 via a control algorithm, an artificial intelligence algorithm or system, and/or a human operator. For example, in some instances, a user, operator, and/or administrator of the aquaculture system 1000 can provide an operational command to the control system 1800 from a remote location by sending a signal via a remote electronic device, a remote controller, a personal computer, a workstation, a mobile device, a tablet, a wearable electronic device, and/or any other suitable compute device. The signal can be indicative of the operational command to the control system 1800 and/or any other portion of the aquaculture system 1000. In other instances, the control system 1800 can be configured to monitor and/or control the aquaculture system 1000 without user or operator input or manipulation.

In some embodiments, the control system 1800 can include at least a portion of the power system 1700 and/or any other suitable portion of the aquaculture system 1000. In some embodiments, the control system 1800 and/or a portion of the control system 1800 can be mounted on the spar type buoy included in the anchoring system 1600 because of the increased stability of this type of buoy relative to conventional disk-type buoys. In other embodiments, the control system 1800 and/or a portion of the control system 1800 can be mounted to any suitable type of buoy and/or to any suitable portion of the water flow system 1100.

The control system 1800 can include, for example, a controller, a compute device, an electronic device, and/or any other suitable electronic or electromechanical control system. For example, in some embodiments, the control system 1800 can include an electronic compute device configured to execute and/or perform one or more processes associated with controlling the aquaculture system 1000. In some embodiments, the electronic compute device can be, for example, a computer or compute device or system such as a single board computer, a stackable computer system (e.g., a PC/104 stack), a personal computer (PC), a server device, a workstation, and/or the like. In some embodiments, the electronic device can include at least a memory, a processor, and a network interface. For example, in some embodiments, the memory can be, for example, a random access memory (RAM), a memory buffer, a hard drive, a read-only memory (ROM), an erasable programmable read-only memory (EPROM), a flash memory, and/or the like. The processor can be any suitable processing device configured to run or execute a set of instructions or code. For example, the processor can be a general purpose processor, a central processing unit (CPU), an accelerated processing unit (APU), a graphics processor unit (GPU), an Application Specific Integrated Circuit (ASIC), a field programmable gate array (FPGA), and/or the like. The network interface can be, for example, a network interface card and/or the like that can include at least an Ethernet port, a wireless radio (e.g., a WiFi® radio, a Bluetooth® radio, etc.), a high frequency radio, a satellite communication interface, and/or the like. As such the processor can be configured to run or execute a set of instructions or code stored in the memory associated with controlling one or more portions of the aquaculture system 1000 and/or communicating with one or more portion of the aquaculture system 1000 and/or any suitable remote electronic device via the network interface and/or the like. In addition, in some embodiments, the control system 1800 can include a user interface such as a display, one or more peripheral devices, and/or any other suitable user interface, thereby allowing a human operator to interact with the control system 1800.

In some implementations, the control system 1800 can include at least a high-bandwidth wireless networking system having any suitable components (e.g., a PC104 stack, a wireless networking card and antenna, an acoustic modem card and transducer), other peripheral instrumentation, a portion of the power system 1700 (e.g., a main battery, a solar power system, etc.), and/or the like. For example, in implementations in which the aquaculture system 1000 is deployed near shore, the control system 1800 can use and/or can include conventional antennas used for cellular (e.g., via any suitable cellular network or combination of cellular networks such as a 2G, 3G, 4G/LTE, 5G, and/or other network) or Wi-Fi receivers and transmitters. In implementations in which the aquaculture system 1000 is deployed in remote, deep-water environments, high frequency radio or satellite communication systems can be used.

In some embodiments, the aquaculture system 1000 (e.g., the control system 1800) can include and/or can implement a global positioning system (GPS) device to enable an operator, a system administrator, a control algorithm, an artificial intelligence procedure or algorithm, and/or the like to track the location of the aquaculture system 1000 substantially in real-time. In some embodiments, the control system 1800 can receive data from the GPS device and can determine a position of the aquaculture system 1000 and/or can otherwise relay the data to the operator or control algorithm. In some embodiments, the control system 1800 can be operably connected to a propulsion device (e.g., coupled to the anchoring system 1600, spar type buoy, and/or the like, as described above) such that the control system 1800 can provide a signal or flow of electrical power operable to cause the propulsion device to reposition the aquaculture system 1000 in response to the control system 1800 determining that the aquaculture system 1000 has moved into an undesirable position (e.g., based at least in part on the GPS data). In some embodiments, the control system 1800 can provide a signal or flow of electrical power operable to cause the propulsion device to move the aquaculture system 1000 in response to a local or remote instruction from the operator or user of the aquaculture system 1000.

In some embodiments, the control system 1800 can provide and/or can perform status checks on various systems including, but not limited to the depth of the water flow system 1100, the air pressure in the buoyancy tank 1500, the pumping rate and/or operational state of the pumping mechanism 1400, environmental conditions (e.g., water nutrient levels, water temperature, water pH, water salinity, etc.), mollusk development characteristics, local weather conditions, and/or the repositioning rate when the propulsion device is activated. In some instances, a human operator can provide an input or command to the control system 1800 indicative of an instruction to control one or more portions of the aquaculture system 1000 such as, for example, adjusting the depth of the water flow system 1100 using the buoyancy tank 1500 or adjusting the water flow rate using the pumping mechanism 1400. The cable used to supply power to the water flow system 1100 can also be used to transfer commands or sensory data between the control system 1800 and the water flow system 1100. In some embodiments, the control system 1800 can be housed together with the power system 1700 (e.g., in the spar type buoy of the anchoring system 1600 and/or the like) to reduce the number of physical systems deployed in the aquaculture system 1000.

In some embodiments, components of the aquaculture system 1000, such as the frame 1200, the pen 1300, or the entire water flow system 1100 can be rotated from a first orientation to a second orientation during use, for example without stopping the flow of water to the pen 1300 (e.g., with or without changing an operating state of the pumping mechanism 1400). For example, in some embodiments, the frame 1200, the pen 1300, and/or the entire water flow system 1100 can be rotated about a longitudinal axis defined by at least one of the frame 1200 and/or the pen 1300. In some instances, it may be desirable, for example, to rotate at least the pen 1300 by 180° about the longitudinal axis, thereby "flipping" the pen 1300. In some embodiments, the pen 1300 can be considered upright when in a first orientation and can be flipped 180° about the longitudinal axis to be upside down in a second orientation. In some embodiments, the water flow system 1100 can include a motor or other mechanical drive (not shown) configured and dimensioned to cause the components of the aquaculture system 1000 to move from the first orientation to the second orientation. In some embodiments, the motor or other mechanical drive can be attached to the frame 1200 and configured to reorient the pen 1300 with respect to the frame 1200. In some embodiments, the motor or other mechanical drive can be attached to the anchoring system 1600 and configured to reorient the water flow system 1100, including the frame 1200, the pen 1300, the pumping mechanism 1400, and/or the buoyancy tank 1500, with respect to the anchoring system 1600. In other embodiments, at least the pen 1300 can be rotated about the longitudinal axis in response to a change in a volume of fluid (e.g., air, water, etc.) in the buoyancy tanks 1500, as described in further detail herein with reference to specific embodiments.

In some embodiments, it may be desirable to change an orientation of at least the pen 1300 during various developmental stages of the aquatic animals disposed therein. In some instances, the rotation of at least the pen 1300 can result in and/or correspond to a reversal of water flow through at least a portion of the pen 1300. For example, in some instances, it may be desirable for later developmental stages of the aquatic animals to place the water flow system 1100 in a downwelling configuration, in which at least the pen 1300 is in the second orientation and/or the pumping mechanism 1400 is in the second operating state (described above) instead of an upwelling configuration, in which at least the pen 1300 is in the first orientation and/or the pumping mechanism 1400 is in the first operating state (described above).

In some embodiments, reorientation of components of the aquaculture system 1000 can be accomplished when one or more of the buoyancy tanks 1500 are filled with water while the remaining buoyancy tanks 1500 are filled with air or a gas. In some instances, this can cause a buoyancy differential laterally across the aquaculture system 1000 or for particular components thereof. In other instances, the reorientation can be accomplished by varying a volume of air in the one or more of the buoyancy tanks 1500 such that the buoyancy tanks 1500 on one side of the longitudinal axis (e.g., of the pen 1300) have a larger volume of air contained therein than the buoyancy tanks 1500 on the opposite side of the longitudinal axis.

In some embodiments, the reorientation of components of the aquaculture system 1000 can be carried out automatically by the control system 1800, manually by the operator if the aquaculture system 1000 is raised substantially to the surface, or via any other on-demand input or stimulus. In some embodiments, the aquaculture system 1000 can include a sensor configured to detect a change in water quality and relay, in response to the change in water quality, a signal to the control system 1800. In some embodiments, in response to this signal from the sensor, the control system 1800 can determine, using the processor, the memory, and/or a computer-readable media, a needed change to the orientation and/or submersion depth for the aquaculture system 1000.

In some embodiments, the pen 1300 can include a number of pens 1300. In some embodiments, each of the pens 1300 can be configured to receive and retain aquatic animals (e.g., mollusks) at a different stage of development. In some embodiments, larval aquatic animals can be contained within a first pen from the number of pens 1300. In some embodiments, larval aquatic animals can include trochophore larva and/or veliger. In some embodiments, juvenile aquatic animals can be contained within a second pen from the number of pens 1300. In some instances, juvenile aquatic animals can include oyster spat having a length of less than about 1 millimeter (mm), about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, or about 30 mm, inclusive of all values and ranges therebetween. In other instances, juvenile aquatic animals can include oyster spat having a length that is less than about 1 mm or greater than about 30 mm.

In some embodiments, the pen 1300 can include a growth material to which the larval or juvenile aquatic animals can attach during upwelling or downwelling. In some embodiments, the pen 1300 can include a growth material from which the larval or juvenile aquatic animals can form a cyst that substantially protects the aquatic animal during development. In some embodiments, the larval aquatic animal may develop a shell, for example a shell that consists of mainly chitin and conchiolin (a protein hardened with calcium carbonate). In some embodiments, moving the aquaculture system 1000 into the second configuration for downwelling may improve attachment of juvenile aquatic animals within the pen 1300. In some embodiments, as the aquatic animals develop through the subsequent stages of maturity, according to any suitable characterization or subdivision thereof, the aquatic animals from the first pen can be moved to the second pen and the aquatic animals from the second pen can be moved to a third pen. In some embodiments, the pens 1300 can increase in size with the different stages of aquatic animal development. In some embodiments, the flow rate of water through the pens 1300 can increase with the different stages of aquatic animal development. In some embodiments, the pens 1300 can be formed from a mesh (e.g., a wire mesh) having a largest porosity that increases with the different stages of maturity of aquatic animal contained therein. In some embodiments, the largest porosity of the pen 1300 can be smaller than the lesser of a minimum length, a minimum width, or a minimum height of the aquatic animals contained therein.

In some embodiments, the water flow system 1100 or a portion of the components thereof can form a submergible upweller and/or downweller system configured to allow water to filter through the aquatic animals (e.g., an oyster bed) and out through one or more outlets or other outflow point or points. In some embodiments, the submergible upweller and/or downweller system can be submerged (e.g., at least partially submerged) beneath the surface of the water in which it is disposed and the pumping mechanism 1400 can cause water to flow up through the pen 1300 at a controlled rate. In some embodiments, at least one surface of the pen 1300 can be substantially impermeable. In some embodiments, at least two surfaces of the pen 1300 can be substantially impermeable. In some embodiments, at least three surfaces of the pen 1300 can be substantially impermeable. In some embodiments, at least four surfaces of the pen 1300 can be substantially impermeable. In some embodiments, at least five surfaces of the pen 1300 can be substantially impermeable. In some embodiments, at least six surfaces of the pen 1300 can be substantially impermeable. In some embodiments, the pen 1300 can be substantially impermeable to the uncontrolled influx of water from the body of water in which the water flow system 1100 or a portion of the components thereof is submerged.

In some embodiments, the pen 1300 can be configured to receive into the pen 1300 only water that is communicated from the pumping mechanism 1400. In some embodiments, the pumping mechanism 1400 can be fluidically coupled to the pen 1300 through an opening in at least one of the surfaces of the pen 1300. In some embodiments, the pumping mechanism 1400 can be fluidically coupled to the pen 1300 through two or more openings in two or more surfaces of the pen 1300. In some embodiments, the water communicated from the pumping mechanism 1400 to the pen 1300 can be directed into the pen 1300 through an opening in a surface of the pen 1300 that faces towards the water's surface (e.g., an upwelling configuration). In some embodiments, the water communicated from the pumping mechanism 1400 to the pen 1300 can be directed into the pen 1300 through an opening in a surface of the pen 1300 that faces away from the water's surface (e.g., a downwelling configuration). In some embodiments, the pen 1300 can be configured to receive water from the pumping mechanism 1400 via an opening in only one surface of the pen 1300. In some embodiments, when water is communicated into the pen 1300 via an opening in only one surface of the pen 1300, the pen 1300 can be transitioned from the upwelling configuration to the downwelling configuration by flipping the water flow system 1100 or one or more components thereof, as described above. In some embodiments, when the water flow system 1100 includes multiple pens 1300, one or more of the pens 1300 can be flipped, for example, about the longitudinal axis (as described above), such that at least one of the pens 1300 is in the downwelling configuration (e.g., during attachment of juvenile aquatic animals to the pen 1300) and at least one of the pens 1300 is in the upwelling configuration (e.g., during later stages of development of the aquatic animals).

Figure 2:
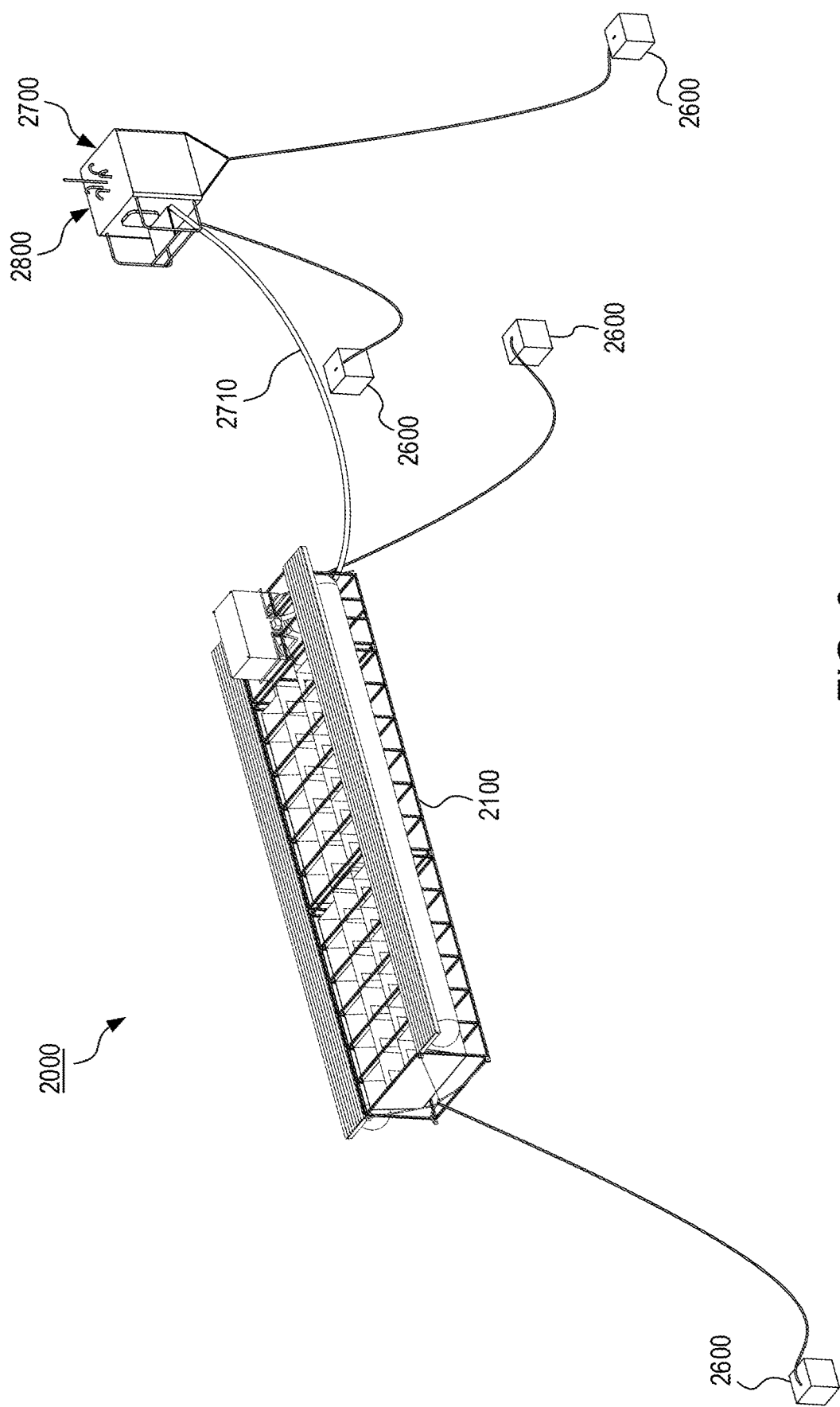
FIG. 2 is a perspective view of an aquaculture system, according to an embodiment.

FIGS. 2-7C show an aquaculture system 2000 for the cultivation of aquatic animals (e.g., animals of the phylum Mollusca) according to an embodiment. As shown in FIG. 2, the aquaculture system 2000 can include a water flow system 2100 to cultivate the aquatic animals. The water flow system 2100 can include a frame 2200, any suitable number of pens 2300, and a pumping device 2400. The aquaculture system 2000 can also include any suitable number of buoyancy tanks 2500 configured and dimensioned to maintain a vertical position of at least a portion of the aquaculture system 2000 and an anchoring system 2600 configured to maintain or substantially maintain a horizontal position of the aquaculture system 2000. The aquaculture system 2000 can include a power system 2700 and a control system 2800 to supply power and monitor/control the aquaculture system 2000, respectively. In some embodiments, one or more portions of the aquaculture system 2000 can be similar to or substantially the same as one or more corresponding portions of the aquaculture system 1000 described above with reference to FIG. 1. Accordingly, such portions may not be described in further detail herein.

The power system 2700 can be any suitable system or combination of systems configured to provide electrical power to one or more portions of the aquaculture system 2000. In some embodiments, the power system 2700 can be similar to or substantially the same as the power system 1700 described above with reference to FIG. 1. In some embodiments, the power system 2700 can include an electrochemical device configured to store power and a power generation device (e.g., a photovoltaic system, a tidal current turbine system, and/or a wind turbine system). In some embodiments, the power system 2700 can be configured to generate and/or store sufficient energy such that the aquaculture system 2000 can operate, without power supplied from an external source, for an extended period such as, for example, greater than about 1 month, greater than about 2 months, greater than about 3 months, greater than about 4 months, greater than about 5 months, greater than about 6 months, greater than about 7 months, greater than about 8 months, greater than about 9 months, greater than about 10 months, greater than about 11 months, greater than about 12 months, greater than about 18 months, greater than about 24 months, greater than about 30 months, greater than about 36 months, greater than about 42 months, greater than about 48 months, greater than about 60 months, or substantially for the lifespan of the aquaculture system 2000. In some embodiments, the power system 2700 can be configured to safely store energy (e.g., via a battery or the like) sufficient to operate the aquaculture system 2000 during extended periods of submersion of the aquaculture system 2000. In some embodiments, the power system 2700 can be configured to supply power to the aquaculture system 2000 at submersion depths of greater than about 1 meter, greater than about 2 meters, greater than about 3 meters, greater than about 4 meters, greater than about 5 meters, greater than about 6 meters, greater than about 7 meters, greater than about 8 meters, greater than about 9 meters, greater than about 10 meters, or more (inclusive of all values and ranges therebetween).

The control system 2800 can be any suitable system or combination of systems configured to control and/or communicate with one or more portions of the aquaculture system 2000. In some embodiments, the control system 2800 can be similar to or substantially the same as the control system 1800 described above with reference to FIG. 1. In some embodiments, the control system 2800 can include a processor, a memory, and a communication and/or network interface, for example, mounted on the frame 2200, the anchoring system 2600, or a buoy coupled to one of these. In some embodiments, the control system 2800 can include one or more processors, memories, wireless network cards, antennae, acoustic modem cards, transducers, other peripheral instrumentation, a battery, and/or a power system (e.g., a solar power system), as described above with reference to the control system 1800. In some embodiments, the control system 2800 can include one or more sensors configured to measure environmental conditions such as a water quality parameter (e.g., water temperature, water salinity/conductivity, water pH, nutrient levels in the water, presence of cytotoxins or other contaminants in the water, etc.), weather conditions (e.g., atmospheric or barometric pressure), current flow rate, flow rate of water through at least a portion of a fluid flow path defined by the pumping mechanism 2400, the pens 2300, and/or conduits thereto, therefrom, or therebetween.

In some embodiments, a signal or signals from the user, operator, or a third party, such as a weather forecasting service or extreme weather alert service, can be automatically or manually transmitted to an antenna, the antenna configured to relay the signal or signals to the processor. In some embodiments, the signal or signals can be indicative of operational commands, status requests, configuration signals, input data or metadata, and the like. For example, a signal may be indicative of an operational command to move and/or submerge the water flow system 2100 or components thereof. In some embodiments, the signal or signals can be indicative of a weather forecast or impending extreme weather condition. In some embodiments, a computer-readable media, software program, code, instructions, etc. stored in or on the memory can be activated and/or executed upon relay of the signal or signals to the processor. In some embodiments, the computer-readable media, software program, code, instructions, etc. can cause the processor to interpret the signal or signals and cause the aquaculture system 2000 or components thereof to be moved by the propulsion device until the geographic location of the aquaculture system 2000 or components thereof match a desired location communicated by the signal or signals. In some embodiments, the computer-readable media, software program, code, instructions, etc. can cause the processor to interpret the signal or signals and cause the aquaculture system 2000 (or components thereof), the water flow system 2100 (or components thereof), or at least one of the pens 2300 to be submerged or further submerged beneath the surface of the water.

Figure 3:
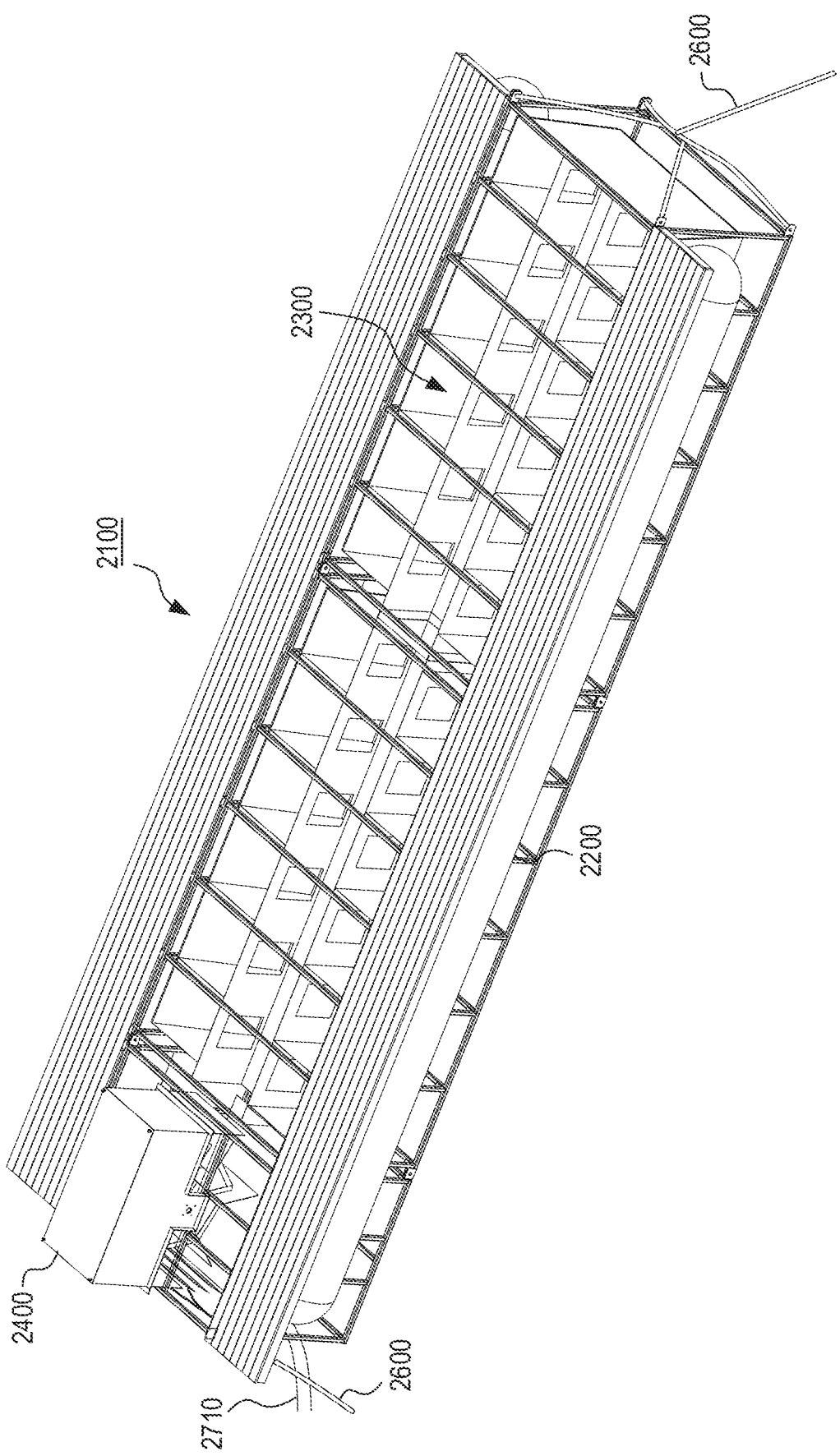
FIG. 3 is a perspective view of a water flow system included in the aquaculture system of FIG. 2.
Figure 4:
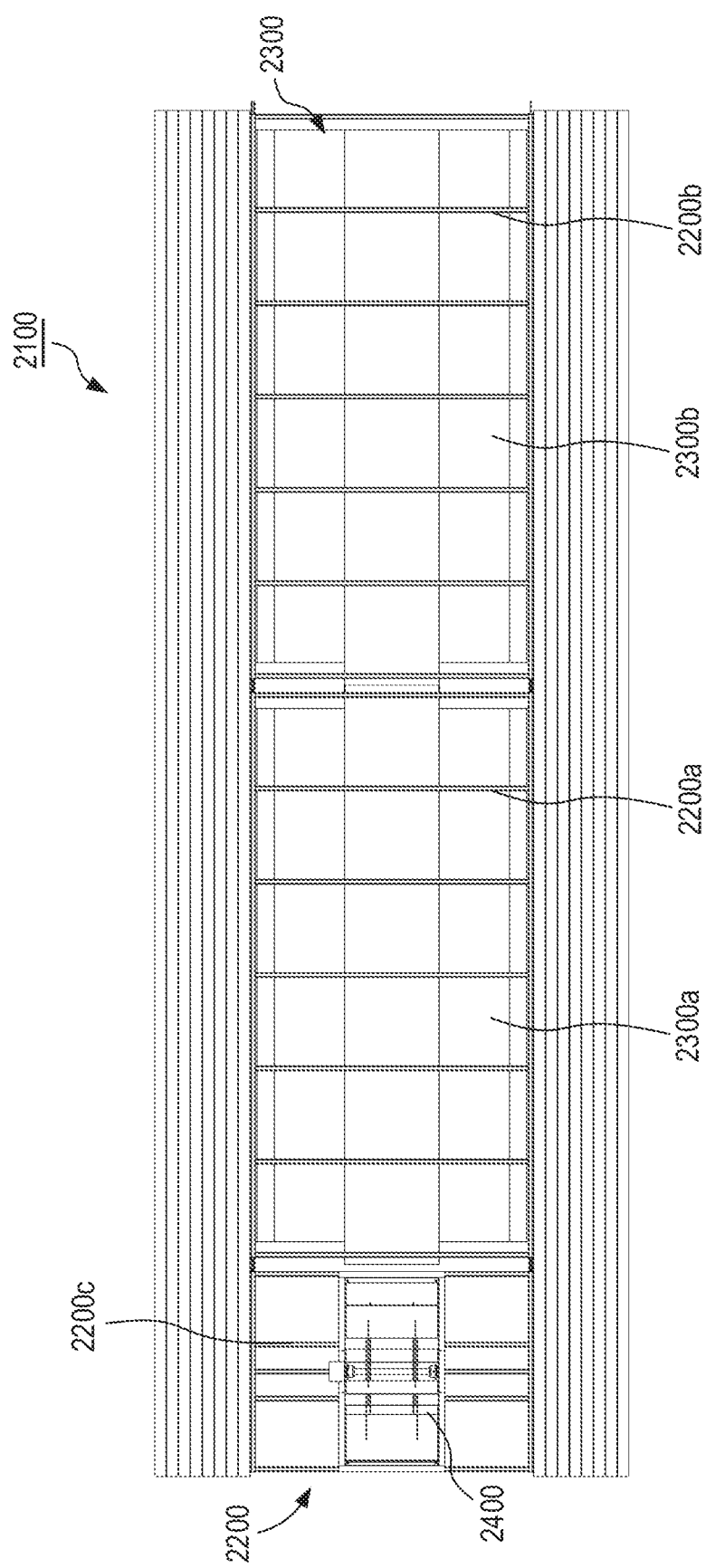
FIG. 4 is a top view of the water flow system of FIG. 3.

The power system 2700 and the control system 2800 can be housed together in a separate physical enclosure (e.g., physically coupled to a buoy) and can be operably coupled and/or electrically coupled to the water flow system 2100 by a cable 2710 (or via a wireless data connection or the like). One or more anchoring systems 2600 can be used to secure the location of the water flow system 2100 and the power system 2700/control system 2800. As shown, the anchoring system 2600 can utilize anchors deployed to the bottom of a body water with cables that directly tether to the water flow system 2100 and the power system 2700 and/or the control system 2800. FIGS. 3 and 4 show a perspective view and a top view of the water flow system 2100, respectively. The water flow system 2100 can include a single pumping mechanism 2400 coupled to a first pen 2300*a*. In some embodiments, a second pen 2300*b* is coupled to the first pen 2300*a* to increase the number of aquatic animals that can be cultivated in the water flow system 20100. The first pen 2300*a* and second pen 2300*b* are also collectively referred to herein as pens 2300. Multiple anchoring systems 2600 can be disposed on the front and the rear of the water flow system 2100.

Figure 5:
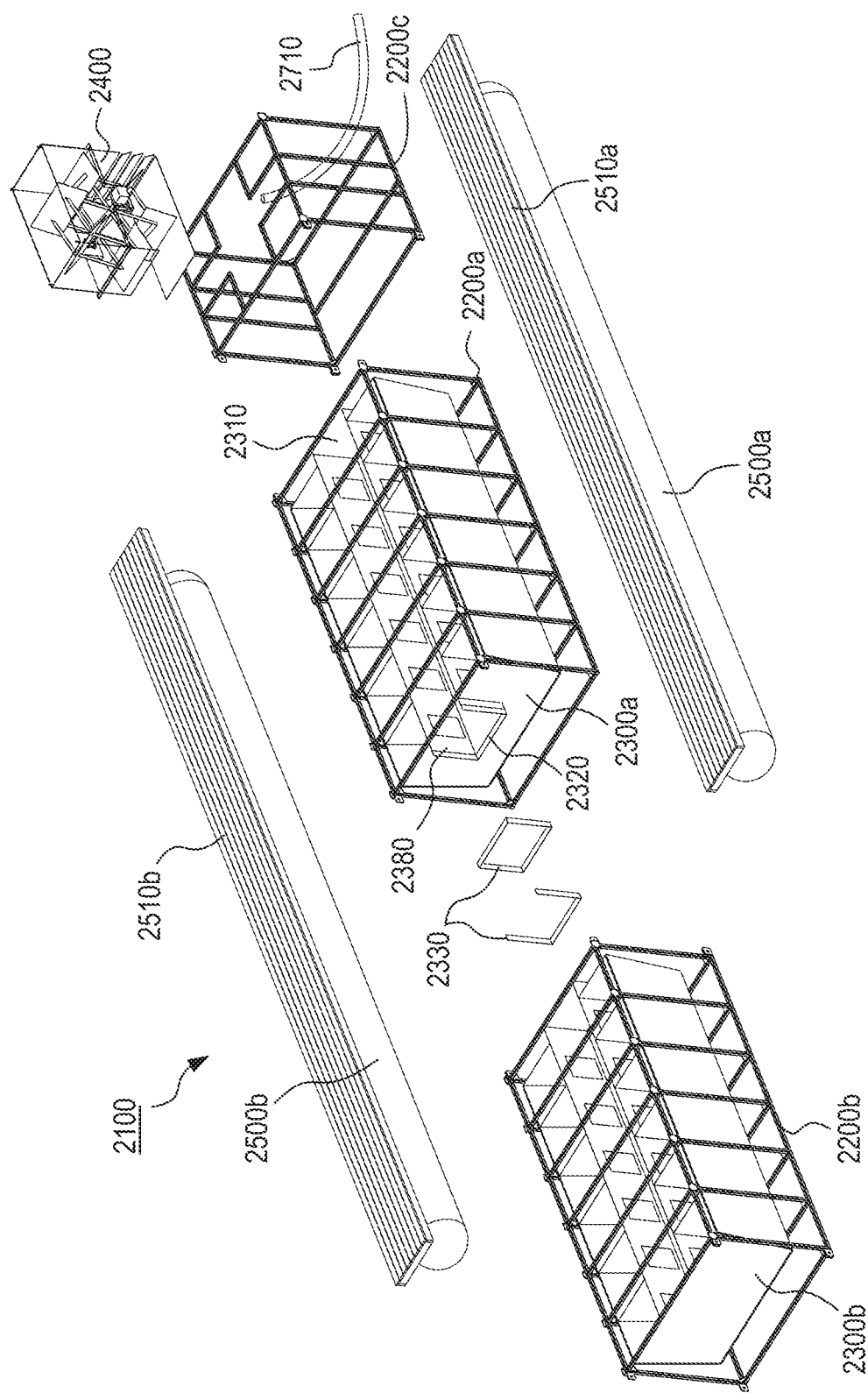
FIG. 5 is a partial exploded view of the water flow system of FIG. 3.

FIG. 5 shows a partially exploded view of the water flow system 2100. The water flow system 2100 can be any suitable system or combination of systems configured to cultivate aquatic animals. In some embodiments, the water flow system 2100 can be similar to or substantially the same as the water flow system 1100 described above with reference to FIG. 1. In the embodiment shown in FIGS. 2-7C, multiple frames 2200 can be used to facilitate assembly of the water flow system 2100. A frame 2200*c* configured to support the pumping mechanism 2400 can be coupled to a frame 2200*a* supporting the first pen 2300*a*. A frame 2200*b* supporting the second pen 2300*b* can then be coupled to the other end of the frame 2200*a*. In this manner, the assembly of the water flow system 2100 can be modular where additional pens 2300 can be added to the water flow system 2100 as desired.

The frame 2200 can be used to mechanically support various components in the water flow system 2100, such as the pen 2300, the pumping mechanism 2400, and the buoyancy tank 2500. The frame 2200 can also have sufficient mechanical strength to withstand tidal waves and ocean currents to increase the operational lifetime of the aquaculture system 2000. In some embodiments, the frame 2200 can be a rigid frame structure formed from any suitable number of struts (e.g., rod-shaped elements). The struts of the frame 2200 can define a three-dimensional shape with an interior cavity and the pen 2300 can be disposed in the interior cavity. In some embodiments, the pen 2300 can be made from a flexible material (e.g., netting or mesh) and the frame 2200 can be coupled to the pen 2300 via any number of tensioning member (not show) such that the frame 2200 and tensioning members maintain the flexible material in a semi-rigid configuration via tension. The frame 2200 can have dimensions sufficient to at least partially fit other components in the cavity (e.g., the pen 2300, the pumping mechanism 2400, and/or any other component). In this manner, the frame 2200 can be used to mechanically support and protect the components disposed in the interior cavity. For example, the frame 2200 can be an assembly of struts forming a substantially rectangular box with struts disposed along the edges of the rectangular box. Additional struts can be disposed along the surface of the rectangular box to increase structural rigidity and/or to support other components.

The struts can include one or more tabs disposed along the length of the strut, which can function as mounting points to couple other components internally (e.g., the pen 2300) and/or externally (e.g., the buoyancy tank 2500) to the frame 2200. The tabs can also be used to couple two or more frames 2200 together. In this manner, the water flow system 2100 can be modular where any number of frames 2200 can be coupled together with each frame 2200 configured to support a particular component in the water flow system 2100. For example, the water flow system 2100 can include a first frame (not shown) or a first portion of the frame 2200 supporting the pumping mechanism 2400 coupled to a second frame (not shown) or a second portion of the frame 2200 supporting the pen 2300. If a larger storage capacity is desired, a third frame (not shown) or a third portion of the frame 2200 supporting another pen 2300 can be coupled to the water flow system 2100.

The struts can be coupled together using various coupling mechanisms including, but not limited to bolt fasteners, welding, brazing, adhesives, or any combination thereof. In some embodiments, any number of struts can be formed from a single component to simplify assembly. For example, a rod can be bent to form an L-shaped strut rather than coupling two separate struts together. The struts can be formed from various metals, plastics, and composites including, but not limited to aluminum, steel, stainless steel, polyethylene, polyvinyl chloride, polycarbonates, poly(methyl methacrylate), fiberglass, carbon fiber, and/or the like. A coating can also be applied to improve the corrosion resistance of the frame 2200 to salt water and/or fresh water. The coating can be various materials including, but not limited to polyurethane, epoxies, polytetrafluoroethylene, zinc oxide, copper, and/or the like.

The pumping mechanism 2400 can be a paddle wheel system configured to flow water from the outlet 2310 of the pens 2300. The cable 2710 can be directly coupled to a motor on the pumping mechanism 2400 to power the paddle wheel system. Any suitable number of connecting members 2330 can be used to couple the connecting port 2320 of the first pen 2300a to the outlet 2310 of the second pen 2300b such that water can flow between the pens 2300. A pair of buoyancy tanks 2500a and 2500b (collectively referred to herein as buoyancy tank 2500) can be disposed on the side of the water flow system 2100. As shown, the buoyancy tanks 2500 can be substantially cylindrical in shape with a length comparable to the total length of the water flow system 2100. A corresponding pair of decks 2510a and 2510b (collectively referred to herein as decks 2510) can be used to couple the buoyancy tanks 2500 to the frames 2200. The decks 2510 can provide a platform for human operators to access the pens 2300 and the aquatic animals contained therein.

The pen 2300 can be used to contain and enclose the aquatic animals during development. In some embodiments, the pen 2300 can be a substantially enclosed structure (e.g., a trough-like structure) with enclosed sidewalls, a closed bottom surface, and an open top surface. The pen 2300 can be dimensioned and shaped to fit substantially in an interior cavity defined by the frame 2200, as described above. The pen 2300 can include any number of tabs configured to align to corresponding tabs disposed on the frame 2200. The pen 2300 can thus be coupled to the frame 2200 via the tabs using various coupling mechanisms including, but not limited to bolt fasteners, welding, brazing, adhesives, or any combination thereof.

Figure 6:
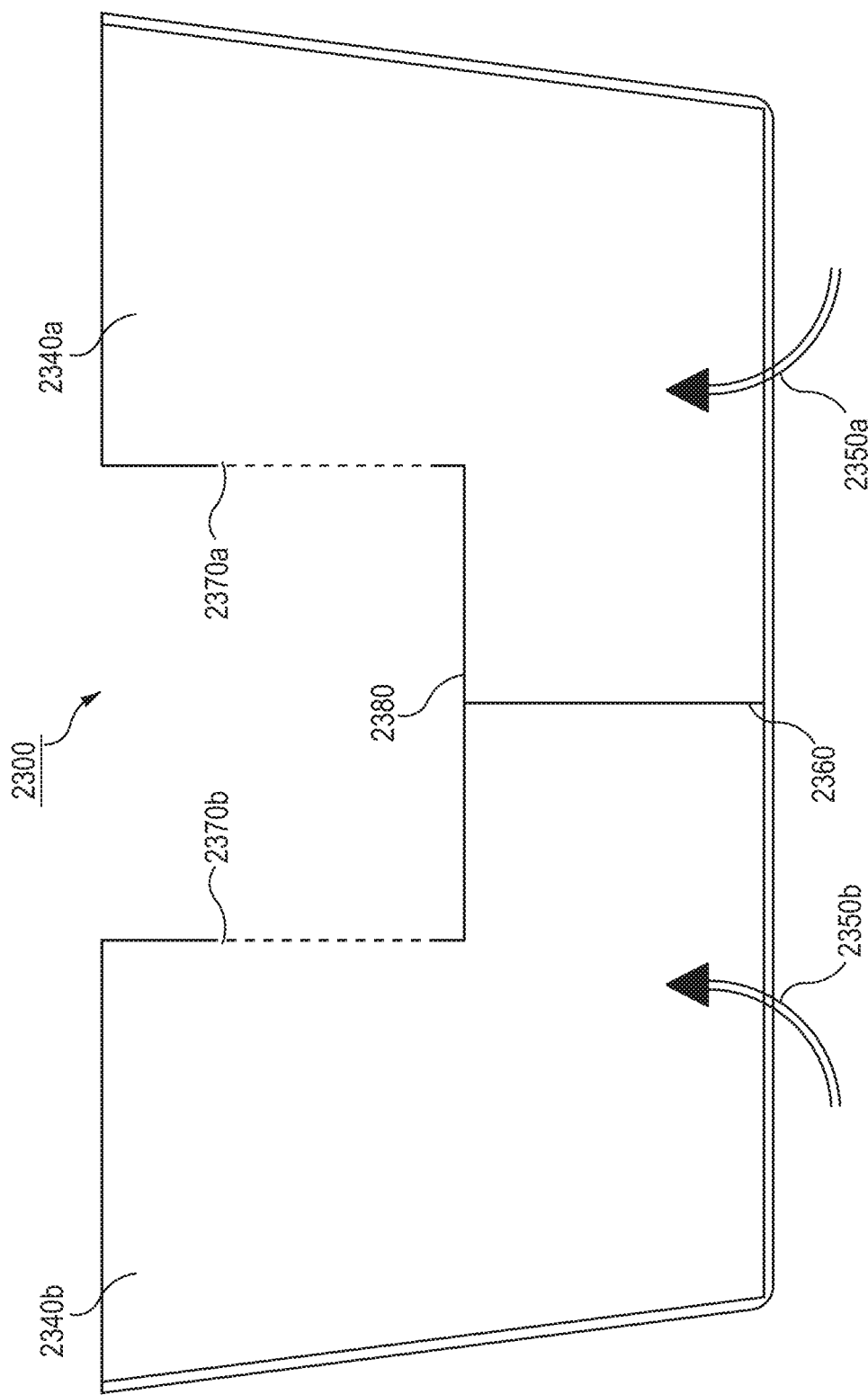
FIG. 6 is a cross-sectional view of a container included in the water flow system of FIG. 3.

The pens 2300 can include any suitable number of compartments 2340 each configured to store aquatic animals during various stages of development. FIG. 6 shows a cross sectional view of the pen 2300 detailing the geometry of a compartment 2340a and 2340b. As shown, compartment 2340a and 2340b can be separated by a partition 2360. The aquatic animals can be disposed onto or proximate to the bottom of each compartment 2340. Each compartment 2340 can include an inlet 2350 (e.g., inlets 2350a and 2350b) where water is flowed into the compartment 2340. Each compartment 2340 can also include a side opening 2370 (e.g., side openings 2370a and 2370b) where water can flow from the compartments 2340 into a channel 2380. The channel 2380 can be connected to all compartments 2340 in the pen 2300. As shown in FIG. 5, the channel 2380 can facilitate the flow of water between the outlet 2310 and the connecting port 2320.

Aquatic animals, for example, from the phylum Mollusca, can be disposed on the bottom surface of the pen 2300 during development. To generate a flow of water across the aquatic animals, the bottom surface can include one or more inlets (e.g., 2350a, 2350b) where water is flowed into the pen 2300 from the surrounding body of water. The pen 2300 can also include one or more outlets (e.g., 2310) where water can flow out of the pen 2300. To generate a flow of water, the pumping mechanism 2400 can be coupled to the outlet 2310 and configured to generate a pressure difference such that water is continually flowed across the aquatic animals during operation from the inlet 2350 to the outlet 2310, corresponding to an upwelling configuration. The water flow system 2100 can also be operated in a downwelling configuration where the flow of water is reversed through the pen 2300 (e.g., water flows from the outlet 2310, through channel 2380 and side openings 2370, and to the inlet 2350). The downwelling configuration can be used to help younger aquatic animals attach to the pen 2300 during initial stages of development.

In some embodiments, the pen 2300 can also include one or more connecting ports (e.g., 2320) to allow water to flow between multiple pens 2300 coupled together. In some embodiments, the shape and dimensions of the connecting port 2320 and the outlet 2310 can be substantially similar in order to facilitate mating between adjacent pens 2300. One or more connecting members (e.g., 2330) can be used to securely couple adjacent pens 2300. In some embodiments, the one or more connecting members 2330 can have a rigid frame structure with dimensions and a shape similar to the connecting port 2320 and/or the outlet 2310. The connecting members 2330 can form an enclosed passage between the adjacent pens 2300 where water can flow. The one or more connecting members 2330 can include one or more tabs configured to couple to the sidewalls of the pen 2300 using various coupling mechanisms including, but not limited to bolt fasteners, welding, brazing, adhesives, or any combination thereof. In this manner, a single pumping mechanism 2400 can be used to generate a flow of water across multiple pens 2300.

In some embodiments, the pen 2300 can include a number of compartments (e.g., 2340) that subdivide the interior space of the pen 2300 into smaller portions of space where aquatic animals can be stored. The compartments 2340 can be shaped and dimensioned such that the flow of water within the compartment 2340 flows across the aquatic animals along a preferred and/or desired direction. The compartments 2340 can also be used to compensate for possible variations in pressure within the larger interior space of the pen 2300, which can lead to undesirable current flow. Each compartment 2340 can include one or more inlets (e.g., 2350) on the bottom surface of the pen 2300, where water is flowed into the compartment 2340 and one or more side openings (e.g., 2370) where water is flowed out of the compartment 2340. The one or more inlets 2350 can have dimensions smaller than the smallest of average height, average width, or average height of the aquatic animals to sufficiently contain the aquatic animals while providing a sufficient flow of water for nourishment. In some embodiments, the one or more inlets 2350 can be any number of openings, perforations, louvers, slots, and/or any other structure or defined void configured to allow flow therethrough. In some embodiments, the compartments 2340 can be arranged such that a portion of the interior space of the pen 2300 forms a channel (e.g., 2380) used to facilitate a flow of water between the compartments 2340 and the one or more outlets 2310 of the pen 2300. The one or more side openings 2370 of each compartment 2340 can interface with the walls of the channel 2380 such that water from each compartment 2340 flows directly into the channel 2380. In some embodiments, the one or more side openings 2370 can be a number of openings, perforations, louvers, slots, and/or any other structure or defined void configured to allow flow therethrough.

In some embodiments, the compartments 2340 can be configured to grow aquatic animals at different stages of development. For example, smaller compartments 2340 can be used for aquatic animals at earlier stages of development. However, as the aquatic animals grow larger, they can be moved into larger compartments 2340 in the pen 2300. The one or more inlets 2350 in each compartment 2340 can be dimensioned such that the water flow varies between compartments 2340 based on the development stage of the aquatic animals. For example, the total area of the one or more inlets 2350 can be larger in compartments 2340 configured for more mature aquatic animals to supply a higher water flow. Additionally, the flow rate of water can be varied between different compartments 2340 based on the arrangement of the compartments 2340 and the shape and dimensions of the channels 2380 between the compartments 2340, which can affect the pressure drop between the inlet 2350 of the compartment 2340 and the outlet 2310 of the pen 2300. In some embodiments, the compartments 2340 can be removable from the pen 2300 to improve ease of harvesting, inspection, maintenance, and greater flexibility to configure the water flow system 2100. For example, each compartment 2340 can be a substantially enclosed structure with an open top surface, one or more inlets 2350 on the bottom surface, and one or more side openings 2370 on at least one sidewall. The compartment 2340 can be disposed and aligned to corresponding inlets 2350 on the bottom surface of the pen 2300.

The pen 2300, and the compartments 2340 contained therein, can be formed from various metals, polymers, and composite materials including, but not limited to aluminum, steel, stainless steel, polyethylene, polyvinyl chloride, polycarbonates, poly(methyl methacrylate), fiberglass, carbon fiber, and/or the like. Surfaces of the aquatic system 2000 (e.g., the exterior surface of the pen 2300) can be coated with an anti-fouling coating to reduce unwanted growth of aquatic organisms, which can potentially restrict the flow of water through the inlet over time. The anti-fouling coating can be formed from various coatings including, but not limited to, silicone, Teflon, graphite, and/or the like. The materials can be chosen to reduce environmental impact and to avoid contamination of developing aquatic animals in the aquaculture system 2000.

Figure 7A:
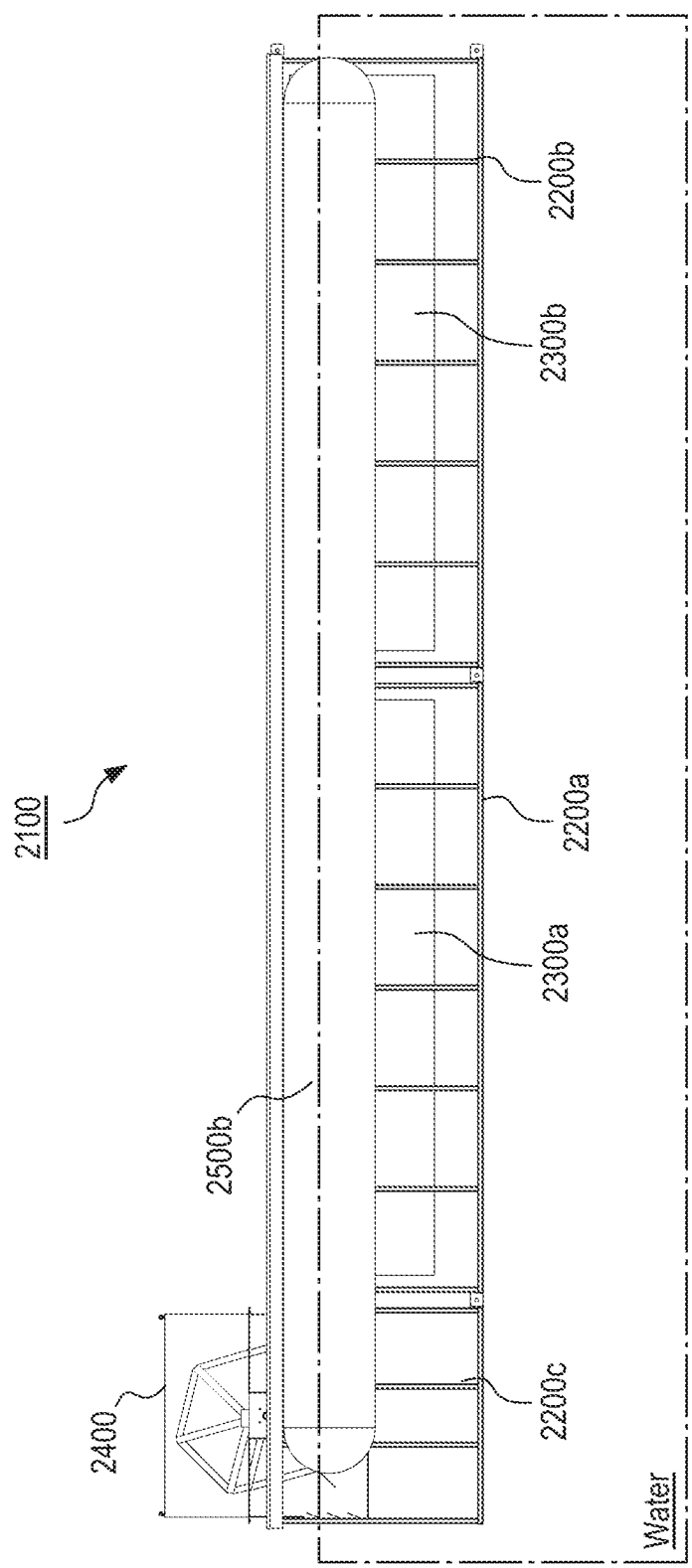
FIGS. 7A-7C are each a side view of the water flow system of FIG. 3 in a growing position, a submerged position, and a drying position, respectively.
Figure 7B:
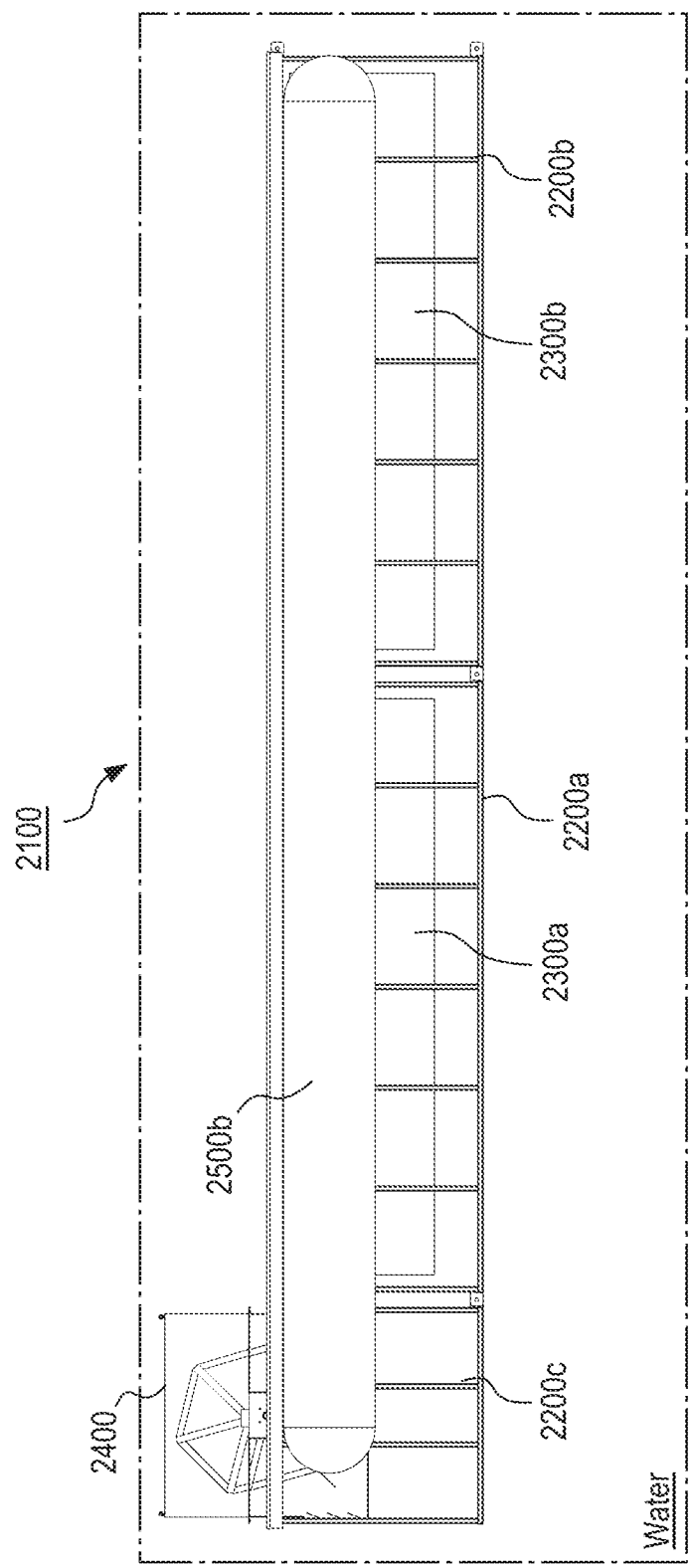
Figure 7C:
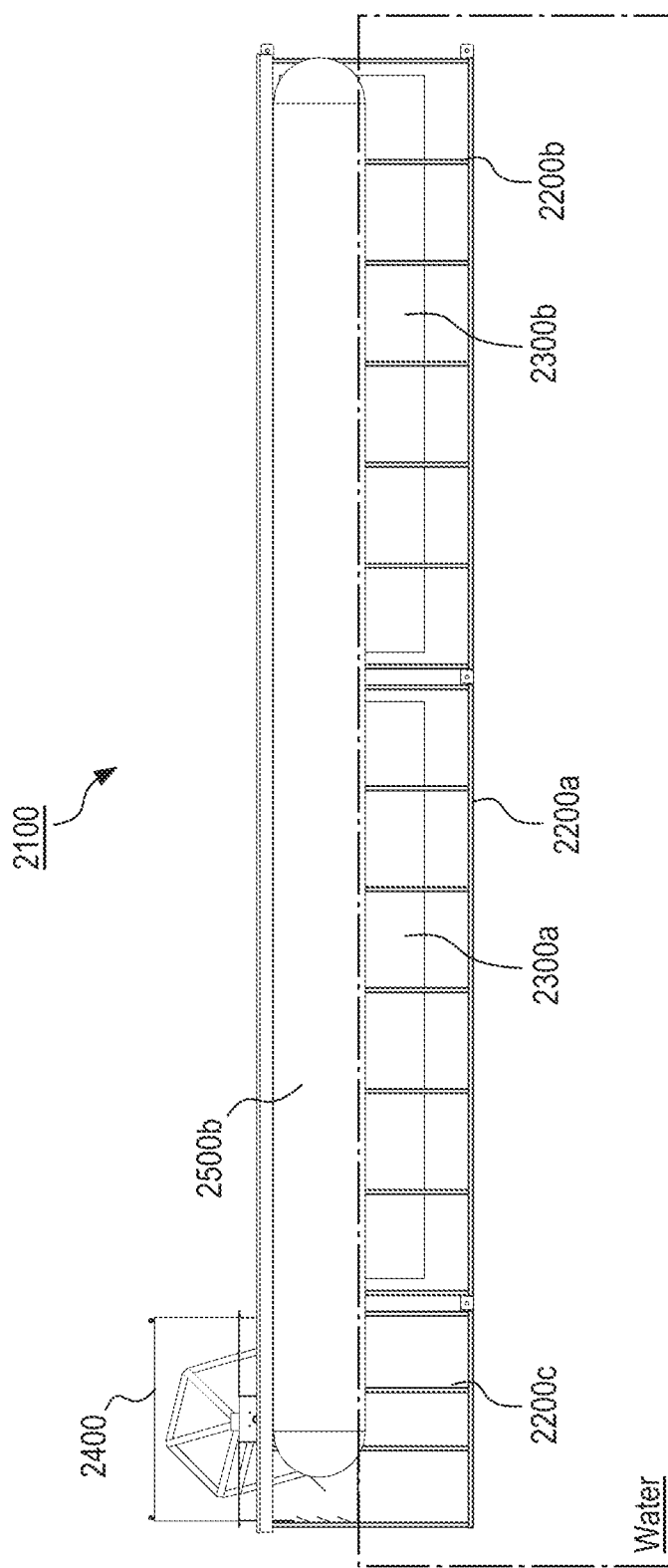

FIGS. 7A-7C show side views of the water flow system 2100 at various depths corresponding to different operating configurations. The buoyancy tanks 2500 can be filled with varying amounts of water to control the depth of the water flow system 2100. For example, FIG. 7A shows the water flow system 2100 in a growth configuration with the pens 2300 substantially submerged or at least partially submerged to increase the flow of water. FIG. 7B shows the water flow system 2100 entirely or fully submerged under water (e.g., below a surface of the water), which can be used during adverse weather conditions where the water flow system 2100 can be damaged by tidal forces. The water flow system 2100 can also be submerged in order to protect or direct the development of the aquatic animals with regard to changing environmental conditions. In some embodiments, the aquaculture system 2000 and/or at least the water flow system 2100 can be submerged below a surface of the water at a depth between about 1 meter and about 10 meters. In some embodiments, the aquaculture system 2000 can include a sensor configured to detect a change in water quality and relay, in response to the change in water quality, a signal to the control system 2800. In some embodiments, in response to this signal from the sensor, the control system 2800 can determine, using the processor, the memory, and/or a computer-readable media, a needed change to the orientation and/or submersion depth for the aquaculture system 2000. FIG. 7C shows the water flow system 2100 substantially raised from the water surface, which can be used to dry the aquatic animals prior to harvesting or during inspection or maintenance by a human operator.

In some embodiments, components of the aquaculture system 2000, such as the frame 2200a, 2200b, 2200c, the pen 2300a, 2300b, or the entire water flow system 2100 can be rotated from a first orientation to a second orientation during use, for example without stopping the flow of water to the pen 2300a, 2300b. In some embodiments, the reversal of water flow for the downwelling configuration can be used when the pen 2300a, 2300b or other components are in the second orientation instead of the upwelling configuration, for example, in normal operation of the pen 2300a, 2300b and for later development stages rather than during attachment of juvenile aquatic animals to the pen 2300a, 2300b. In some embodiments, the pen 2300a, 2300b can be considered right side up in the first orientation and can be flipped 180° over a horizontal axis to be upside down in the second orientation. In some embodiments, the water flow system 2100 can include a motor or other mechanical drive (not shown) configured and dimensioned to cause the components of the aquaculture system 2000 to move from the first orientation to the second orientation. In some embodiments, the motor or other mechanical drive can be attached to the frame 2200a, 2200b, 2200c and configured to reorient the pen 2300a, 2300b with respect to the frame 2200a, 2200b, and 2200c. In some embodiments, the motor or other mechanical drive can be attached to the anchoring system 2600 and configured to reorient the water flow system 2100, including the frame 2200a, 2200b, 2200c, the pen 2300a, 2300b, the pumping mechanism 2400, and/or the buoyancy tank 2500, with respect to the anchoring system 2600. In some embodiments, transitioning the pen 2300a and/or the pen 2300b from the first orientation to the second orientation can be accomplished at least in part by causing the motor or mechanical drive to rotate the pen 2300a and/or the pen 2300b about the horizontal axis, and at least in part by adjusting buoyancy conditions of at least one of the buoyancy tanks 2500. In some embodiments, the user or operator of the aquaculture system 2000 can manually flip the pen 2300*a* and/or the pen 2300*b* by any suitable method, including but not limited to a crane on a barge nearby the aquaculture system 2000, manually adjusting buoyancy conditions of at least one of the buoyancy tanks 2500, manually causing the motor or mechanical drive to cause rotational motion of the pen 2300*a* and/or the pen 2300*b* about an axis, or combinations thereof.

In some embodiments, reorientation of components of the aquaculture system 2000 in place can be accomplished when one or more of the buoyancy tanks 2500 are filled with water while the remaining buoyancy tanks 2500 are filled with air or a gas. In some embodiments, this can cause a buoyancy differential laterally across the aquaculture system 2000 or for particular components thereof. In some embodiments, the reorientation of components of the aquaculture system 2000 can be carried out by the control system 2800, manually by the operator if the aquaculture system 2000 is raised substantially to the surface, or via any other on-demand input or stimulus.

Figure 8:
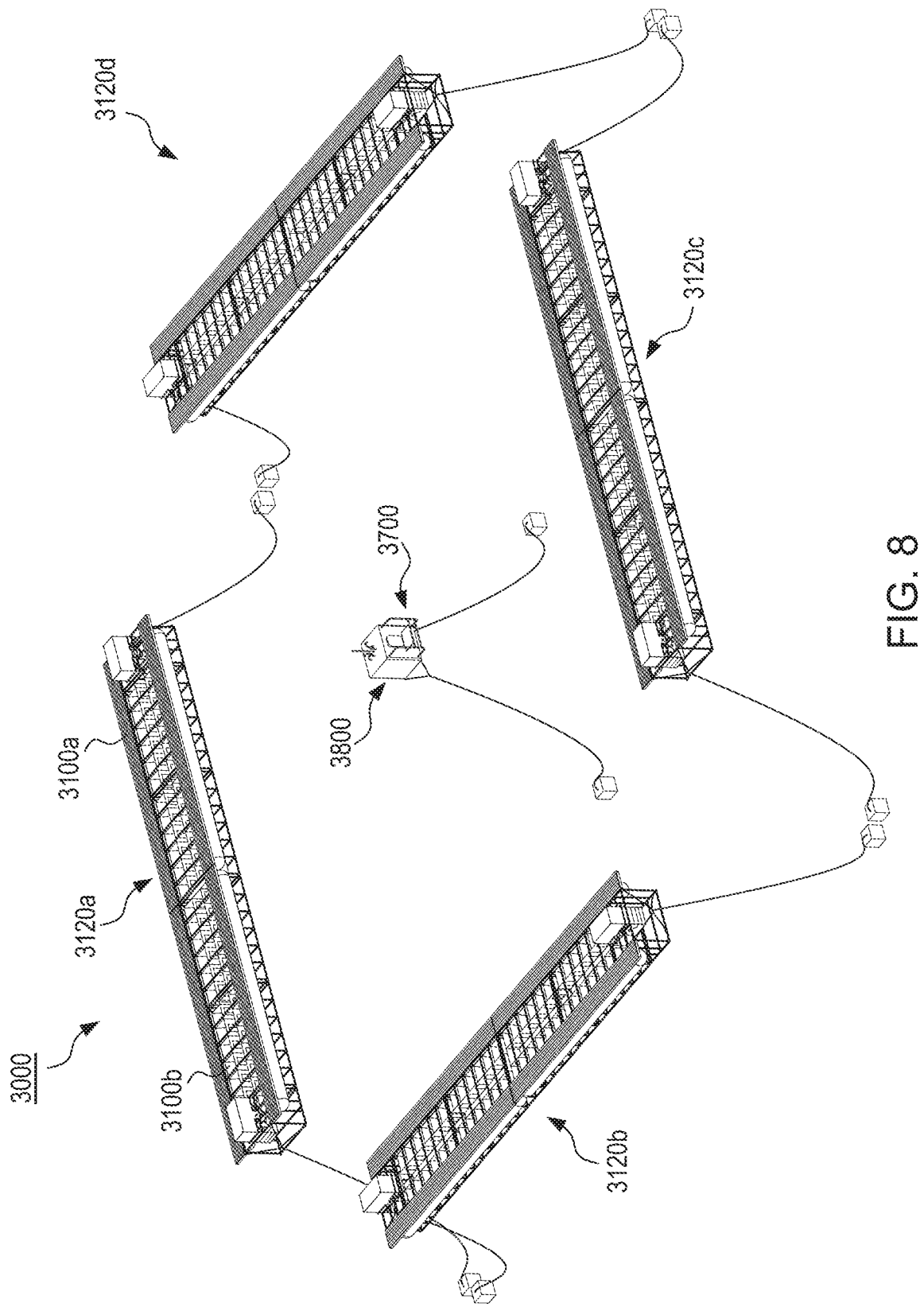
FIG. 8 is perspective view of an aquaculture system including multiple water flow systems, according to an embodiment.

FIG. 8 shows an aquaculture system 3000 according to an embodiment. In some implementations, one or more portions of the aquaculture system 3000 can be similar to or substantially the same as one or more corresponding portions of the aquaculture systems 1000 and/or 2000 described in detail above. Accordingly, such portions may not be described in further detail herein.

In the embodiment shown in FIG. 8, the aquaculture system 3000 includes a number of water flow systems 3100 that can be deployed in the aquaculture system 3000 using a single power system 3700 or more than one power system 3700, and a single control system 3800 or more than one control system 3800. In some embodiments, a single power system 3700 and a single control system 3800 can be housed together in a physical enclosure. In some embodiments, the power system 3700 can be housed in a separate physical enclosure from the control system 3800. In some embodiments, more than one water flow system 3100, for example, a pair of water flow systems 3100*a* and 3100*b*, can be coupled together to form a water flow assembly 3120. The water flow assembly 3120 can increase the capacity for growing aquatic animals without affecting the performance of an individual water flow system 3100. Multiple water flow assemblies 3120*a*, 3120*b*, 3120*c*, and 3120*d* (collectively "water flow assemblies 3120") can be deployed in close proximity to the power system 3700 and the control system 3800. In this manner, the aquaculture system 3000 described herein can be scaled to support multiple water flow systems 3100, thus increasing the number of aquatic animals cultivated in the aquaculture system 3000.

While the water flow assemblies 3120 are shown as including two water flow systems 3100*a* and 3100*b*, the water flow assemblies 3120 can include any suitable number of water flow systems, for example, one, greater than two, three, greater than three, four, greater than four, five, greater than five, six, greater than six, seven, greater than seven, eight, greater than eight, nine, greater than nine, ten, or greater than ten. While the multiple water flow assemblies 3120 are shown as four water flow assemblies 3120 operably coupled to a centralized power system 3700 and control system 3800, the total number of water flow assemblies 3120 in the aquatic system 3000 can be greater than one, two, three, four, five, six, seven, eight, nine, ten, 11, 12, 13, 14, 15, 16, 17, 18, 19, or 20, inclusive of all values and ranges therebetween. In some embodiments, between two and about 20 water flow assemblies 3120 can be coupled to a single, central control system 3800 while each of the between two and about 20 water flow assemblies 3120 can include an individual power system 3700. In some embodiments, between two and about 20 water flow assemblies 3120 can be coupled to a single, central power system 3700 while each of the between two and about 20 water flow assemblies 3120 can include an individual control system 3800.

In some embodiments, each of the more than one water flow systems 3100 can be designated for a different one of the stages of development of the aquatic animals. In some embodiments, one or more of the water flow systems 3100 can be in the upwelling configuration and one or more of the water flow systems 3100 can be in the downwelling configuration. In some embodiments, the one or more water flow systems 3100 can be configured to be submerged to substantially the same depth or to individual depths. For example, during moderately extreme weather conditions, the one or more of the water flow systems 3100 containing more juvenile aquatic animals can be submerged to a greater depth while the one or more of the water flow systems 3100 containing more mature aquatic animals can be submerged to a lesser depth. In some embodiments, the stage of development of the aquatic animals can be a variable or factor considered by the computer-readable media or software program when controlling the depth to which the one or more water flow systems 3100 are submerged. In some embodiments, the water flow systems 3100 can be submerged below a surface of the water (e.g., fully submerged) at or to a depth between about 1 meter and about 10 meters.

Figure 9:
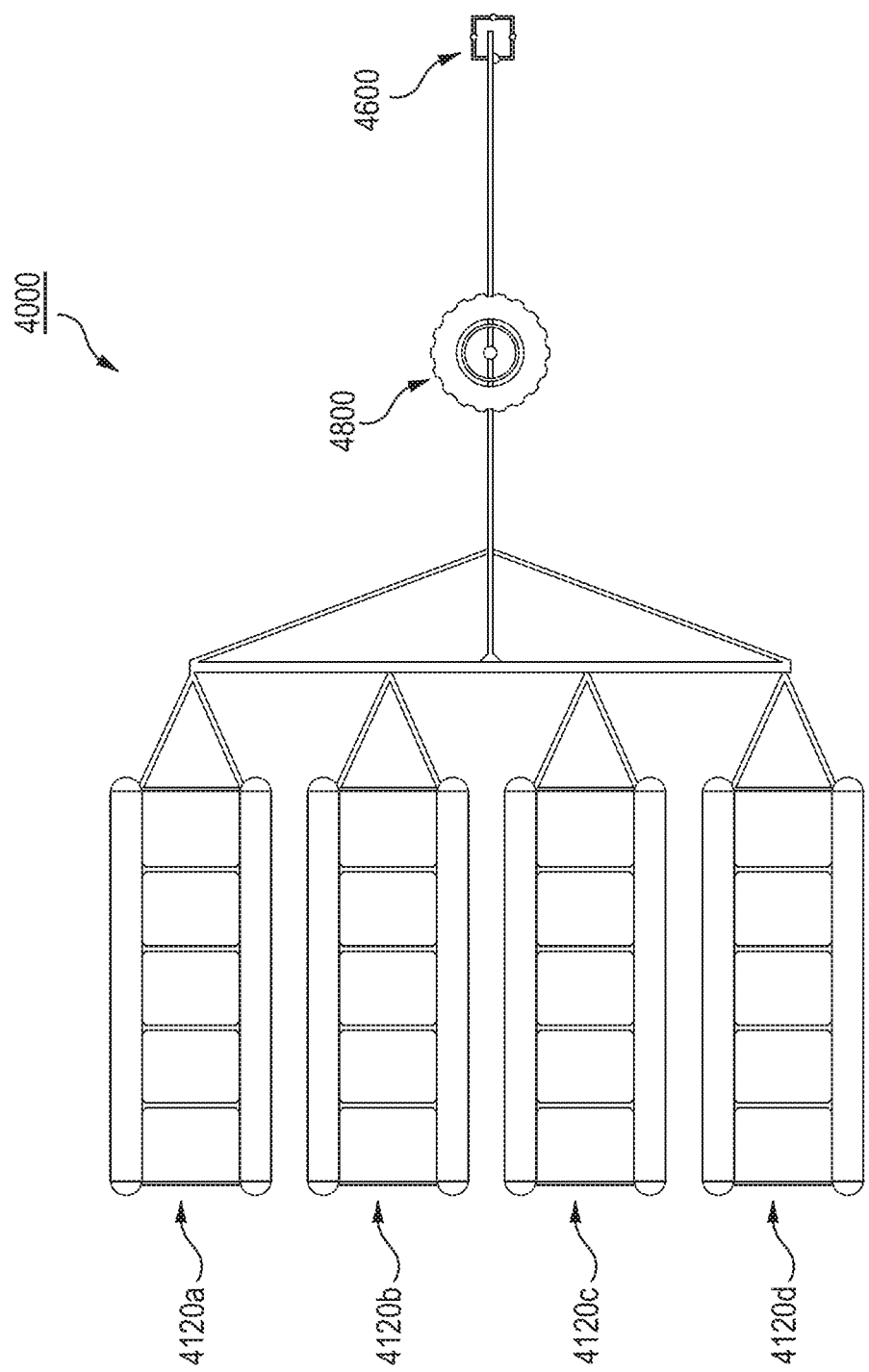
FIG. 9 is a top view of an aquaculture system, according to an embodiment.

FIG. 9 shows an aquaculture system 4000 according to an embodiment. The aquaculture system 4000 includes a number of water flow assemblies 4120*a*, 4120*b*, 4120*c*, and 4120*d* (collectively "water flow assemblies 4120") and a control system 4800 (e.g., a buoy), and an anchoring system 4600 (e.g., a mooring). As shown, the water flow assemblies 4120 are arranged substantially parallel to each other and are collectively coupled to the control system 4800 and the anchoring system 4600. In some embodiments, portions and/or aspects of the aquaculture system 4000 are substantially similar in form and/or function to the corresponding portions and/or aspects of the aquaculture systems 1000, 2000, and/or 3000 described above with reference to FIGS. 1-8. Accordingly, such similar portions and/or aspects are not described in further detail herein.

While the multiple water flow assemblies 4120 are shown as four water flow assemblies 4120 operably coupled to a centralized control system 4800 and anchoring system 4600, the total number of water flow assemblies 4120 in the aquatic system 4000 can be greater than one, two, three, four, five, six, seven, eight, nine, ten, 11, 12, 13, 14, 15, 16, 17, 18, 19, 20, or more, inclusive of all values and ranges therebetween. In some embodiments, between two and about 20 water flow assemblies 4120 can be coupled to a single, central control system 4800 while each of the between two and about 20 water flow assemblies 4120 can include an individual power system (not shown). In some embodiments, between two and about 20 water flow assemblies 4120 can be coupled to a single, central power system (not shown) while each of the between two and about 20 water flow assemblies 4120 can include an individual control system 4800. In some embodiments, the aquaculture system 4000 can be arranged such that each of the water flow assemblies 4120 is operably coupled to a single, centralized anchoring system 4600. In other embodiments, each water flow assembly 4120 included in the aquaculture system 4000 can be coupled to a separate anchoring system or separate portion of the anchoring system 4600.

Figure 10A:
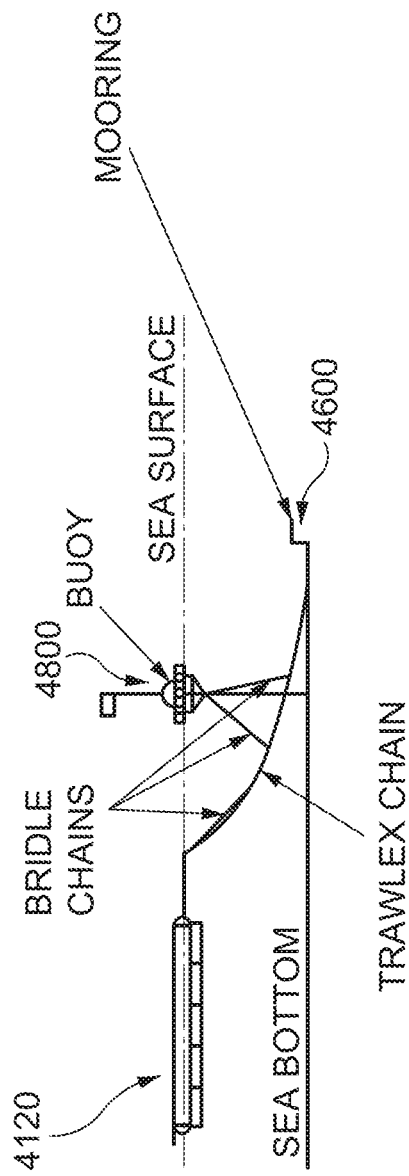
FIGS. 10A and 10B are each a side view of the aquaculture system of FIG. 9 in a growing position and a submerged position, respectively.
Figure 10B:
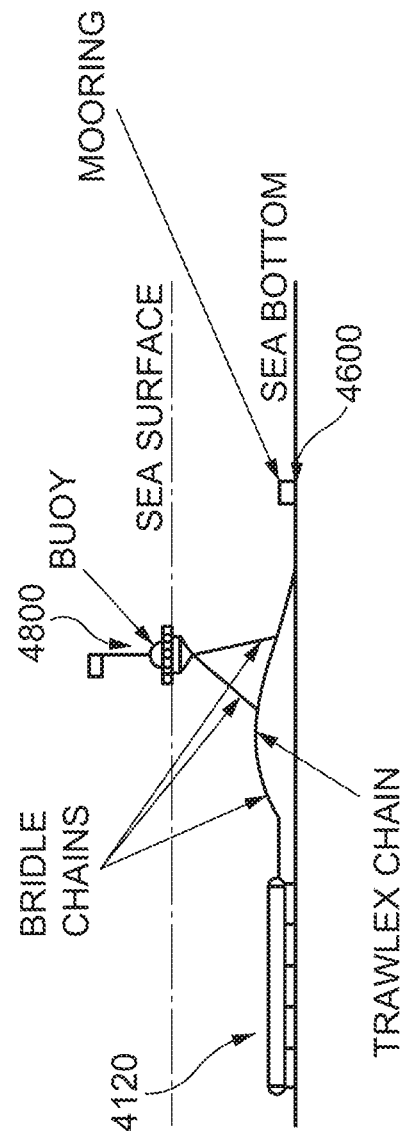

FIGS. 10A and 10B show side views of the water flow assemblies 4120 at various depths corresponding to different operating configurations. The buoyancy tanks can be filled with varying amounts of water to control the depth of the water flow assemblies 4120. For example, FIG. 10A shows the water flow assemblies 4120 in a growth configuration with the cages/pens substantially submerged (e.g., at least partially submerged below the sea surface) to increase the flow of water. FIG. 10B shows the water flow assemblies 4120 entirely or fully submerged under the surface of the water (e.g., on the sea bottom), which can be used during adverse weather conditions where the water flow assemblies 4120 can be damaged by tidal forces. The water flow assemblies 4120 can also be submerged (at least partially submerged or fully submerged) in order to protect or direct the development of the aquatic animals with regard to changing environmental conditions. In some embodiments, the aquaculture system 4000 can include a sensor configured to detect a change in water quality and relay, in response to the change in water quality, a signal to the control system 4800. In some embodiments, in response to this signal from the sensor, the control system 4800 can determine, using the processor, the memory, and/or a computer-readable media, a needed change to the orientation and/or submersion depth for the aquaculture system 4000.

FIGS. 11-20 show an aquaculture system 5000 for the cultivation of aquatic animals (e.g., animals of the phylum Mollusca) according to an embodiment. The aquaculture system 5000 can include any number of water flow systems 5100, one or more anchoring systems 5600, and one or more control systems 5800. In some embodiments, the aquaculture system 5000 and/or portions or aspects of the aquaculture system 5000 can be similar in form and/or function to any of the aquaculture systems 1000, 2000, 3000, and/or 4000 (or corresponding portions or aspects thereof) described in detail above. Accordingly, some such portions or aspects may not be described in further detail herein.

Figure 11:
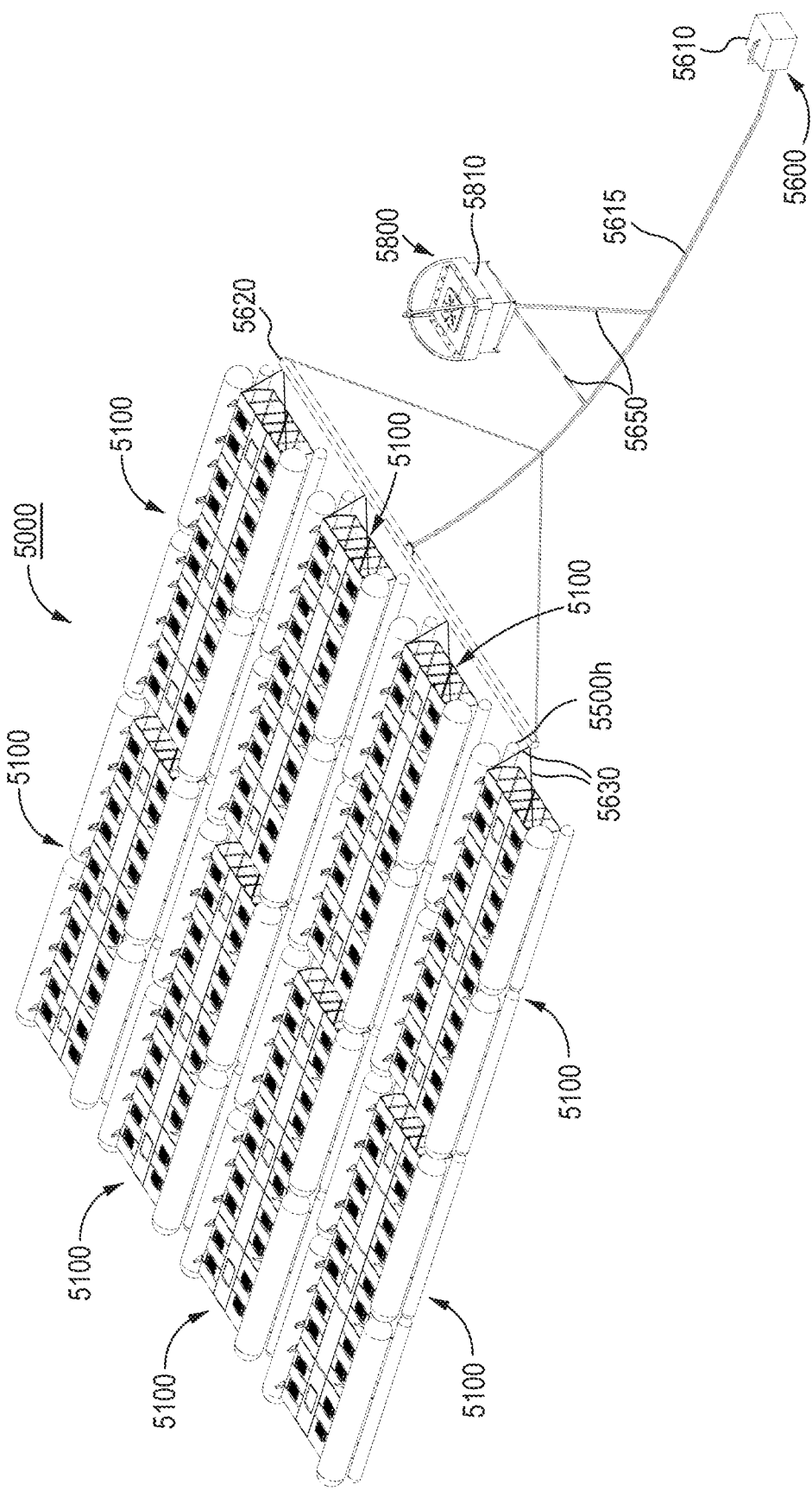
FIG. 11 is a perspective view of an aquaculture system, according to an embodiment.

As shown in FIG. 11, the aquaculture system 5000 includes a number of water flow systems 5100 that can be coupled together and/or otherwise arranged in parallel and/or in series. For example, in the embodiment shown in FIGS. 11-20, the aquaculture system 5000 includes eight water flow systems 5100, with two water flow systems 5100 coupled together and/or otherwise arranged in series to form a pair of water flow systems 5100, and with four pairs of water flow systems 5100 coupled together and/or otherwise arranged in parallel. In some embodiments, the water flow systems 5100 can be coupled together such that each water flow system 5100 can be rotated with one or more other water flow systems 5100 and/or independent of each other water flow systems 5100. For example, in some embodiments, a first water flow system 5100 and a second water flow system 5100 can be coupled together in series such that the first water flow system 5100 can be rotated independent of the second water flow system 5100 and vice versa (e.g., rotated about a longitudinal axis of the first water flow system 5100 and/or an axis common to the first and second water flow systems 5100). Moreover, in some embodiments, the first and second water flow systems 5100 (e.g., the pair of water flow systems coupled together in series) can be collectively rotated relative to the other pairs of water flow systems 5100 included in the aquaculture system 5000.

While the aquaculture system 5000 is shown in FIG. 11 as including eight water flow systems 5100 disposed in a particular arrangement, in other embodiments, the aquaculture system 5000 can include any suitable number of water flow systems 5100 arranged in any suitable manner. Moreover, each of the water flow systems 5100 included in the aquaculture system 5000 can be operably coupled to the anchoring system 5600 and the control system 5800, as described in further detail herein. In other embodiments, each water flow system 5100 can be coupled to an independent anchoring system and/or an independent control system (e.g., similar to the aquaculture system 3000 described above with reference to FIG. 8).

The water flow systems 5100 included in the aquaculture system 5000 can be any suitable shape, size, and/or configuration. In some embodiments, the water flow systems 5100 can be substantially similar in at least form and/or function to any of the water flow systems 1100 or 2100 and/or water flow assemblies 3120 or 4120 described herein. In some embodiments, the arrangement of the aquaculture system 5000 can be such that each water flow system 5100 is substantially the same. In other embodiments, the aquaculture system 5000 can include two or more different types of water flow systems and/or two or more water flow systems having different configurations. For example, in some embodiments, the aquaculture system 5000 can include one or more of water flow system 2100 and/or 5100, one or more of the water flow assemblies 3120 and/or 4120, and/or any suitable combination thereof.

As shown in FIGS. 12A-17, the water flow system 5100 includes a pen assembly 5300, a pumping mechanism 5400, and one or more buoyancy tanks 5500. The pen assembly 5300 can include any number of pens or pen portions that can be coupled together to collectively form the pen assembly 5300. As described in further detail herein, the pen assembly 5300 is configured to be coupled to the pumping mechanism 5400 and to one or more buoyancy tanks 5500 on a first side of the pen assembly 5300 and to one or more buoyancy tanks 5500 on a second side of the pen assembly 5300 opposite the first side.

Figure 12A:
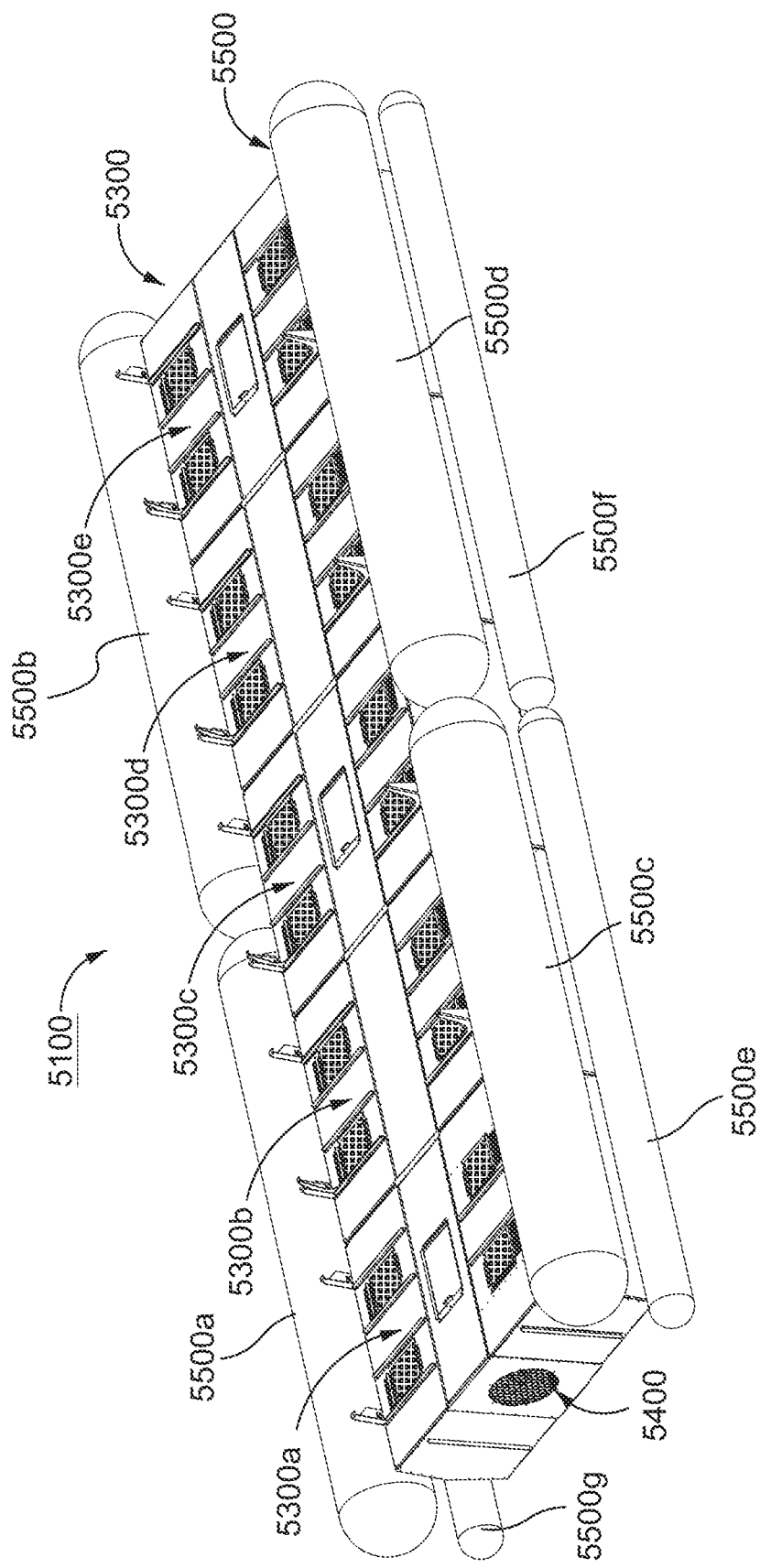
FIG. 12A is a perspective view of a water flow system included in the aquaculture system of FIG. 11.

As shown in FIG. 12A, the pen assembly 5300 includes a first pen 5300a, a second pen 5300b, a third pen 5300c, a fourth pen 5300d, and a fifth pen 5300e. The pen assembly 5300 can include a first end portion at which the first pen 5300a is disposed and a second end portion at which the fifth pen 5300e is disposed. As shown, the pens 5300a, 5300b, 5300c, 5300d, and 5300e are coupled in series and aligned such that a longitudinal axis of each pen 5300a-5300e is substantially coaxial. In other words, the pens 5300a-5300e can be coupled together and/or aligned such that a common longitudinal axis of the pen assembly 5300 extends through each of the pens 5300a-5300e.

In general, each of the pens 5300a-5300e can be formed from a relatively thin material that encloses or substantially encloses an inner volume. In some embodiments, the relatively thin material can be, for example, one or more metals, alloys, polymers, and/or composite materials including, but not limited to, aluminum, steel, stainless steel, polyethylene, polyvinyl chloride, polycarbonates, poly(methyl methacrylate), fiberglass, carbon fiber, and/or any other suitable material. In some embodiments, the material forming the pens 5300a-5300e can be coated with an anti-fouling coating to reduce unwanted growth of aquatic organisms, which can potentially restrict the flow of water through one or more portions of the pens 5300a-5300e and/or the pen assembly 5300 over time. The anti-fouling coating can be formed from various coatings including, but not limited to, silicone, Teflon, graphite, and/or the like. The materials can be chosen to reduce environmental impact and to avoid contamination of developing aquatic animals in the aquaculture system 5000.

The pens 5300a-5300e and/or a set of exterior walls forming an outer surface of the pens 5300a-5300e can have any suitable shape, size, and/or configuration. For example, in some embodiments, the pens 5300a-5300e can have a polygonal cross-sectional shape such as, but not limited to, a rectangular shape, a pentagonal shape, a hexagonal shape, a heptagonal shape, an octagonal shape, a nonagonal shape, a decagonal shape, and/or any other suitable shape. In other embodiments, the pens 5300a-5300e can have a rounded or ellipsoidal cross-sectional shape. Moreover, each of the pens 5300a-5300e can have substantially the same cross-sectional shape (e.g., as shown in FIGS. 11-17) or one or more of the pens 5300a-5300e can have a cross-sectional shape that is different from the remaining pens.

Figure 12B:
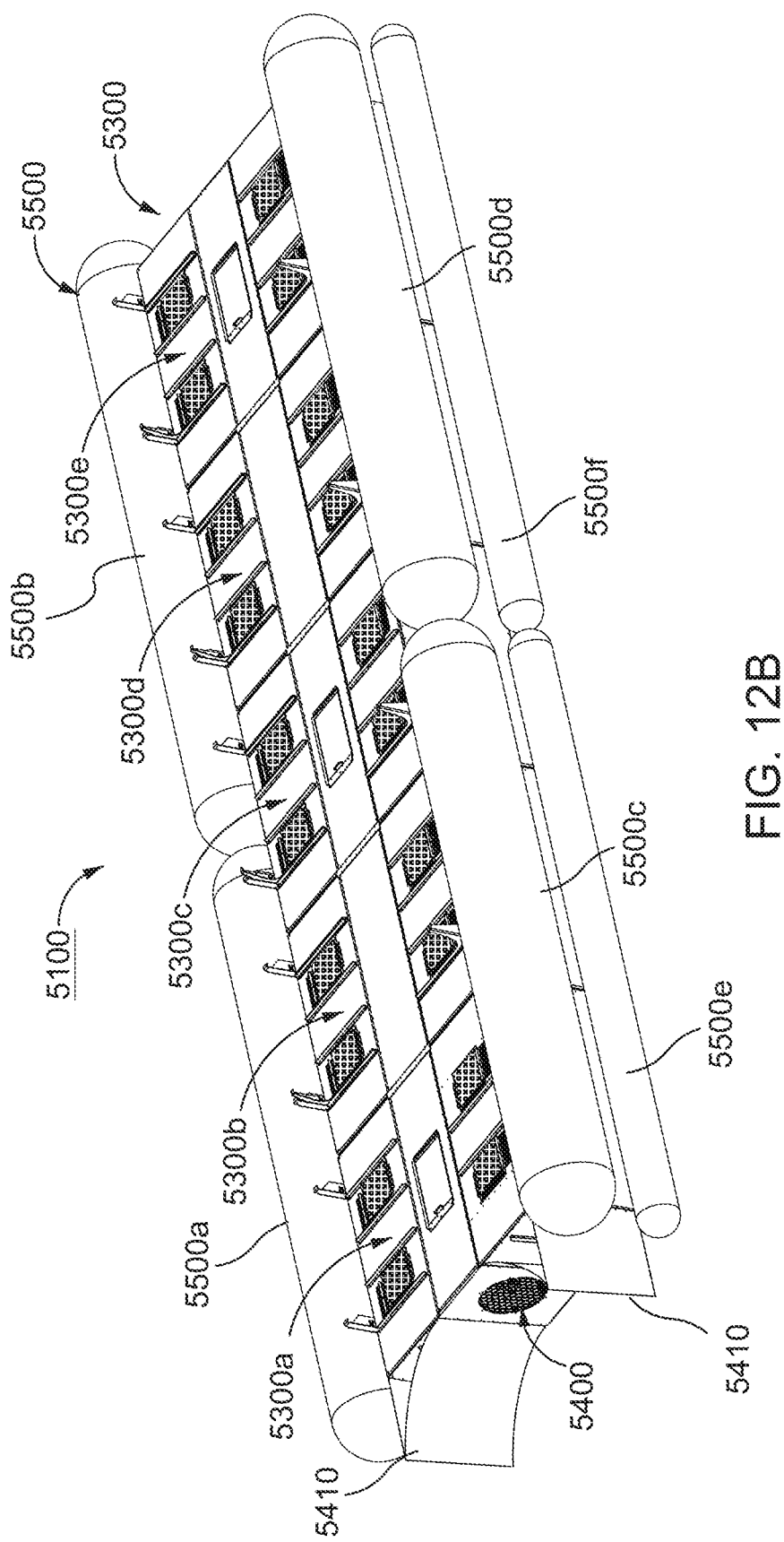
FIG. 12B is a perspective view of the water flow system of FIG. 12A including an optional shroud.
Figure 13:
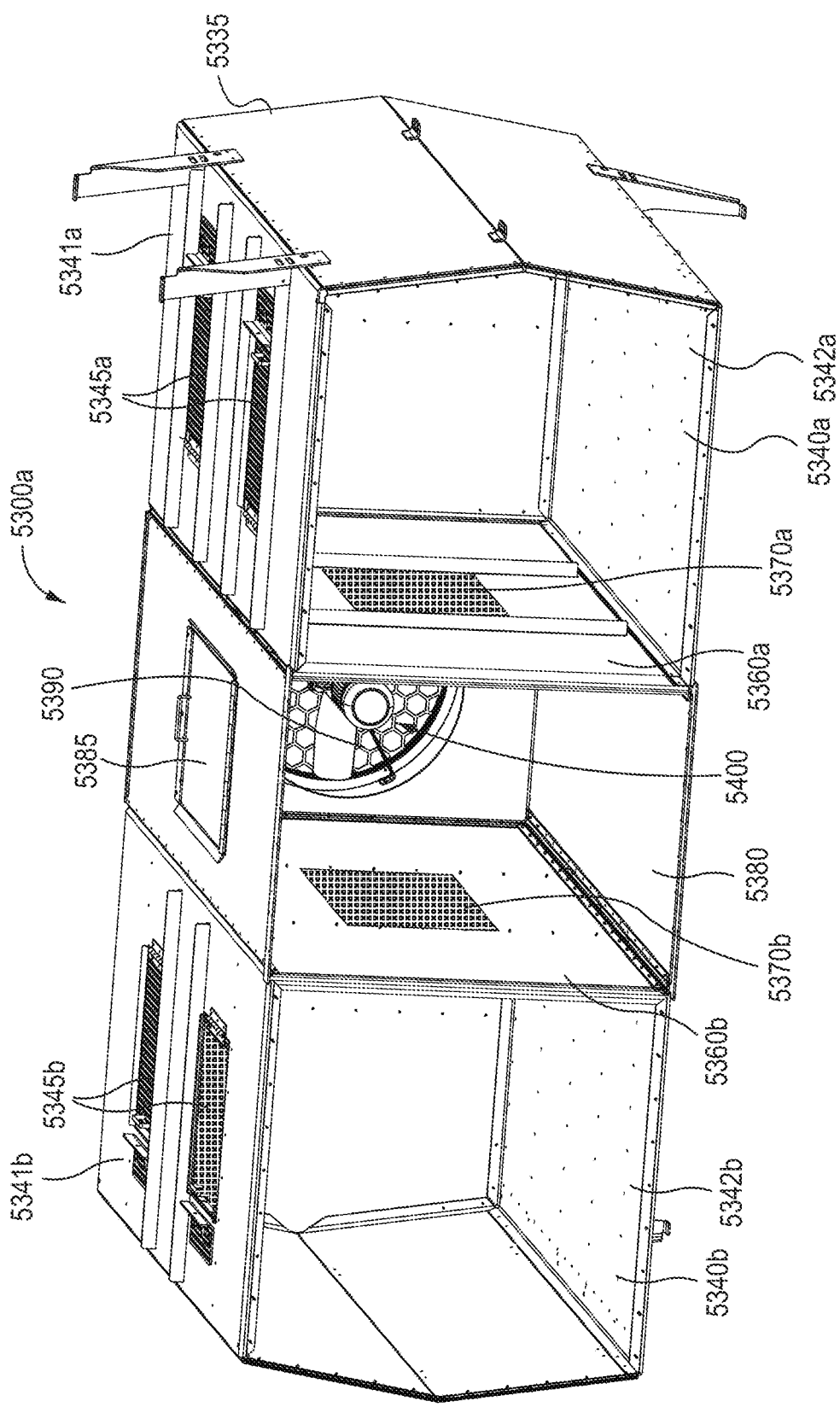
FIGS. 13-15 are a front perspective view, a rear perspective view, and a top view, respectively, of a first pen included in the water flow system of FIG. 12.
Figure 14:
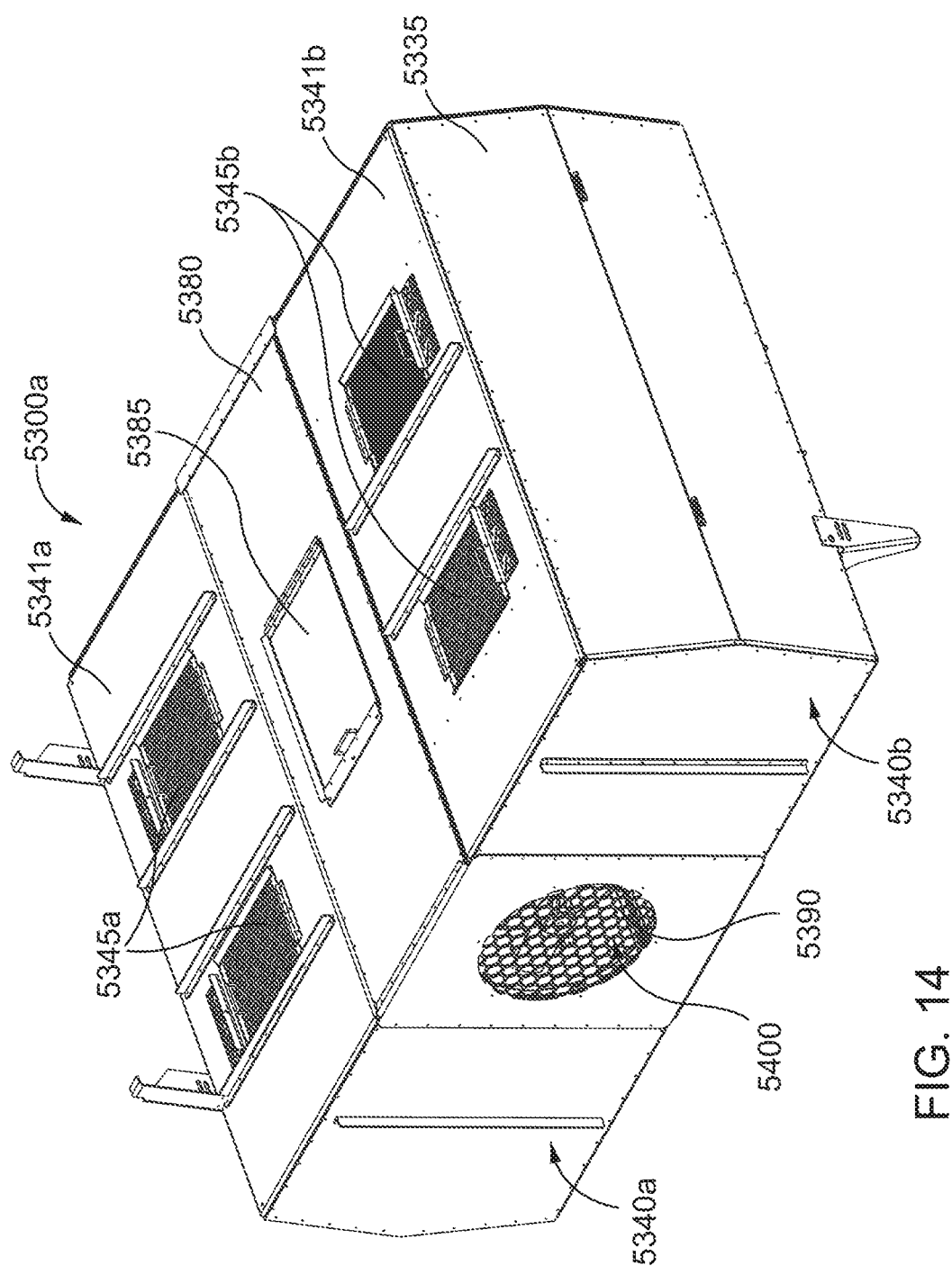
Figure 15:
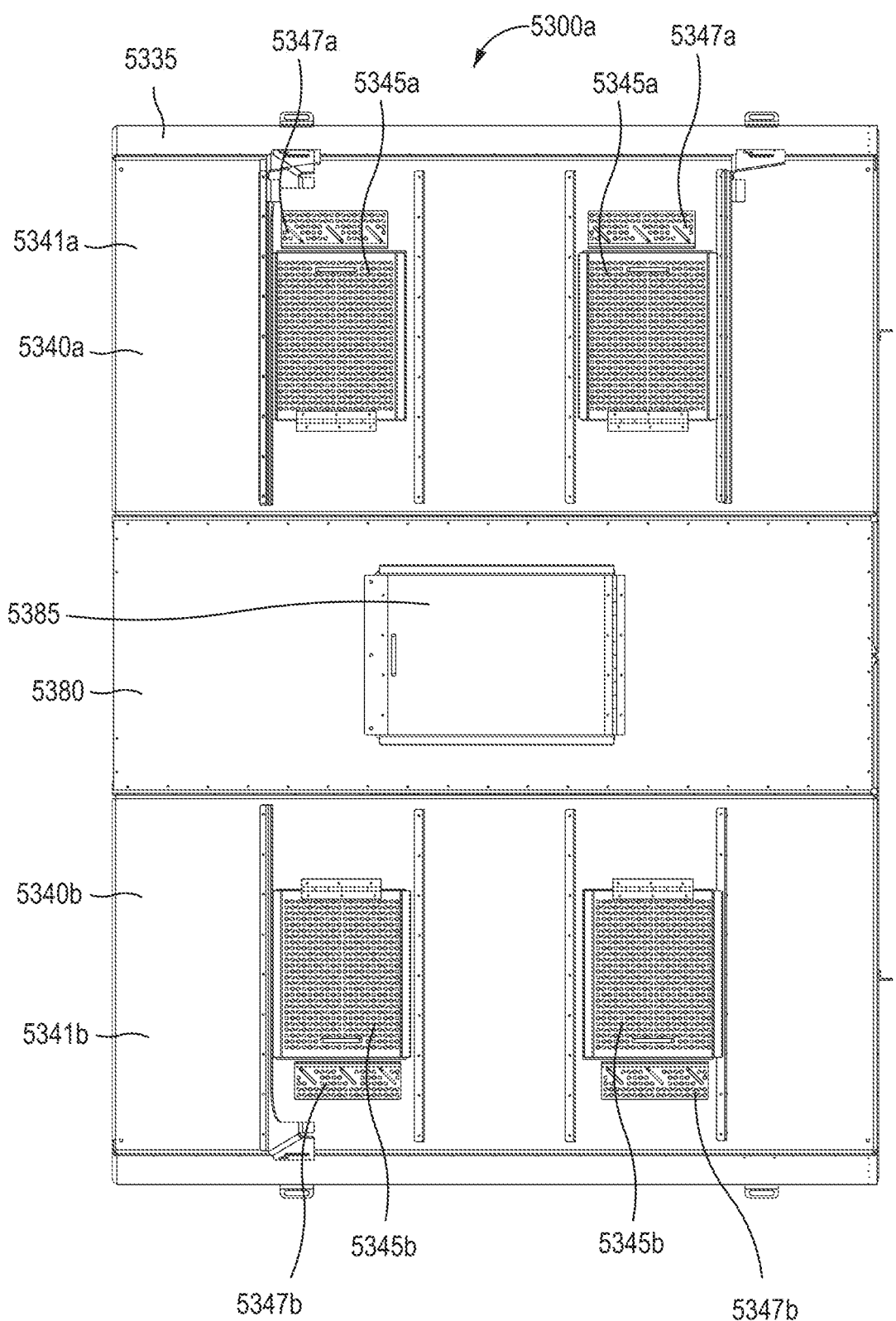

FIGS. 13-15 illustrate details of the first pen 5300a. As described above, the first pen 5300a can be disposed at, for example, the first end portion of the pen assembly 5300. As shown in FIG. 13, the first pen 5300a includes a set of exterior walls 5335 that collectively form the first pen 5300a. As described above, the exterior walls 5335 can be formed of a relatively thin material and arranged and/or formed into a desirable cross-sectional shape. For example, in the embodiment shown in FIGS. 11-20, the first pen 5300a and/or the set of exterior walls 5335 forming an outer surface of the first pen 5300a has a hexagonal cross-sectional shape.

The exterior walls 5335 define an inner volume of the first pen 5300a. In some embodiments, the first pen 5300a and/or the exterior walls 5335 of the first pen 5300a can have a monocoque construction or arrangement that can reduce or limit an amount of external structural support otherwise used to support the first pen 5300a. As shown, the first pen 5300a includes a first partition 5360a and a second partition 5360b that partition, separate, and/or otherwise form a first compartment 5340a, a second compartment 5340b, and a channel 5380 of the first pen 5300a. More specifically, the first partition 5360a and the second partition 5360b can be arranged within the first pen 5300a such that the channel 5380 is disposed between the first compartment 5340a and the second compartment 5340b. As shown in FIG. 13, each of the first compartment 5340a and the second compartment 5340b can be substantially enclosed on five sides; with a sixth side that is open. In other embodiments, the first compartment 5340a and the second compartment 5340b can be substantially enclosed on all sides. In some embodiments, the first compartment 5340a and the second compartment 5340b can be substantially the same and arranged in mirrored orientations, as shown in FIG. 13. In other embodiments, however, the first compartment 5340a can have a size, shape, and/or configuration that is different from a size, shape, and/or configuration of the second compartment 5340b.

The first compartment 5340a includes a first wall or surface 5341a (e.g., a top wall or surface) and a second wall or surface 5342a (e.g., a bottom wall or surface). More particularly, one or more portions of the exterior wall 5335 of the first pen 5300a can form the first wall or surface 5341a of the first compartment 5340a and one or more portions of the exterior wall 5335 can form the second wall or surface 5342a of the first compartment. The first wall or surface 5341a (referred to herein as the "first wall") of the first compartment 5340a can include a set of access ports 5345a. While the first compartment 5340a is shown in FIGS. 13-15 as including a set of two access ports 5345a, in other embodiments, the first compartment 5340a can include fewer than two access ports 5345a (i.e., a single access port 5345a) or more than two access ports 5345b.

The access ports 5345a are configured to provide access into the first compartment 5340a. In some instances, it may be desirable to access an inner volume of the first compartment 5340a to, for example, add or remove aquatic animals disposed therein, remove undesirable debris, perform a status check or inspection, and/or any other suitable reason. Moreover, each of the access ports 5345a can include a hatch or lid and a lock 5347a (see e.g., FIG. 15) configured to keep the hatch or lid in a closed state or configuration until an operator wishes to access the first compartment 5340a. In some embodiments, access ports 5345a and/or the hatch or lid thereof can include and/or can define any number of openings, apertures, meshes, and/or the like. In some instances, such an arrangement can facilitate movement of the hatch or lid between a closed state and/or configuration and an open state and/or configuration by allowing a volume of water or fluid that would otherwise impede movement of the hatch or lid to flow through the openings, etc.

In some embodiments, the access ports 5345a and/or the hatch or lid thereof can be configured to allow a flow of fluid into or out of the first compartment 5340a. In other words, the access ports 5345a and/or the hatch or lid thereof can be an inlet of the first compartment 5340a allowing water to flow into or out of the first compartment. In some embodiments, the access ports 5345a can be and/or can provide the only inlet(s) for the first compartment 5340a. In other embodiments, the access ports 5345a can be and/or can provide inlet(s) that are in addition to other inlets (e.g., holes, apertures, perforations, louvres, etc.) of the first compartment 5340a and thus, can be configured to increase, facilitate, and/or enhance a flow of water into or out of the first compartment 5340a. In still other embodiments, the hatch or lid of the access ports 5345a need not define the set of openings, apertures, meshes, holes, etc. In such embodiments, the first compartment 5340a can include any suitable inlet(s) other than an inlet(s) provided and/or formed by the access ports 5345a.

The second wall or surface 5342a (e.g., the bottom wall or surface) is disposed opposite the first wall 5341a and is configured to define and/or enclose a portion of the first compartment 5340a. Although not shown, in some embodiments, the second wall or surface 5342a (referred to herein as the "second wall") can include a set of openings, apertures, holes, meshes, and/or inlets configured to provide a flow of water into the first compartment 5340a. In some embodiments, the set of openings, apertures, holes, meshes, perforations, and/or inlets (referred to herein for simplicity as "inlets") included in and/or defined by the second wall 5342a can include a single inlet. In other embodiments, the set of inlets can include any number of inlets. As described above with reference to the pens 1300 and/or 2300, the inlets can have a size and/or shape that is at least partially based on a size, shape, and/or stage of development of the aquatic animals configured to be disposed within the first compartment 5340a. Similarly, the number of inlets can be at least partially based on the stage of development of the aquatic animals configured to be disposed within the first compartment 5340a and/or a desired flow rate associated with a flow of water into or out of the first compartment 5340a. In some embodiments, the inlets can be relatively small and discrete openings. In other embodiments, one or more portions of the second wall 5342a can include a mesh surface or the like, wherein a size of the mesh openings is based at least in part on a stage of development of the aquatic animals configured to be disposed in the first compartment 5340a. For example, in some embodiments, each inlet (or opening) can have a diameter between about 1.0 mm and about 30.0 mm, as described above with reference to the pen 1300. As described in further detail herein, the set of inlets included in and/or defined by the second surface 5342a can be configured to allow a flow of water into and/or out of the first compartment.

The first partition 5360a of the first pen 5300a is configured to separate and/or partition the first compartment 5340a from the channel 5380, as shown in FIG. 13. In some embodiments, the first partition 5360a can be configured to completely separate the first compartment 5340a from the channel 5380. That is to say, the first partition 5360a can form a wall that completely separates the first compartment 5340a from the channel 5380. In other embodiments, the first partition 5360a can be configured to partially partition or separate the first compartment 5340a from the channel 5380. For example, in some such embodiments, the first partition 5360a can have a height or length that is substantially less than a height or length, respectively, of the first compartment 5340a.

While the first partition 5360a is described above as separating the first compartment 5340a from the channel 5380, the first partition 5360a defines a set of openings 5370a configured to allow a flow of water or fluid between the first compartment 5340a and the channel 5380. For example, in some embodiments, the first partition 5360a can include a portion or section that forms and/or defines a mesh, one or more louvres, one or more holes, one or more apertures, one or more perforations, and/or the like. As such, the set of openings 5370a can allow water to flow between the first compartment 5340a and the channel 5380 in response to a pressure differential or force generated by the pumping mechanism 5400 and/or a current of the body of water in which the first pen 5300a is disposed, as described in further detail herein.

As described above, the second compartment 5340b can be similar to or substantially the same as the first compartment 5340a and disposed, for example, in a mirrored orientation relative to the first compartment 5340a. Accordingly, the second compartment 5340b includes a first wall or surface 5341b (e.g., a top wall or surface) and a second wall or surface 5342b (e.g., a bottom wall or surface). The first wall or surface 5341b (referred to herein as the "first wall") includes a set of access ports 5345b that can be similar to or substantially the same as the access ports 5345a described above with reference to the first wall 5341a of the first compartment 5340a. The second wall or surface 5342b (referred to herein as the "second wall") of the second compartment 5340b can include and/or define a set of inlets configured to provide a flow of water into the second compartment 5340b, as described above with reference to the second wall 5342a first compartment 5340a. The second partition 5360b is configured to separate the second compartment 5340b from the channel 5380 and includes and/or defines a set of openings 5370b (e.g., holes, apertures, perforations, louvres, etc.) configured to allow a flow of water or fluid between the second compartment 5340b and the channel 5380. In this manner, the second compartment 5340b can be structurally and/or functionally similar to the first compartment 5340a and thus, is described in further detail herein.

As shown in FIG. 13, the channel 5380 is disposed between the first compartment 5340a and the second compartment 5340b and extends, for example, between (and through) a first end and a second end of the first pen 5300a. In some embodiments, the channel 5380 can be substantially enclosed on five sides, with a sixth side that is open to, for example, a channel of the second pen 5300b. As shown in FIGS. 13-16, a portion of the exterior wall 5335 forming the channel 5380 includes and/or can define an access port 5385. As described above with reference to the access ports 5345a and 5345b, the access port 5385 can be configured to provide an operator with access to the channel 5380. Accordingly, in some embodiments, the access port 5385 can be similar in at least form and/or function to the access ports 5345a and/or 5345b and thus, is not described in further detail herein.

As shown in FIGS. 13 and 14, the arrangement of the first pen 5300a is such that the pumping mechanism 5400 is coupled to a wall defining a portion of the channel 5380. In other words, the pumping mechanism 5400 is coupled to the first pen 5300a and is in fluid communication with the channel 5380. The pumping mechanism 5400 can be coupled to a wall or surface of the first pen 5300a, which in turn, defines a set of openings 5390. In some embodiments, the first pen 5300a can include any suitable structure, feature, channel, flange, funnel, shroud, and/or the like that can be configured to direct and/or otherwise facilitate a flow of water toward and/or into the openings 5390 and the pump mechanism 5400. For example, the first pen 5300a can include a shroud 5410 (or a set of shrouds) that is coupled to and/or formed at an end portion of the first pen 5300a, as shown in FIG. 12B. As such, the pumping mechanism 5400 can placed in any suitable number of operating states and/or conditions that facilitate a flow of water into or out of the channel 5380 via the set of openings 5390, as described in further detail herein.

Figure 16:
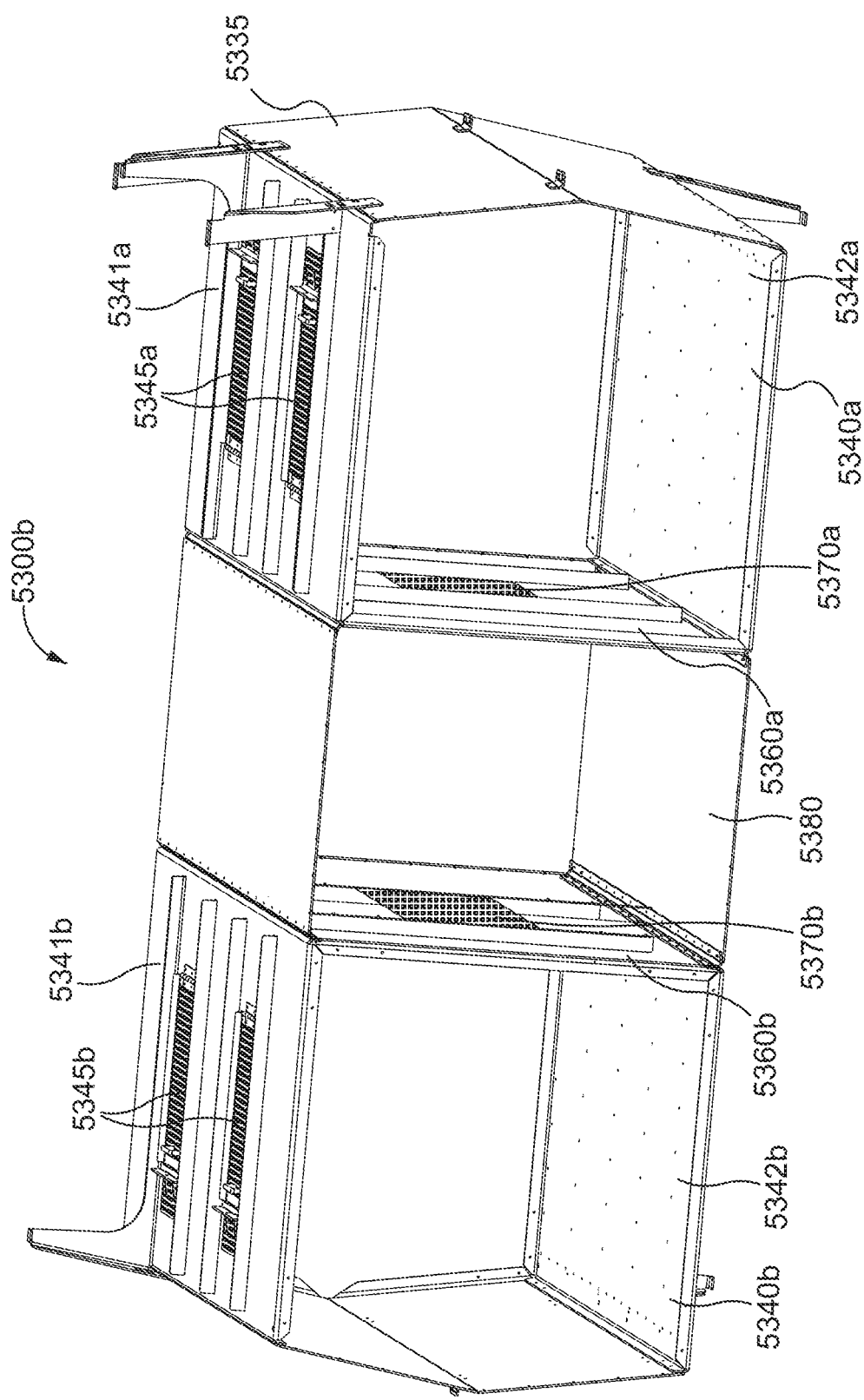
FIG. 16 is a front perspective view of a second pen included in the water flow system of FIG. 12.

FIG. 16 illustrates details of the second pen 5300b. In some embodiments, portions and/or aspects of the second pen 5300b can be similar to and/or substantially the same as corresponding portions and/or aspects of the first pen 5300a. Accordingly, such similar portions and/or aspects may be identified below but not described in further detail. As shown in FIG. 16, the second pen 5300b includes a set of exterior walls 5335 that collectively form the second pen 5300b. As described above, the exterior walls 5335 can be formed of a relatively thin material and arranged and/or formed into a cross-sectional shape similar to or substantially the same as the cross-sectional shape of the first pen 5300a.

The exterior walls 5335 of the second pen 5300b define an inner volume thereof. In some embodiments, the second pen 5300b and/or the exterior walls 5335 of the second pen 5300b can have a monocoque construction or arrangement that can reduce or limit an amount of external structural support otherwise used to support the second pen 5300b. As shown, the second pen 5300b includes a first partition 5360a and a second partition 5360b that partition, separate, and/or otherwise form a first compartment 5340a, a second compartment 5340b, and a channel 5380 of the second pen 5300b. In some embodiments, the first compartment 5340a and the second compartment 5340b of the second pen 5300b can be substantially similar in form and/or function to the first compartment 5340a and the second compartment 5340b, respectively, of the first pen 5300a. For example, as shown in FIG. 16, each of the compartments 5340a and 5340b of the second pen 5300b can be substantially enclosed on five sides; with a sixth side that is open. In some embodiments, the second pen 5300b can be coupled to the first pen 5300a such that a portion of the exterior walls 5335 of the second pen 5300b is disposed between the compartments 5340a and 5340b of the first pen 5300a and the compartments 5340*a* and 5340*b* of the second pen 5300*b*. In such embodiments, forming compartments 5340*a* and 5340*b* to be open on a side adjacent to the second pen 5300*b* can allow for a reduction in an amount of material used to form the pen assembly 5300. In other words, the first pen 5300*a* and the second pen 5300*b* can be arranged such that when the pens 5300*a* and 5300*b* are coupled, there is a single wall or wall thickness disposed between the compartments of the respective pens.

As shown in FIG. 16, the first compartment 5340*a* of the second pen 5300*b* includes a first wall or surface 5341*a* (e.g., a top wall or surface) and a second wall or surface 5342*a* (e.g., a bottom wall or surface). The first wall or surface 5341*a* (referred to herein as the "first wall") of the first compartment 5340*a* can include a set of access ports 5345*a*. While the first compartment 5340*a* of the second pen 5300*b* is shown as including a set of two access ports 5345*a*, in other embodiments, the first compartment 5340*a* can include fewer than two access ports 5345*a* (i.e., a single access port 5345*a*) or more than two access ports 5345*a*. Moreover, the access ports 5345*a* can be similar to or substantially the same as the access ports 5345*a* of the first compartment 5340*a* of the first pen 5300*a*. Thus, the access ports 5345*a* are not described in further detail herein.

As shown in FIG. 16, the second wall or surface 5342*a* (e.g., the bottom wall or surface) is disposed opposite the first wall 5341*a* and is configured to define and/or enclose a portion of the first compartment 5340*a* of the second pen 5300*b*. Although not shown, in some embodiments, the second wall or surface 5342*a* (referred to herein as the "second wall") can include a set of inlets configured to provide a flow of water into the first compartment 5340*a* of the second pen 5300*b* (e.g., instead of or in addition to inlets provided by the access ports 5345*a*). The set of inlets included in and/or defined by the second wall 5342*a* can include a single inlet or opening or can include multiple inlets or openings. The set of inlets included in and/or defined by the second surface 5342*a* can be configured to allow a flow of water into and/or out of the first compartment 5340*a* of the second pen 5300*b*, as described in further detail herein.

As described above with reference to the first compartment 5340*a* of the first pen 5300*a*, the number of the inlets and/or a size and/or shape of the inlets can be at least partially based on a size, shape, and/or stage of development of the aquatic animals configured to be disposed within the first compartment 5340*a* of the second pen 5300*b*. Moreover, the number, size, and/or shape of the inlets of the first compartment 5340*a* of the second pen 5300*b* can be similar to or different than the number, size, and/or shape of the inlets of the compartments 5340*a* and 5340*b* of the first pen 5300*a*. In some such embodiments, providing a different number, size, and/or shape of the inlets of the compartment 5340*a* and 5340*b* of the second pen 5300*b* can allow the first pen 5300*a* and the second pen 5300*b* to contain aquatic animals at different stages of development.

The first partition 5360*a* of the second pen 5300*b* is configured to separate and/or partition the first compartment 5340*a* from the channel 5380, as shown in FIG. 16. In some embodiments, the first partition 5360*a* can be configured to separate the first compartment 5340*a* from the channel 5380 in substantially the same manner as described above with reference to the first pen 5300*a*. As shown, the first partition 5360*a* of the second pen 5300*b* defines a set of openings 5370*a* configured to allow a flow of water or fluid between the first compartment 5340*a* and the channel 5380. Accordingly, the first compartment 5340*a* of the second pen 5300*b* can be substantially similar in form and/or function to the first compartment 5340*a* of the first pen 5300*a*.

The second compartment 5340*b* of the second pen 5300*b* can be similar to or substantially the same as the first compartment 5340*a* of the second pen 5300*b* and disposed, for example, in a mirrored orientation relative to the first compartment 5340*a*. Accordingly, the second compartment 5340*b* includes a first wall or surface 5341*b* (e.g., a top wall or surface) and a second wall or surface 5342*b* (e.g., a bottom wall or surface). The first wall or surface 5341*b* (referred to herein as the "first wall") includes a set of access ports 5345*b* that can be similar to or substantially the same as the access ports 5345*a* described above with reference to the first wall 5341*a* of the first compartment 5340*a* of the second pen 5300*b*. The second wall or surface 5342*b* (referred to herein as the "second wall") can include and/or define a set of inlets configured to provide a flow of water into and/or out of the second compartment 5340*b*, as described above with reference to the first compartment 5340*a* of the second pen 5300*b*. The second partition 5360*b* is configured to separate the second compartment 5340*b* from the channel 5380 and includes and/or defines a set of openings 5370*b* configured to allow a flow of water or fluid between the second compartment 5340*b* and the channel 5380. In this manner, the second compartment 5340*b* can be structurally and/or functionally similar to the first compartment 5340*a* and thus, is not described in further detail herein.

As shown in FIG. 16, the channel 5380 of the second pen 5300*b* is disposed between the first compartment 5340*a* and the second compartment 5340*b* and extends, for example, between (and through) a first end and a second end of the second pen 5300*b*. In some embodiments, the channel 5380 can be substantially enclosed on four sides, with a fifth side that is open to the channel 5380 of the first pen 5300*a* (when coupled thereto) and a sixth side that is open to, for example, a channel of the third pen 5300*c* (when coupled thereto). While the first pen 5300*a* is described above as including the access port 5385, the second pen 5300*b* does not include an access port (see FIG. 16). In other embodiments, however, the second pen 5300*b* can include an access port that is similar in form and/or function to the access port 5385 described above with reference to the first pen 5300*a*. Moreover, while the first pen 5300*a* is described above as being coupled to the pumping mechanism 5400, the second pen 5300*b* is not coupled to and/or does not otherwise include the pumping mechanism 5400. As such, the open ends of the channel 5380 of the second pen 5300*b* allow water to flow into or out of the channel 5380 of the second pen 5300*b*, as described in further detail herein.

Figure 17:
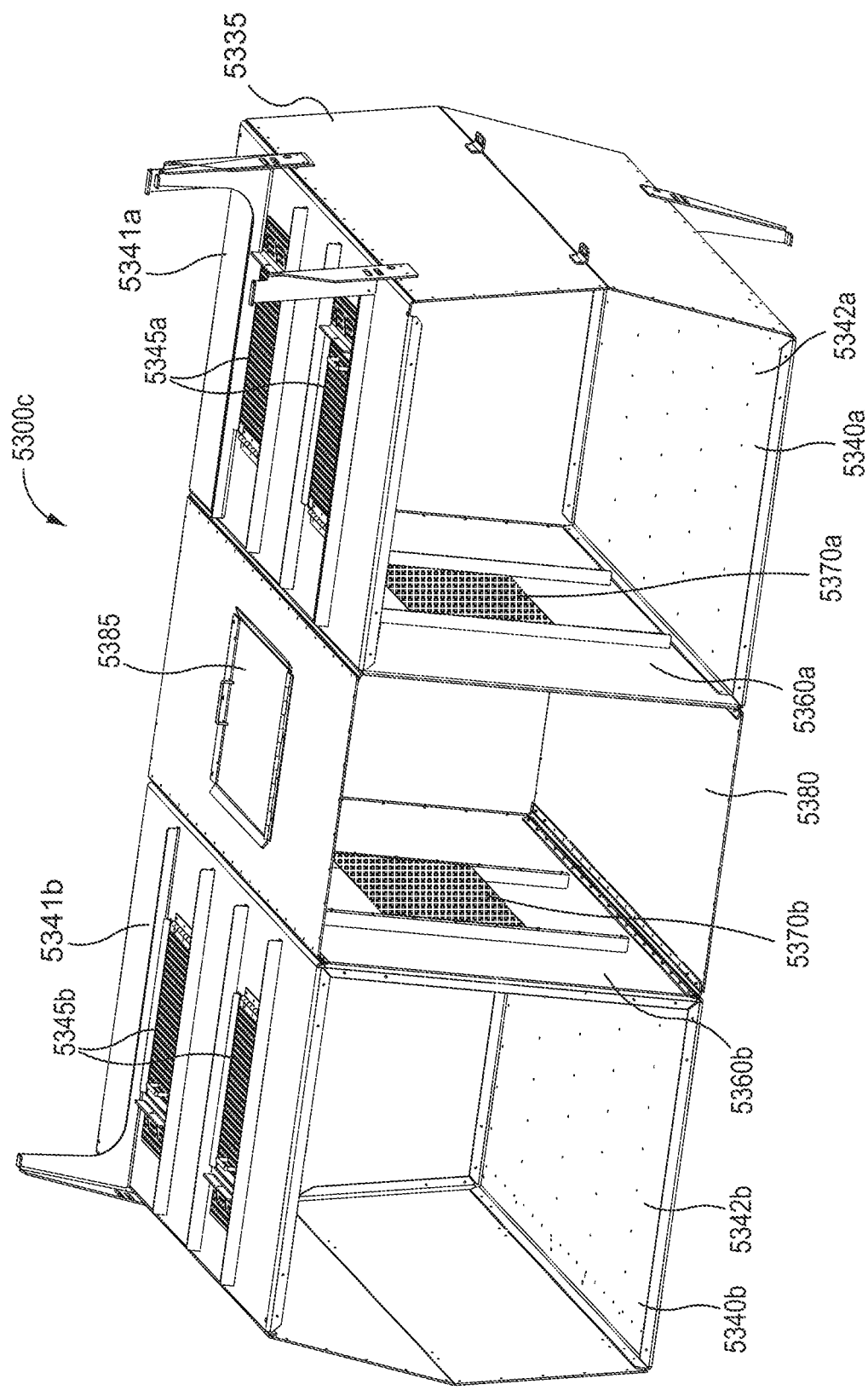
FIG. 17 is a front perspective view of a third pen included in the water flow system of FIG. 12.

FIG. 17 illustrates details of the third pen 5300*c*. In some embodiments, portions and/or aspects of the third pen 5300*c* can be similar to and/or substantially the same as corresponding portions and/or aspects of the first pen 5300*a* and/or the second pen 5300*b*. Accordingly, such similar portions and/or aspects may be identified below but not described in further detail. As shown in FIG. 17, the third pen 5300*c* includes a set of exterior walls 5335 that collectively form the third pen 5300*c*. As described above, the exterior walls 5335 can be formed of a relatively thin material and arranged and/or formed into a cross-sectional shape similar to or substantially the same as the cross-sectional shape of the first pen 5300*a*.

The exterior walls 5335 of the third pen 5300*c* define an inner volume thereof. In some embodiments, the third pen 5300*c* and/or the exterior walls 5335 of the third pen 5300*c* can have a monocoque construction or arrangement that can reduce or limit an amount of external structural support otherwise used to support the third pen 5300c. As shown, the third pen 5300c includes a first partition 5360a and a second partition 5360b that partition, separate, and/or otherwise form a first compartment 5340a, a second compartment 5340b, and a channel 5380 of the third pen 5300c. In some embodiments, the first compartment 5340a and the second compartment 5340b of the third pen 5300c can be substantially similar in form and/or function to the first compartment 5340a and the second compartment 5340b, respectively, of the second pen 5300b. For example, as shown in FIG. 17, each of the compartments 5340a and 5340b of the third pen 5300c can be substantially enclosed on five sides; with a sixth side that is open. In some embodiments, the third pen 5300c can be coupled to the second pen 5300b such that a portion of the exterior walls 5335 of the third pen 5300c is disposed between the compartments 5340a and 5340b of the third pen 5300c and the compartments 5340a and 5340b, respectively, of the second pen 5300b, as described above with reference to the exterior wall 5335 the second pen 5300b.

The first compartment 5340a of the third pen 5300c includes a first wall or surface 5341a (e.g., a top wall or surface) and a second wall or surface 5342a (e.g., a bottom wall or surface). The first wall or surface 5341a (referred to herein as the "first wall") of the first compartment 5340a can include a set of access ports 5345a. The access ports 5345a can be similar to or substantially the same as the access ports 5345a of the first compartment 5340a of the first pen 5300a and/or the second pen 5300b. Thus, the access ports 5345a of the first compartment 5340a of the third pen 5300c are not described in further detail herein.

As shown in FIG. 17, the second wall or surface 5342a (e.g., the bottom wall or surface) is disposed opposite the first wall 5341a and is configured to define and/or enclose a portion of the first compartment 5340a of the third pen 5300c. Although not shown, in some embodiments, the second wall or surface 5342a (referred to herein as the "second wall") can include a set of inlets. The set of inlets included in and/or defined by the second wall 5342a can include a single inlet or opening or can include multiple inlets or openings. The set of inlets included in and/or defined by the second surface 5342a can be configured to allow a flow of water into and/or out of the first compartment 5340a of the third pen 5300c (e.g., instead of or in addition to inlets provided by the access ports 5345a), as described in further detail herein.

The first partition 5360a of the third pen 5300c is configured to separate and/or partition the first compartment 5340a from the channel 5380, as shown in FIG. 17. In some embodiments, the first partition 5360a can be configured to separate the first compartment 5340a from the channel 5380 in substantially the same manner as described above with reference to the first pen 5300a and/or the second pen 5300b. As shown, the first partition 5360a of the third pen 5300c defines a set of openings 5370a configured to allow a flow of water or fluid between the first compartment 5340a and the channel 5380. Accordingly, the first compartment 5340a of the third pen 5300c can be substantially similar in form and/or function to the first compartments 5340a of the first pen 5300a and/or the second pen 5300b.

The second compartment 5340b of the third pen 5300c can be similar to or substantially the same as the first compartment 5340a of the third pen 5300c and disposed, for example, in a mirrored orientation relative to the first compartment 5340a. Accordingly, the second compartment 5340b includes a first wall or surface 5341b (e.g., a top wall or surface) and a second wall or surface 5342b (e.g., a bottom wall or surface). The first wall or surface 5341b (referred to herein as the "first wall") includes a set of access ports 5345b that can be similar to or substantially the same as the access ports 5345a described above with reference to the first wall 5341a of the first compartment 5340a of the third pen 5300a. The second wall or surface 5342b (referred to herein as the "second wall") can include and/or define a set of inlets configured to provide a flow of water into and/or out of the second compartment 5340b, as described above with reference to the first compartment 5340a of the third pen 5300c. The second partition 5360b is configured to separate the second compartment 5340b from the channel 5380 and includes and/or defines a set of openings 5370b configured to allow a flow of water or fluid between the second compartment 5340b and the channel 5380. In this manner, the second compartment 5340b can be structurally and/or functionally similar to the first compartment 5340a and thus, is not described in further detail herein.

As shown in FIG. 17, the channel 5380 of the third pen 5300c is disposed between the first compartment 5340a and the second compartment 5340b and extends, for example, between (and through) a first end and a second end of the third pen 5300c. In some embodiments, the channel 5380 can be substantially enclosed on four sides, with a fifth side that is open to the channel 5380 of the second pen 5300b (when coupled thereto) and a sixth side that is open to, for example, a channel of the fourth pen 5300d (when coupled thereto). As described above with reference to the first pen 5300a, the third pen 5300c includes an access port 5385 configured to provide an operator with access to the channel 5380 of the third pen 5380. In some embodiments, the access port 5385 can be similar in at least form and/or function to the access port 5385 of the first pen 5300a and thus, is not described in further detail herein. In other embodiments, however, the third pen 5300c need not include an access port, as described above with reference to the second pen 5300b. Moreover, the third pen 5300c is not coupled to and/or does not otherwise include the pumping mechanism 5400, as described above with reference to the second pen 5300b. As such, the open ends of the channel 5380 of the third pen 5300c allow water to flow into or out of the channel 5380 of the third pen 5300c, as described in further detail herein.

Referring back to FIGS. 11-12B, the pen assembly 5300 also includes the fourth pen 5300d and the fifth pen 5300e. The fourth pen 5300d is coupled to the third pen 5300c and the fifth pen 5300e. In some embodiments, the fourth pen 5300d can be similar to and/or substantially the same as the second pen 5300b and thus, is not described in further detail herein. The fifth pen 5300e is coupled to the fourth pen 5300d and is disposed, for example, at the second end portion of the pen assembly 5300 (as described above). In some embodiments, the fifth pen 5300e can be similar to and/or substantially the same as the third pen 5300c and thus, portions and/or aspects of the fifth pen 5300e are not described in further detail herein.

The fifth pen 5300e can differ from the third pen 5300c, however, in that the compartments formed by the fifth pen 5300e are enclosed on all sides (e.g., the fifth pen 5300e is not formed with an open side). Similarly, the channel of the fifth pen 5300e is enclosed at an end opposite the fourth pen 5300d (see FIG. 11). In other embodiments, the fifth pen 5300e can include a pumping mechanism (e.g., similar to or the same as the pumping mechanism 5400 coupled to the first pen 5300a) disposed in the channel of the fifth pen 5300a and a wall otherwise enclosing the end of the channel can define a set of pump openings. In such embodiments, the fifth pen 5300e can be similar in form and/or function to the first pen 5300a. Moreover, in some such embodiments, the fifth pen 5300e may optionally include a shroud and/or any other suitable feature or structure configured to direct and/or facilitate a flow of water toward the pumping mechanism disposed within the channel of the fifth pen 5300e (e.g., as described above with reference to FIG. 12B).

In some embodiments, the arrangement and/or construction of the pens 5300a-5300e can allow for a substantially modular arrangement and/or configuration of the pen assembly 5300. For example, in some embodiments, the pen assembly 5300 can include one or more additional pens that are structurally and/or functionally similar to, for example, the second pen 5300b and/or the third pen 5300c. In other embodiments, the pen assembly 5300 can include few pens, for example, by not including one or more of the pens 5300b, 5300c, and/or 5300d.

As shown in FIGS. 12A-14, the pumping mechanism 5400 of the water flow system 5100 is coupled to the first pen 5300a. The pumping mechanism 5400 can be used to generate a flow of water through at least a portion of the water flow system 5100, which in turn, can continuously replenish nutrient-rich water for the developing aquatic animals. Based on the dimensions and geometry of the pen assembly 5300, the pumping mechanism 5400 can be configured to generate a pressure differential such that the flow rate of water in the pen assembly 5300 results in improved growth rates for a majority of aquatic animals in the pen assembly 5300. As described in further detail herein, the pumping mechanism 5400 can be operably coupled to the control system 5800, which in turn, can be configured to provide a flow of electrical power and/or one or more operating signals to the pumping mechanism 5400 to place the pumping mechanism 5400 in a desired operating state and/or condition.

As shown, the pumping mechanism 5400 is coupled to a portion of the exterior walls 5335 of the first pen 5300a and aligned with and/or otherwise disposed adjacent to the pump openings 5390 defined by the portion of the exterior walls 5335 of the first pen 5300a. In some embodiments, the pumping mechanism 5400 can be disposed within the channel 5380 of the first pen 5300a and adjacent to the pump openings 5390. In some embodiments, the first pen 5300a can include one or more features, structures, components, mechanisms, valves, etc. configured to at least partially control a flow of water through the pump openings 5390. For example, in some embodiments, the first pen 5300a can include and/or can form the shroud 5410 (see FIG. 12B) that is configured to direct a flow of water toward the pump openings 5390. In some embodiments, the shroud 5410 can be, for example, one or more angled or curved surfaces configured to direct or funnel a flow of water outside of the pen assembly 5300. The shroud 5410 can partially surround a perimeter of the pump openings 5390 (as shown in FIG. 12B) or can surround the entire perimeter of the pump openings 5390. In some embodiments, the shroud 5410 can include a substantially smooth and/or uniform surface(s). In other embodiments, one or more surfaces of the shroud 5410 can include and/or define a channel, slot, groove, protrusion, ridge, flange, etc. configured to further enhance a flow of water toward the pump openings 5390. While an example of the shroud 5410 is shown in FIG. 12B, it should be understood that it is presented by way of example only and not limitation. Accordingly, the first pen 5300a can include any structure and/or feature having any suitable shape, size, and/or arrangement that facilitates and/or enhances a flow of water toward and/or into the pump openings 5390 (e.g., whether in response to a pressure differential generated by the pumping mechanism 5400 and/or in response to the natural current of the water).

In some embodiments, the first pen 5300a can include a set of louvres, fins, features, structures, etc. that at least partially occlude the set of pump openings 5390. In some instances, when the pumping mechanism 5400 is disposed within the channel 5380 and in a configuration in which a flow of water is flowing out of the pen assembly 5300 via the pumping mechanism 5400 and the pump openings 5390, such an arrangement can allow the water to flow out of the pen assembly 5300 while limiting an amount or flow of water into the pen assembly 5300 via at least some of the pump openings 5390. In some embodiments, the pumping mechanism 5400 and/or the first pen 5300a can include a device, mechanism, feature, etc. configured to selectively allow a flow of water through the pump openings 5390. For example, the first pen 5300a can include a set of louvres or the like (as described above) that can be adjustable to increase or decrease a size of a corresponding set of the pump openings 5390. Each louvre in the set of louvres can be connected to a mechanism (e.g., a motor, machine, a rack and/or kinematic linkage, and/or the like) configured to transition that louvre between a substantially closed state, in which the louvres collectively block or occlude the pump openings 5390, and a substantially open state, in which the louvres allow access to the openings 5390 (e.g., the louvres can be substantially perpendicular or normal to a surface of the first pen 5300 that defines the set of pump openings 5390). In some implementations, each louvre can be controlled and/or transitioned independently or the set of louvres can be controlled and/or transitioned collectively. Moreover, the set of louvres and/or the transitioning of the set of louvres can be controlled, for example, by at least a portion of the control system 5800, as described in further detail herein.

While the pumping mechanism 5400 is described above as being disposed in the channel 5380 of the first pen 5300a, in other embodiments, the pumping mechanism 5400 and/or at least a portion thereof can be coupled to an exterior surface of the first pen 5300a and thus, can be disposed, at least in part, outside of the first pen 5300a. In such embodiments, the first pen 5300a can include any suitable structure, feature, mechanism, device, etc. that can facilitate and/or direct a flow of water toward and/or into the pumping mechanism 5400 and/or the pump openings 5390 defined by the first pen 5300a.

The pumping mechanism 5400 can be any suitable pump or flow generator including, but not limited to, one or more rotary pumps, one or more reciprocating pumps, one or more centrifugal pumps, one or more paddle wheel systems, one or more propellers or impellers, and/or the like. In other embodiments, the pumping mechanism 5400 can be any suitable machine, device, system, and/or feature configured to generate a pressure differential operable to cause a fluid (e.g., water) to flow from an area of relatively higher pressure to an area of relatively lower pressure. Moreover, the arrangement and/or configuration of the pumping mechanism 5400 can be such that the pumping mechanism 5400 remains operational when completely submerged or only partially submerged in a body of water.

The pump mechanism 5400 can be transitioned between one or more operating states to generate a flow of water (1) from a volume outside of the pen assembly 5300 into the channel 5380 of the first pen 5300a and/or (2) from the channel 5380 of the first pen 5300a to the volume outside of the pen assembly 5300. Moreover, with the channels 5380 of the pens 5300*a*-5300*e* being substantially open to one another, the pumping mechanism 5400 can be configured to generate a flow of water through the pen assembly 5300 via at least the channel 5380 of each pen 5300*a*-5300*e*. In some embodiments, the pumping mechanism 5400 can be configured to transition between two or more operating states based on a flow of electric power and/or one or more control signals received from the control system 5800. For example, in some embodiments, the pumping mechanism 5400 can have at least a first operating state or configuration in which the pumping mechanism 5400 generates a flow of water into the pen assembly 5300 in a first direction (e.g., an upweller configuration), a second operating state or configuration in which the pumping mechanism 5400 generates a flow of water into the pen assembly 5300 in a second direction opposite the first direction (e.g., a downweller configuration), and a third operating state or configuration in which the pumping mechanism 5400 is in a substantially "powered off" configuration, thereby not generating a flow of water into the pen assembly 5300, as described in further detail herein.

While the water flow system 5100 is generally described above as including only the pumping mechanism 5400 coupled to the first pen 5300*a*, in other embodiments, the water flow system 5100 can include one or more additional pumping mechanisms 5400 that can be substantially similar to the pumping mechanism 5400 coupled to the first pen 5300*a*. For example, in some embodiments, a second pumping mechanism can be coupled to, for example, the fifth pen 5300*e*. In such embodiments, the second pumping mechanism can be disposed within the channel of the fifth pen 5300*e* and adjacent to a set of pump openings defined by the fifth pen 5300*e*. Although not shown, the fifth pen 5300*e* can include any suitable structure, feature, component, device, mechanism, etc. configured to direct a flow of water toward the pump openings of the fifth pen 5300*e* and/or to selectively control allow a flow of water into and/or through the pump openings of the fifth pen 5300*e* such as, for example, any of those described above with reference to the first pen 5300*a*.

In some implementations, including a pumping mechanism at each end portion of the water flow system 5100 can ensure that a suitable flow of water is provided into and/or through the pen assembly 5300 regardless of the natural current of the body of water in which the water flow system 5100 is disposed. Moreover, the pumping mechanisms can be configured to operate independently, in which one pumping mechanism provides a flow of water through the pen assembly 5300 while the other pumping mechanism is in a powered off state, or collectively, in which each pumping mechanism provides a flow of water through the pen assembly 5300, as described in further detail herein.

While the water flow system 5100 is described as being implemented with a single pumping mechanism 5400 or with two pumping mechanism 5400, it should be understood that the water flow system 5100 can include any number of pumping mechanisms 5400. For example, in some implementations, a pumping mechanism 5400 can be coupled to any or all of the pens 5300*a*, 5300*b*, 5300*c*, 5300*d*, and/or 5300*e*.

The water flow system 5100 includes one or more buoyancy tanks 5500 coupled to the pen assembly 5300 and configured to provide floatation for the water flow system 5100. The one or more buoyancy tanks 5500 can be coupled to the pen assembly 5300 in any suitable manner and/or in any suitable arrangement such as any of those described herein. For example, in some embodiments, the buoyancy tanks 5500 can be rigidly and/or fixedly coupled to the pen assembly 5300 via any suitable mounting hardware, brackets, frames, structures, welds, brazes, adhesives, and/or the like. In some embodiments, the buoyancy tanks 5500 can be flexibly coupled to the pen assembly 5300 that can allow for a desired amount of relative movement between the buoyancy tanks 5500 and the pen assembly 5300. In some embodiments, the buoyancy tanks 5500 can be removably coupled to the pen assembly 5300, which in some instances can allow for replacement of one or more buoyancy tanks 5500 in the event of damage. In other instances, removably coupling the buoyancy tanks 5500 to the pen assembly 5300 can result in a modular arrangement and/or configuration that can allow an operator to select a type, style, size, and/or configuration of one or more buoyancy tanks 5500 based at least in part on the body of water in which the water flow system 5100 will be disposed.

Although not shown in FIGS. 11-20, in some embodiments, the buoyancy tanks 5500 can include and/or can be coupled to a deck, platform, structure, and/or the like that can provide a relatively stable platform to support a human operator when interacting with the water flow system 5100. In addition, in some embodiments, the buoyancy tanks 5500 can include and/or can be coupled to a rail, beam, tube, rod, and/or the like that can extend along a length of the buoyancy tanks 5500. In some such embodiments, the rail and/or the like can allow an anchoring or tethering point that an operator can use to tether his or her person, a watercraft, and/or the like to the water flow system 5100.

The water flow system 5100 can include any number of buoyancy tanks 5500. For example, in some embodiments, the water flow system 5100 can include one buoyancy tank 5500, two buoyancy tanks 5500, the buoyancy tanks 5500, four buoyancy tanks 5500, five buoyancy tanks 5500, six buoyancy tanks 5500, seven buoyancy tanks 5500, eight buoyancy tanks 5500, nine buoyancy tanks 5500, ten buoyancy tanks 5500, or more. In the embodiment shown in FIGS. 11-20, the water flow system 5100 can include eight buoyancy tanks 5500*a*-5500*h*. While the buoyancy tanks 5500*a*-5500*d* are shown in FIGS. 11-12B as being larger than the buoyancy tanks 5500*e*-5500*h*, it should be understood that the buoyancy tanks 5500*a*-5500*d* are shown, for example, in an inflated and/or substantially filled state and/or configuration and the buoyancy tanks 5500*e*-5500*g* are shown, for example, in a deflated, evacuated, and/or substantially unfilled state and/or configuration. In the embodiment shown in FIGS. 11-20, the buoyancy tanks 5500*a*-5500*h* are substantially the same. In other embodiments, however, a water flow system can include any number of buoyancy tanks having varying sizes and/or configurations.

The buoyancy tanks 5500*a*-5500*h* can be coupled to the pen assembly 5300 and/or otherwise disposed in any suitable arrangement and/or configuration. For example, the water flow system 5100 can be arranged such that, for example, the two buoyancy tanks 5500*a* and 5500*b* are coupled to the pen assembly 5300 on a first side of the longitudinal axis (defined by the pen assembly 5300) at or near an upper portion of the pen assembly 5300 (see e.g., FIGS. 12A and 12B), the two buoyancy tanks 5500*c* and 5500*d* are coupled to the pen assembly 5300 on a second side of the longitudinal axis, opposite the first side, at or near the upper portion of the pen assembly 5300 (see e.g., FIGS. 12A and 12B), the two buoyancy tanks 5500*e* and 5500*f* are coupled to the pen assembly 5300 on the second side of the longitudinal axis at or near a lower portion of the pen assembly 5300 (see e.g., FIGS. 12A and 12B), and the two buoyancy tanks 5500g and 5500h are coupled to the pen assembly 5300 on the first side of the longitudinal axis at or near the lower portion of the pen assembly 5300 (see e.g., FIGS. 11 and 12A).

While shown and described as including eight buoyancy tanks 5500a-5500h, in other embodiments, the water flow system 5100 can include four buoyancy tanks 5500, with two buoyancy tanks 5500 disposed in series along each side of the pen assembly 5300. In still other embodiments, the water flow system 5100 can include two buoyancy tanks 5500, with one buoyancy tank 5500 disposed on each side of the pen assembly 5300. In such embodiments, the buoyancy tanks 5500 can have a length that substantially corresponds to a length of the pen assembly 5300.

The buoyancy tanks 5500 can be any suitable shape, size, and/or configuration. For example, each of the buoyancy tanks 5500a-5500h can be a rigid, thin-walled vessel whose shape and dimensions remain substantially unchanged when filled with air or water and can support pressurized fluids. In other embodiments, each of the buoyancy tanks 5500a-5500h can be an inflatable tank with deformable walls (or at least partially deformable walls) configured to withstand pressures greater than, for example, 5 atm. Depending on the form factor, the buoyancy tanks 5500 can be formed from various metals, polymers, composites, etc., including, but not limited to aluminum, steel, stainless steel, rubber, polyethylene, polyvinyl chloride, polycarbonates, poly(methyl methacrylate), fiberglass, carbon fiber, and/or the like.

In some embodiments, each buoyancy tank 5500a-5500h can be a single tank or container. In other embodiments, each buoyancy tank 5500 can include any number of tanks, containers, bladders, etc. that can be, for example, disposed in a single housing or in separate housings. In such embodiments, the tanks, containers, bladders, etc. can be in fluid communication or can be fluidically isolated. Moreover, the tanks, containers, bladders, etc. can have substantially the same size and/or configuration or can have different sizes and/or configurations. In some such embodiments, providing multiple tanks, containers, bladders, etc. and/or varying a size and/or configuration thereof can, for example, provide additional control of an amount of floatation provided by each buoyancy tank 5500a-5500h and/or can provide redundancy in the event of a failure or rupture.

In some embodiments, the buoyancy tank 5500 can be sealed either during manufacture or during deployment and configured to receive a volume of air or fluid (e.g., water) to provide the water flow system 5100 with the desired amount of floatation. Each buoyancy tank 5500a-5500h can be dimensioned to have a total volume such that if the volume is substantially filled with air at standard or atmospheric temperature and pressure, the resultant buoyant forces associated with the buoyancy tanks 5500 is greater than a force associated with the total weight of the water flow system 5100. In some embodiments, the buoyancy tanks 5500 can be configured to float the water flow system 5100 in an environment with substantially fresh water (e.g., water with a density of approximately 1000 kg/m$^3$). Because the density of salt water and/or brackish water is higher than fresh water, the buoyancy tanks 5500 can be configured to provide a desired amount of floatation for the water flow system 5100 in any suitable body of water. In some embodiments, one or more additional safety margins can be incorporated into the design of the buoyancy tanks 5500 to ensure buoyant forces are also sufficient to counteract external forces applied to the water flow system 5100 during operation (e.g., tidal forces, ocean currents, wind, tension from the anchoring system 5600, etc.).

The buoyancy tanks 5500 can be can be configured to contain a volume of fluid (e.g., a gas or a liquid) to place the water flow system 5100 and/or at least the pen assembly 5300 in a desired orientation. For example, in some instances, each of the buoyancy tanks 5500a-5500h can contain substantially the same volume of air or other fluid such that a resultant torque caused by the buoyant forces of or on a particular buoyancy tank 5500 (e.g., one or more of the buoyancy tanks 5500a, 5500b, 5500g, and/or 5500h on the first side of the pen assembly 5300) are substantially cancelled by a corresponding torque associated with an opposing buoyancy tank 5500 (e.g., one or more of the buoyancy tanks 5500c, 5500d, 5500e, and/or 5500f on the second side of the pen assembly 5300). In this manner, the water flow system 5100 can remain in a substantially horizontal such that the aquatic animals rest on or toward a relative bottom of the compartments 5340a and 5340b of the pens 5300a-5300e. In other instances, a volume of fluid contained in the buoyancy tank(s) 5500a, 5500b, 5500g, and 5500h disposed on the first side of the pen assembly 5300 can be increased while a volume of fluid contained in the buoyancy tank(s) 5500c, 5500d, 5500e, and 5500f disposed on the second side of the pen assembly 5300 can be decreased (or vice versa), which in turn, can be operable to rotate the water flow system 5100 (e.g., about the longitudinal axis of the pen assembly 5300) to be placed in a different orientation, as described in further detail herein.

As described above, the buoyancy tanks 5500 are configured to contain and/or at least temporarily contain a volume of air (or other gas or fluid) to provide a desired amount of floatation to or for the water flow system 5100. In some instances, the buoyancy tanks 5500 can be used to control and/or adjust a depth of the water flow system 5100 within the body of water, as described above with reference to FIGS. 7A-7C. For example, each of the buoyancy tanks 5500a-5500h can be coupled to and/or otherwise in fluid communication with a portion of the control system 5800 that is configured to transfer a volume of air, gas, and/or fluid between the buoyancy tanks 5500 and the portion of the control system 5800. More particularly, each buoyancy tank 5500a-5500h can include a valve disposed on or in that buoyancy tank 5500 to which a portion of the control system 5800 (e.g., one or more air or fluid lines, pipes, conduits, etc.) can be coupled. The valve of each buoyancy tank 5500a-5500h can be configured to be transition from a closed and/or sealed state to an open and/or unsealed state to allow a fluid (e.g., air or other gas(es) and/or a liquid) to flow into or out of that buoyancy tank 5500. In some embodiments, the valve can be a two-way valve allowing fluid to flow in two direction (e.g., an inlet flow and an outlet flow through a single valve). In other embodiments, each buoyancy tank 5500a-5500h can include a first valve configured to be an inlet valve and a second valve configured to be an outlet valve. In still other embodiments, each buoyancy tank 5500a-5500h can include at least one valve configured to allow a flow of air or gas into and/or out of that buoyancy tank 5500 and at least one valve configured to allow a flow of a liquid (e.g., water) into and/or out of that buoyancy tank 5500. In this manner, the control system 5800 and/or a portion thereof can be configured to transfer a flow of fluid to or from the buoyancy tanks 5500 to adjust an amount of buoyancy and/or floatation provided by each buoyancy tank 5500a-5500h, as described in further detail herein.

Referring back to FIG. 11, the anchoring system 5600 of the aquaculture system 5000 is configured to keep one or more portions of the aquaculture system 5000 to maintain the one or more portions in a relatively close proximity to one another during operation. In some embodiments, the anchoring system 5600 can be structurally and/or functionally similar to the anchoring systems 1600, 2600, 3600, and/or 4600. Accordingly, portions of the anchoring system 5600 are not be described in further detail herein.

As shown, the anchoring system 5600 includes a mooring or anchor 5610, configured to rest on a surface of the ground. For example, in some embodiments, the mooring or anchor 5610 (referred to herein for simplicity as "anchor") can be configured to rest on or anchor to the ground outside of the body of water in which the aquaculture system 5000 is disposed (e.g., anchored to the land, a quay, a wharf, a jetty, a pier, and/or the like). In other embodiments, the anchor 5610 can be configured to rest on or anchor to the ground underneath the body of water in which the aquaculture system 5100 is disposed (e.g., a riverbed or floor, a lakebed or floor, an ocean bed or floor, etc.). The anchor 5610 can be directly tethered to one or more portions of the aquaculture system 5000 using a central tether 5615. In other embodiments, the mooring or anchor 5610 can be a mooring buoy configured to float on a surface of the body of water instead of the anchor configured to rest on the ground, bed, or floor under the body of water. In such embodiments, the mooring buoy can be, for example a spar buoy or the like. In some such embodiments, the mooring buoy can include one or more portions of the control system 5800.

In some embodiments, the central tether 5615 can be a rope, chain, rail, rod, pipe, conduit, and/or any other suitable member. As shown, the water flow systems 5100 are attached via one or more connections 5630 to a rail 5620, which in turn, is attached to the central tether 5615. Similarly, a buoy containing at least a portion of the control system 5800 is attached via one or more connections 5650 to the central tether 5615. Thus, with the central tether 5615 coupled to the anchor 5615, the anchoring system 5600 can be configured to keep the water flow systems 5100 and the control system 5800 in a relatively close proximity to on another.

In some embodiments, tethering the water flow systems 5100 and the buoy of the control system 5800 to the central tether 5615 can allow the aquaculture system 5000 to be repositioned in the body of water. For example, in some embodiments, the central tether 5615 can be rotatably coupled to the anchor 5610, thereby allowing the central tether 5615 to rotate relative to a substantially fixed point (e.g., the anchor 5610). Such an arrangement can allow the water flow systems 5100 to be placed in a desired position in which the water flow systems 5100 are at least partially aligned with and/or otherwise intercept the natural current of the body of water. In other embodiments, the central tether 5615 can be fixedly coupled to the anchor 5610 and the anchor 5610 can be configured to move and/or rotate to place at least the water flow systems 5100 in the desired position. For example, in some embodiments, the anchor 5610 can be a mooring buoy or the like (e.g., a spar type buoy) that can include one or more propulsion devices, propellers, impellers, etc. configured to reposition the anchor 5610. In still other embodiments, the anchor 5610 can be configured to remain in a substantially fixed position and the central tether 5615 can be a flexible chain, rope, and/or the like that can flex, bend, swing, etc., thereby allowing the water flow systems 5100 to move within a relatively limited range of motion (e.g., relative to the anchor 5610).

The control system 5800 of the aquaculture system 5000 can be any suitable configuration and can include any suitable component, assembly, device, mechanism, and/or the like associated with controlling one or more portions of the aquaculture system 5000. As shown in FIGS. 11 and 18-20, at least some of the control system 5800 can be disposed in a buoy 5810 that is separate from the water flow systems 5100. In other embodiments, however, one or more portions of the control system 5800 can be included in one or more of the water flow systems 5100.

As described above with reference to the aquaculture systems 1000, 2000, 3000, and/or 4000, the buoy 5810 can be configured to float on water near the water flow systems 5100. In some embodiments, for example, the buoy 5810 can be tethered, via the connections 5650, to the central tether 5615 of the anchoring system 5600 to which the water flow systems 5100 are similarly tethered (e.g., via the rail 5620 and connections 5630). In some embodiments, the buoy 5810 can include one or more portions of the control system 5800 and can also function as a mooring buoy or the like of the anchoring system 5600 (e.g., the anchor 5610 when the anchor 5610 is a mooring buoy).

The buoy 5810 includes a housing 5812 (or other suitable structure that) defines an inner volume 5814. The housing 5812 can receive and/or otherwise contain one or more components of the control system 5800. In some embodiments, the housing 5812 can be, for example, a substantially enclosed and/or sealed housing that can fluidically isolate the one or more components disposed in the inner volume 5814 of the housing 5812 from a volume outside of the housing 5812. The buoy 5810 and/or the housing 5812 can have an access port or opening configured to allow an operator to access the components disposed in the buoy 5810. In addition, the buoy 5810 can include a hatch 5815 that can close or seal the access port or opening, thereby allowing the one or more components to be maintained in a substantially dry environment despite the fact that the buoy 5810 is disposed in a body of water.

Figure 18:
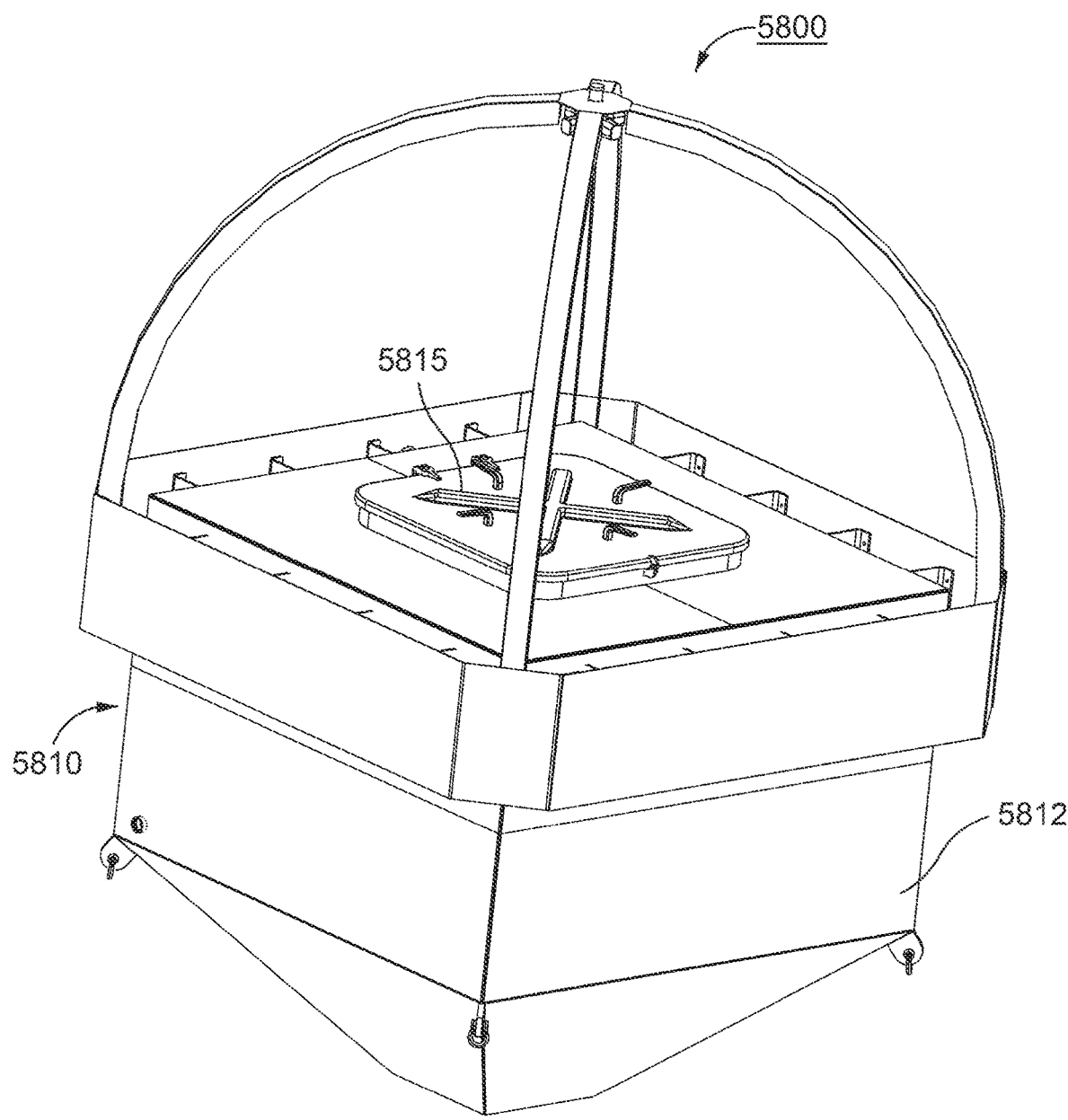
FIG. 18 is perspective view of a control system included in the aquaculture system of FIG. 11.
Figure 19:
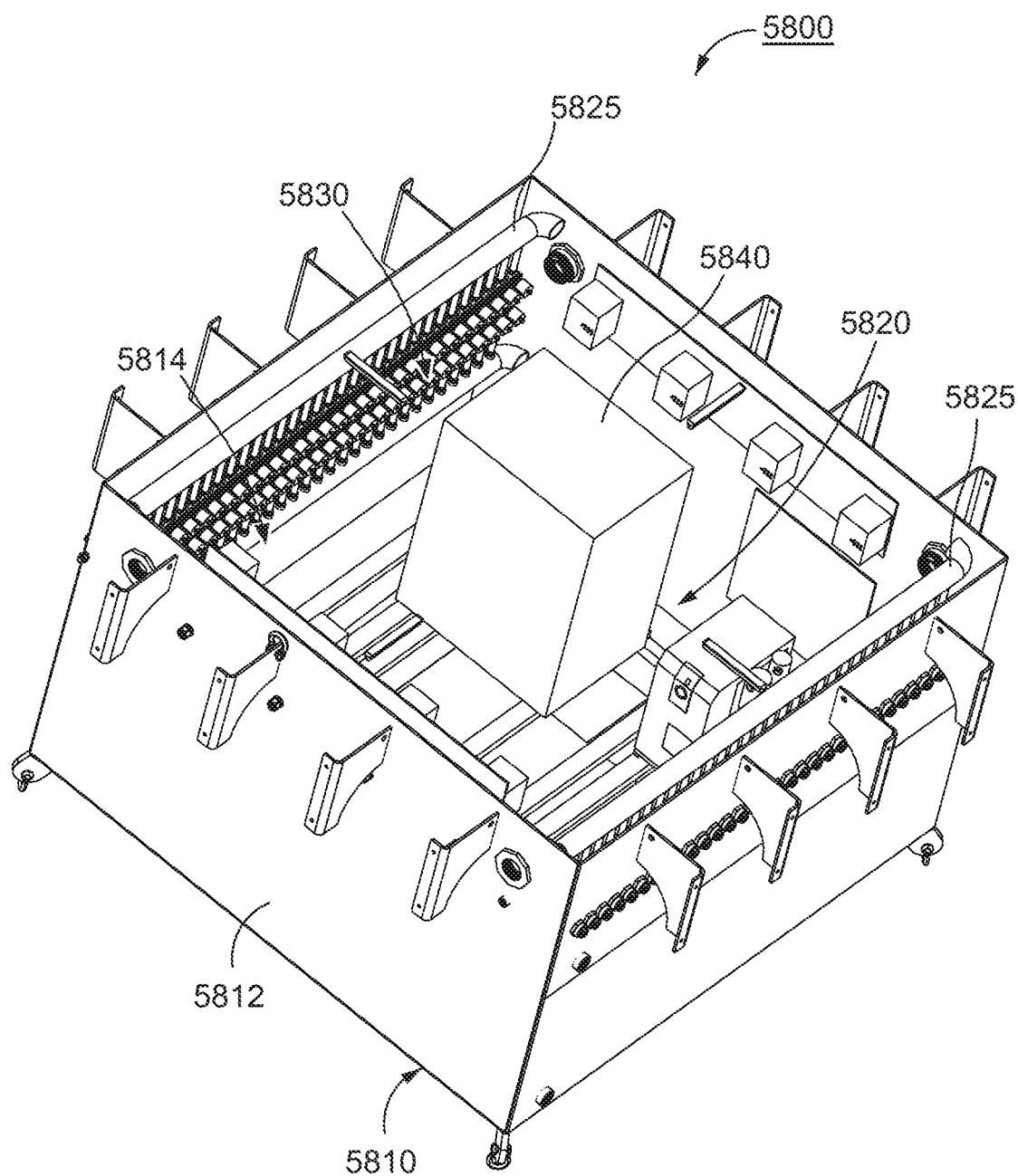
FIGS. 19 and 20 are top perspective views of a portion of the control system of FIG. 18, shown in a first orientation and a second orientation.
Figure 20:
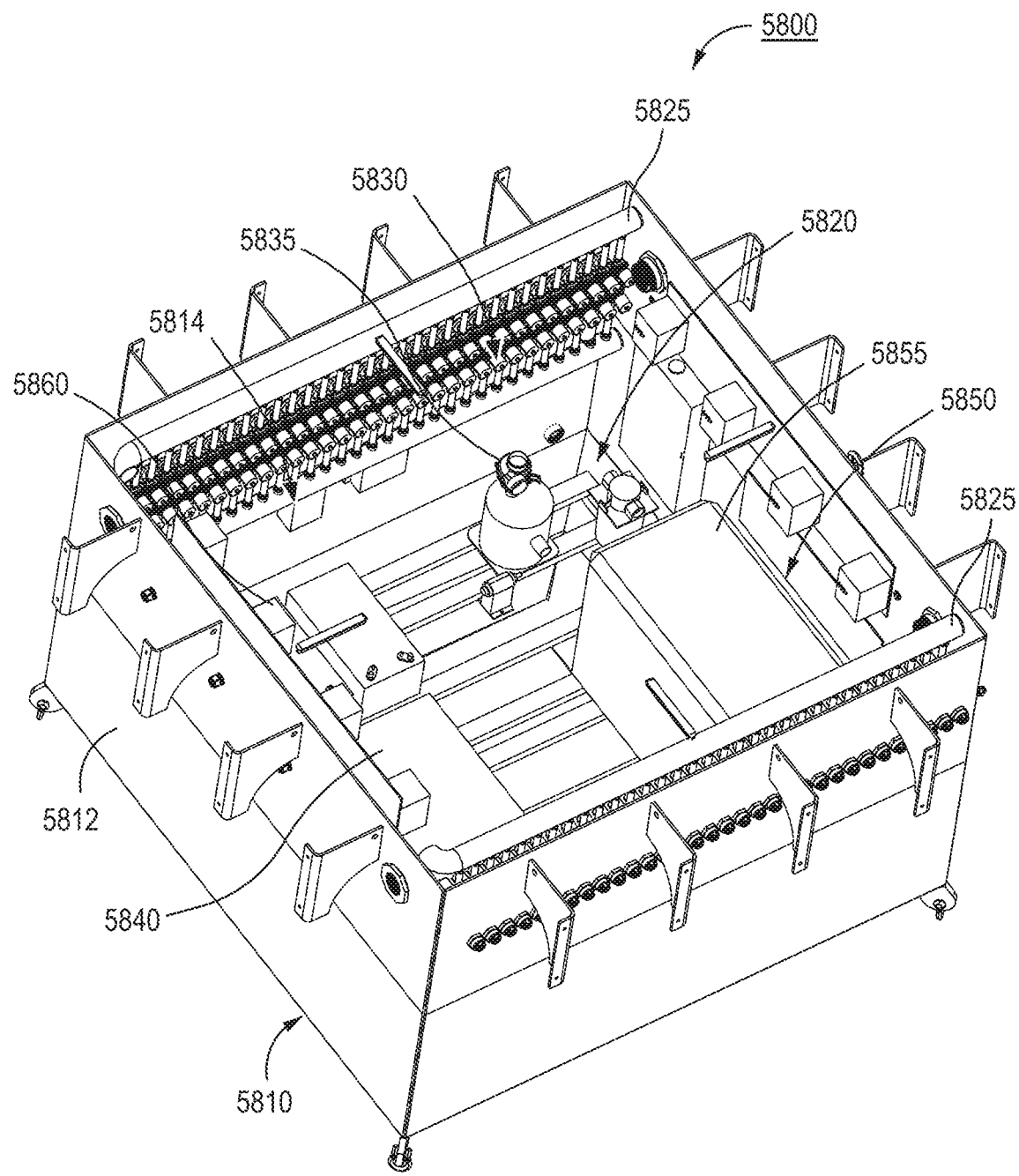

Although not shown in FIGS. 18-20, the control system 5800 can include, for example, a controller, a compute device, an electronic device, and/or any other suitable electronic or electromechanical control system. For example, in some embodiments, the control system 5800 can include an electronic compute device configured to execute and/or perform one or more processes associated with controlling the aquaculture system 5000. In some embodiments, the electronic compute device can be, for example, a computer or compute device or system such as a single board computer, a stackable computer system (e.g., a PC/104 stack), a personal computer (PC), a server device, a workstation, and/or the like. In some embodiments, the electronic device can include at least a memory, a processor, and a network interface, as described above with reference to the control system 1800. As such, the processor can be configured to run or execute a set of instructions or code stored in the memory associated with controlling one or more portions of the aquaculture system 5000 and/or communicating with one or more portion of the aquaculture system 5000 and/or any suitable remote electronic device via the network interface and/or the like. In some embodiments, the controller, compute device, etc. can include a GPS radio, transponder, and/or the like that can allow the controller and/or an operator to determine and/or otherwise identify a location of the aquaculture system 5000. In addition, in some embodiments, the control system 5800 can include a user interface such as a display, one or more peripheral devices, and/or any other suitable user interface, thereby allowing a human operator to interact with the control system 5800.

As shown in FIGS. 19 and 20, the control system 5800 can include a first portion 5820 and a second portion 5850. The first portion 5820 of the control system 5800 can be a buoyancy control system that can be configured to control an amount of fluid contained in the buoyancy tanks 5500. For example, the first portion 5820 can include at least one or more manifolds 5825, one or more sets of solenoids 5830, a blower 5835, and a compressor 5840. In addition, the first portion 5820 can include any suitable conditioner, drier, fluid tanks, and/or any other suitable component and/or device. The compressor 5840 is configured to compress a volume of fluid such as, for example, air. In some embodiments, the compressor 5840 can be configured to draw a volume of air from an ambient environment (e.g., inside or around the buoy 5810) and compress the air to a desired pressure, which can then be at least temporarily stored in an air tank or the like. The blower 5835 can be in fluid communication with the compressor 5840 and the one or more manifolds 5825. In this manner, the blower 5835 can receive a volume of compressed fluid (e.g., air) from the compressor 5840 and can provide a flow of the compressed fluid to the one or more manifolds 5825. Each solenoid 5830 in the set(s) of solenoids can be in fluid communication with the one or more manifolds 5825 and thus, can be configured to receive at least a portion of the compressed fluid via the manifold 5825. As described in further detail herein, the controller, compute device, electronic device, etc. (referred to herein for simplicity as "controller") can be configured to transition the solenoids 5830 between a first state, in which the solenoid 5830 limits and/or substantially prevents a flow of fluid (e.g., air) through the solenoid 5830, and a second state, in which the solenoid 5830 allows a flow of fluid through the solenoid 5830.

Although not shown in FIGS. 11-20, each solenoid 5830 can be connected to a fluid line, conduit, tube, pipe, etc., which in turn, is connected to one of the buoyancy tanks 5500a-5500h included in the water flow systems 5100. In some embodiments, each buoyancy tank 5500a-5500h can be connected to a single fluid line, conduit, tube, pipe, etc. (referred to herein for simplicity as "fluid line") that can allow a flow of fluid between that buoyancy tank 5500 and a corresponding solenoid 5830. In other embodiments, each buoyancy tank 5500a-5500h can be connected to at least two fluid lines, with at least one fluid line being an inlet fluid line configured to provide a flow of fluid from a corresponding solenoid 5830 to that buoyancy tank 5500 and at least one fluid line being an outlet fluid line configured to provide a flow of fluid from that buoyancy tank 5500 to a corresponding solenoid 5830. Although not shown in FIGS. 11-20, in some embodiments, the fluid lines can be bundled into a cable or the like that can extend between the buoy 5810 of the control system 5800 and the buoyancy tanks 5500 of the water flow systems 5100. In other embodiments, the fluid lines can be included in, a part of, and/or otherwise at least partially run through the central tether 5615 and the connections 5630 and/or 5650. In this manner, the controller can be configured to transfer fluid (e.g., air) into or out of the buoyancy tanks 5500 to control an amount of buoyancy or floatation associated with each buoyancy tank 5500a-5500h, as described in further detail herein.

The second portion 5850 of the control system 5800 can be, for example, a power system that can be configured to generate electric power and/or otherwise provide a flow of electric power to one or more portions of the aquaculture system 5000. The second portion 5850 can be and/or can include any suitable component, device, mechanism, energy storage member, power supply, cable, and/or the like. In some embodiments, the second portion 5850 can be a power system that is similar in at least form and/or function to the power systems 1700, 2700, and/or 3700 described above.

The second portion 5850 of the control system 5800 can include any suitable power generation and/or supply including, but not limited to, solar panels, wind turbines, tidal generators, gas generators, and/or hybrid power systems based on combinations thereof. In some embodiments, the second portion 5850 can include an electrochemical device configured to store power. For example, in the embodiment shown in FIGS. 19 and 20, the second portion 5850 can include at least a generator 5855 (e.g., a gas generator, diesel generator, natural gas generator, etc.) and an energy storage member 5860 (e.g., a battery, a capacitor, a flywheel energy storage device, and/or any combination thereof). Although not shown in FIGS. 11-20, the control system 5800 can include any number of electric wires, cables, conduits, conductors, buses, distributors, fuses, breakers, and/or any other suitable component, device, mechanism, etc. configured to allow the second portion 5850 of the control system 5800 to provide electric power to one or more portions of the aquaculture system 5000. For example, the control system 5800 can include any suitable electrical interconnect configured to place the controller and the first portion 5820 of the control system 5800 in electric contact with the second portion 5850 of the control system 5800. Similarly, the aquaculture system 5000 can include any number of cables or the like that can be configured to electrically connect the water flow systems 5100 to the second portion 5850 of the control system 5800. As described above with reference to the fluid lines, the cables can be independently run from the buoy 5810 to the water flow systems 5100, bundled together into a single cable or disposed within a single conduit, included in or run through the central tether 5615 and the connections 5630 and/or 5650, and/or the like. In this manner, the controller can execute one or more processes, procedures, and/or code to provide any suitable portion of the aquaculture system 5000 with a flow of electric power generated and/or at least temporarily stored by, for example, the second portion 5850 of the control system 5800, as described in further detail herein.

As described above, the control system 5800 can be used to and/or otherwise configured to monitor and control the aquaculture system 5000 locally and/or remotely. In some embodiments, the control system 5800 (and/or the controller thereof) can be configured to monitor and/or control the aquaculture system 5000 via a control algorithm, an artificial intelligence algorithm or system, and/or a human operator. For example, in some instances, a user, operator, and/or administrator of the aquaculture system 5000 can provide an operational command to the control system 5800 from a remote location by sending a signal via a remote electronic device, a remote controller, a personal computer, a workstation, a mobile device, a tablet, a wearable electronic device, and/or any other suitable compute device to the controller of the control system 5800. The signal can be indicative of the operational command to the controller and/or any other portion of the control system 5800 and/or water flow systems 5100. In other instances, the control system 5800 can be configured to monitor and/or control the aquaculture system 5000 without user or operator input or manipulation. For example, in some such instances, the controller of the control system 5800 can receive input, data, and/or signals from any number of sensors, data sources, system settings, and/or the like and based on the input, data, and/or signals can execute one or more processes associated with monitoring and/or controlling any suitable portion of the aquaculture system 5000.

In some embodiments, the controller of the control system 5800 can provide operating signals and/or electric power to one or more portions of the aquaculture system 5000. In addition, the controller can perform status checks on various systems, operating states, and/or the like including, but not limited to, a depth of the water flow system 5100, an air pressure and/or volume in the buoyancy tanks 5500, a pumping rate of the pumping mechanism 5400, an operational state of the pumping mechanism 5400, a fluid flow direction, one or more environmental conditions (e.g., water nutrient levels, water temperature, water pH, water salinity/conductivity, presence of cytotoxins or other contaminants in the water, local weather conditions, tidal conditions, current flow conditions, etc.), mollusk development characteristics, position information, and/or the like.

For example, in some instances, the controller can be configured to adjust a position and/or depth of the water flow systems 5100 in response to receiving one or more instructions and/or determining that one or more conditions satisfy a criterion and/or various criteria. In some instances, the instructions can be received from, for example, a remote electronic device or remote control device manipulated by a human operator. In other instances, the one or more conditions can be associated with a current or forecasted local weather condition. In such instances, the criterion/criteria can be associated with a magnitude and/or rate of change in barometric pressure, a magnitude and/or rate of change in sea conditions (e.g., a wave or swell size, period, etc.), a proximity of an extreme weather system (e.g., hurricane, cyclone, water spout, thunderstorm, etc.), and/or the like. In other instances, the criterion/criteria can be associated with an age and/or size of the aquatic animals disposed in the pen assemblies 5300. In still other instances, the criterion/criteria can be any suitable criterion/criteria associated with one or more operating conditions of the aquaculture system 5000.

In some instances, in response to the criterion/criteria being satisfied, the controller can determine and/or define one or more courses of action. For example, in some instances, the controller can cause the aquaculture system 5000 or components thereof to be moved by one or more propulsion devices from a current geographic location to a new or desired geographic location. In some instances, in addition to or as an alternative to changing the geographic location of the aquaculture system 5000 and/or components thereof, the controller can cause the aquaculture system 5000 and/or components thereof (e.g., at least one or more of the water flow systems 5100) to be partially or fully submerged below a surface of the body of water, to be further submerged beneath the surface of the body of water (e.g., submerged to a greater depth), and/or to be raised substantially above the surface of the body of water (e.g., as described above with reference to FIGS. 7A-7C).

As a specific example, in response to the controller determining that a severe or extreme weather condition is within a predetermined proximity of the aquaculture system 5000, the controller can define a new depth at which to submerge to the water flow systems 5100 that is, for example, deeper than a current depth at which the water flow systems 5100 are submerged. In such instances, the controller can be configured to determine, calculate, and/or otherwise define a desired volume of air within the buoyancy tanks 5500 to submerge the water flow systems 5100 at or to the new depth. Moreover, because the depth in the body of water of the water flow systems 5100 is being increased, the controller can be configured to determine an amount or volume of air to release from each of the buoyancy tanks 5500a-5500h to result in the desired amount of buoyancy and/or floatation (e.g., a lesser amount). As such, the controller can send a signal and/or a flow of electric power operable to transition at least some of the solenoids 5830 from a first or closed state to a second or open state. More specifically, the controller can transition the solenoids 5830 that are in fluid communication with, for example, an outlet of each buoyancy tank 5500a-5500h, thereby allowing a volume of air to flow from that buoyancy tanks 5500 and through the open solenoids 5830. The air can then be vented into the ambient environment or can be collected, for example, in one or more storage tanks. Once the volume and/or pressure of air in each of the buoyancy tanks 5500a-5500h reaches a desired level, the controller can transition the solenoids 5830 from the open state to the closed state. Concurrently, the reduction in the volume and/or pressure of air in the buoyancy tanks 5500 places the water flow systems 5100 at the new or desired depth. While the controller is described above as releasing a volume of air from the buoyancy tanks 5500 via at least some of the solenoids 5830, in other embodiments, the controller can be configured to control a valve or vent on or in the buoyancy tanks 5500 to allow the volume of air to be vented from the buoyancy tanks 5500 into the body of water (e.g., without needing to transition one or more of the solenoids 5830).

In some instances, in response to the controller determining that the severe or extreme weather condition has passed and is beyond the predetermined proximity of the aquaculture system 5000, the controller can be configured to return the water flow systems 5100 to the original depth. Because the depth of the water flow systems 5100 in the body of water is being decreased, the controller can be configured to determine an amount or volume of air to transfer into the buoyancy tanks 5500 to result in the desired amount of buoyancy and/or floatation. As such, the controller can send a signal and/or a flow of electric power operable to transition at least some of the solenoids 5830 from a first or closed state to a second or open state. More specifically, the controller can transition the solenoids 5830 that are in fluid communication with, for example, an inlet of each buoyancy tank 5500a-5500h, thereby allowing a volume of air to flow through the open solenoids 5830 and to the buoyancy tanks 5500. In some instances, the controller can send a signal and/or a flow of electric power operable to cause the blower 5835 to transfer air from the compressor 5840 to the manifold(s) 5825, which in turn, direct the air to the solenoids 5830. In addition, the controller can send a signal and/or a flow of electric power operable to transition the compressor 5840 from a powered off or standby state to a powered on state, in which the compressor 5840 compresses a volume of air to, for example, replenish a volume of compressed air in a storage tank or the like, in a process similar to that of known compressors. Once the volume and/or pressure of air in each of the buoyancy tanks 5500a-5500h reaches a desired level, the controller can transition the solenoids 5830 from the open state to the closed state. Concurrently, the increase in the volume and/or pressure of air in the buoyancy tanks 5500 places the water flow systems at the desired depth (e.g., the original depth).

While the controller is described above as adjusting the volume and/or pressure of air in each of the buoyancy tanks 5500a-5500h, it should be understood that the volume and/or pressure of air in each of the buoyancy tanks 5500a-5500h can be independently controlled. In some embodiments, the depth of the water flow systems 5100 can be controlled by adjusting the volume and/or pressure of air in only a subset of the buoyancy tanks 5500. By way of example, in some embodiments, the controller can increase and/or decrease a depth of the water flow systems 5100 (and/or an amount of the water flow system 5100 that is submerged in the water) by decreasing and/or increasing, respectively, the volume and/or pressure of air in the buoyancy tanks 5500*a*, 5500*b*, 5500*c*, and 5500*d* while not adjusting the volume and/or pressure of air in the buoyancy tanks 5500*e*, 5500*f*, 5500*g*, and 5500*h* (or vice versa).

In some instances, the controller can determine that it is desirable to raise the water flow systems 5100 to a depth that places at least a portion of the pen assemblies 5300 above the surface of the water. In such instances, the controller can be configured to increase a volume and/or pressure of air in each of the buoyancy tanks 5500*a*-5500*h*, in a manner substantially similar to the manner just described. The water flow systems 5100 can thus be raised to a depth that places the pen assemblies 5300 at least partially out of the water (e.g., above the surface of the water) when the volume and/or pressure of air in the buoyancy tanks 5500 reaches a desired level. In some instances, the volume and/or pressure of air in at least some of the buoyancy tanks 5500 can be increased until the buoyancy tanks 5500*e*, 5500*f*, 5500*g*, and 5500*h* are floating on the surface of the water, thereby placing the pen assemblies 5300 substantially out of the water. In some instances, placing the pen assemblies 5300 substantially out of the water (e.g., above the surface of the water) can allow the aquatic animals to dry for harvesting and/or can allow a human operator to inspect or maintain one or more portions of the aquaculture system 5000.

In other embodiments, the aquaculture system 5000 can include and/or can be used in conjunction with an automated harvesting system that can include any suitable device, mechanism, machine, and/or the like. In some such embodiments, the harvesting system can be configured to move along the water flow systems 5100 to harvest (e.g., collect) the aquatic animals (e.g., via a scoop, suction, grate, filter, etc.). In some embodiments, the harvest system can be configured to sort and/or grade the aquatic animals based at least in part on, for example, a size of the aquatic animals and/or a stage of development of the aquatic animals. In some implementations, the harvest system can be in communication (e.g., electronic communication) with the controller to send and/or receive data therebetween. In some implementations, the harvest system can be integrated into the water flow systems 5100 and at least partially controlled, for example, by the controller and/or any other suitable portion of the control system 5800.

While the controller is described above as raising or lowering the water flow systems 5100 in response to, for example, inclement local weather and/or to allow an operator to access the water flow systems 5100 or harvest the aquatic animals from the water flow systems 5100, in other instances, the controller can be configured to alternatingly raise and lower the water flow system 5100 to, for example, facilitate a flow of water through the pen assemblies 5300. For example, in some instances, moving the water flow systems 5100 within the body of water can result in a volume of water flowing (e.g., being pushed or forced) into the inlets of the compartments 5340*a* and 5340*b*, thereby increasing a volumetric flow rate of water into and/or through the pen assemblies 5300. In some instances, the controller can alternatingly raise and lower the water flow systems 5100 independent of the state and/or configuration of the pumping mechanism 5400 and/or in a combined or coordinated process to provide the desired flow of water into and/or through the pen assemblies 5300.

While described above as adjusting a depth of at least the water flow systems 5100, in other instances, the controller can be configured to rotate one or more of the water flow systems 5100 from a from a first orientation to a second orientation. For example, in some instances, the pen assemblies 5300 can be in the first orientation (as shown in FIG. 11) and can be flipped 180° about the longitudinal axis of the pen assembly 5300 to be placed in the second orientation. In some instances, for example, the controller can determine that the aquatic animals disposed within at least some of the pen assemblies 5300 have reached a predetermined stage in development in which the aquatic animals benefit from the pen assemblies 5300 being placed at a different orientation. In other words, the controller can determine that an amount or stage of development of the aquatic animals satisfies a criterion.

The transitioning of at least one of the water flow systems 5100 can include, for example, adjusting a volume and/or pressure of air in at least some of the buoyancy tanks 5500 of a desired water flow system 5100. More particularly, the controller can be configured to control the second portion 5820 of the control system 5800 such that a volume of air in the buoyancy tanks 5500 disposed on a first side of the water flow system 5100 (e.g., the buoyancy tanks 5500*a* and 5500*c* shown in FIG. 12) is increased while a volume of air in the buoyancy tanks 5500 disposed on a second or opposite side of the water flow system 5100 (e.g., the buoyancy tanks 5500*b* and 5500*d* shown in FIG. 12) is maintained or is reduced. In some instances, the volume of air in the buoyancy tanks 5500 can be adjusted in a desired and/or predetermined sequence to rotate the water flow system 5100 in a desired manner and/or by a desired amount, as described in further detail herein with reference to, for example, FIGS. 26D-26G.

The controller can adjust the volume of air in at least some of the buoyancy tanks 5500 in the desired and/or predetermined sequence to result in a buoyancy differential laterally across the water flow system 5100 that is operable to rotate the water flow system 5100 about the longitudinal axis (e.g., defined by the pen assembly 5300, as described above). In some instances, the water flow system 5100 can be rotated 180° about the longitudinal axis. In other instances, the water flow system 5100 can be rotated about the longitudinal axis by any suitable amount. Moreover, once in the new and/or desired orientation (e.g., the second orientation) the volume of air in the buoyancy tanks 5500 can be brought into equilibrium or substantial equilibrium thereby maintaining the water flow system 5100 in the new and/or desired orientation. Although the reorientation is described above with reference to a single water flow system 5100, in other instances, the controller can reorient any number of the water flow systems 5100 in concurrent, parallel, or separate processes.

While the controller is described above as being configured to rotate the water flow systems 5100 about the longitudinal axis by approximately 180°, in other embodiments, the controller can be configured to rotate the water flow systems 5100 about the longitudinal axis in alternating rotational directions. Said another way, the controller can be configured to rock and/or gyrate the water flow systems 5100 about the longitudinal axis and/or to tilt the water flow systems 5100 at or to a desired angle. For example, in some instances, the controller can determine that it is desirable to, for example, redistribute the aquatic animals in the pen assembly 5300 of at least one water flow system 5100. In such instances, the controller can alternatingly increase or decrease a volume and/or pressure of air in the buoyancy tanks 5500*a*, 5500*b*, 5500*c*, and/or 5500*d* on the first side and the buoyancy tanks 5500*e*, 5500*f*, 5500*g*, and/or 5500*h* on the second side of the water flow system 5100, thereby rotating the water flow system 5100 about the longitudinal axis in alternating rotational directions. In some instances, the controller can determine, for example, a magnitude and/or frequency of the rotation of the water flow system 5100 to result in a desired amount of redistribution of the aquatic animals. In some instances, the controller can determine that the aquatic animals are substantially distributed (at least laterally) in a desired manner when, for example, the water flow system 5100 is substantially horizontal when a volume and/or pressure in each buoyancy tank 5500*a*-5500*h* of the water flow system 5100 is substantially equal. Said another way, the controller can determine a weight distribution of the water flow system 5100 by placing the water flow system 5100 in a substantially horizontal orientation and evaluating the volume and/or pressure of air in each buoyancy tank 5500.

In other instances, the controller can determine that it is desirable to, for example, harvest the aquatic animals from one or more of the water flow systems 5100. In such instances, the controller can be configured to (1) raise the water flow system 5100 such that the pen assembly 5300 is substantially above the surface of the water (e.g., when the buoyancy tanks 5500*e*, 5500*f*, 5500*g*, and 5500*h* are floating on the surface of the water, as described in detail above) and (2) tilt the water flow system 5100 about the longitudinal axis at or to a desired angle. Thus, once the water flow system 5100 is raised to the desired position, the controller can be configured to rotate the water flow system 5100 about the longitudinal axis a desired amount and once the water flow system 5100 is in the desired rotational direction, adjusting the volume and/or pressure of air in the buoyancy tanks 5500 to stabilize the water flow system 5100 at or in the desired rotational position. In some instances, placing the water flow system 5100 at the desired rotational position can result in the aquatic animals sliding toward a lower portion of the pens 5300*a*-5330*e* in which the aquatic animals are disposed, which in turn, can facilitate the harvesting of the aquatic animals.

While the controller is described above as controlling a volume and/or pressure in the buoyancy tanks 5500 to, for example, rotate the water flow systems 5100 about the longitudinal axis, in other instances, the controller can be configured to control a volume and/or pressure in the buoyancy tanks 5500 to rotate the water flow systems 5100 about a lateral axis and/or an axis that is perpendicular to the longitudinal axis. In other words, in some embodiments, the controller can adjust a volume and/or pressure in the buoyancy tanks 5500*a*, 5500*c*, 5500*e*, and 5500*g* on a first side of the lateral axis and/or the buoyancy tanks 5500*b*, 5500*d*, 5500*f*, and 5500*h* on a second side of the later axis to rotate the water flow systems 5100 in a fore and/or after direction. For example, in some instances, it may be desirable to rotate one or more water flow systems 5100 about the lateral axis to redistribute the aquatic animals in the fore or aft directions, as described above with respect to the redistribution of the aquatic animals in response to rotation about the longitudinal axis.

In some instances, the controller of the control system 5800 can also control a direction associated with a flow of water through the pen assembly 5300 of the water flow systems 5100. For example, as described above, the pumping mechanism 5400 of each water flow system 5100 can be used to generate a flow of water through the water flow system 5100 in order to continuously replenish nutrient-rich water for the developing aquatic animals. Based on the dimensions and geometry of the pen assembly 5300 of the water flow system 5100, the pumping mechanism 5400 can be configured to generate a pressure differential such that the flow rate of water in and/or through the pen assembly 5300 results in improved growth rates for a majority of aquatic animals in the pen assembly 5300.

In some instances, the controller can determine a desired flow rate through at least a portion of the pen assemblies 5300 based at least in part on an amount and/or direction of the current of the body of water, a developmental stage of the aquatic animals disposed within the pen assembly 5300, one or more instructions received from a human operator, and/or any other suitable input. In some instances, it may be desirable to dispose the water flow systems 5100 in a position that is aligned with and/or that intercepts the current flow of the body of water in which the aquaculture system 5000 is disposed. In some instances, the controller can be configured to place the water flow systems 5100 in a desired position via one or more propulsion members (as described above with reference to the aquaculture system 1000) and/or via one or more of the pumping mechanisms 5400. In some instances, however, it may be desirable to enhance and/or facilitate a flow of water through the pen assemblies 5300 by controlling, for example, the operating state of the pumping mechanisms 5400.

For example, in some instances, the controller can be configured to provide each pumping mechanism 5400 of the water flow systems 5100 with an operating signal and/or a flow of electric power (e.g., from the second portion 5850 of the control system 5800) to transition that pumping mechanism 5400 between two or more operating states. For example, in some embodiments, the controller can send an operating signal and/or a flow of electric power to place the pumping mechanism 5400 of one or more of the water flow systems 5100 in the first operating state or configuration. When in the first operating state or configuration, the pumping mechanism 5400 can generate a pressure differential that is operable to draw a flow of water into the pen assembly 5300 through the one or more inlets of the pens 5300*a*-5300*e* (described above), through at least a portion of the pen assembly 5300 (e.g., through the compartments 5340*a* and 5340*b* and the channels 5380 of the pens 5300*a*-5300*e*), and out of the pen assembly 5300 via the pumping mechanism 5400 and the pump opening(s) 5390 of the first pen 5300*a* (described above). In other words, the pumping mechanism 5400 can be configured to draw or pull a flow of water into and through the pen assembly 5300 when in the first operating state and/or configuration. In some instances, such a flow of water through the pen assembly 5300 can be associated with and/or can otherwise result in the water flow system 5100 being in an upweller configuration and/or operating condition. In some instances, such a flow of water through the pen assembly 5300 can be particularly desirable, for example, while the aquatic animals are in the relatively early stages of development.

In some instances, the controller can send an operating signal and/or a flow of electric power to place the pumping mechanism 5400 in the second operating state or configuration. When in the second operating state or configuration, the pumping mechanism 5400 can generate a pressure differential that is operable to draw a flow of water into the pen assembly 5300 via the pump opening 5390 of the first pen 5300*a* and the pumping mechanism 5400, through at least a portion of the pen assembly 5300 (e.g., through the compartments 5340*a* and 5340*b* and the channels 5380 of the pens 5300*a*-5300*e*), and out of the pen assembly 5300 via the one or more inlets of the pens 5300*a*-5300*e*. In other words, the pumping mechanism 5400 can be configured to push or urge a flow of water into and through the pen assembly 5300 when in the second operating state and/or configuration. In some instances, such a flow of water through the pen assembly 5300 can be associated with and/or can otherwise result in the water flow system 5100 being in a downweller configuration and/or operating condition. In some instances, such a flow of water through the pen assembly 5300 can be particularly desirable, for example, while the aquatic animals are in the relatively later stages of development.

In some embodiments, the pumping mechanism 5400 can also have a third operating state and/or third configuration in which the controller withholds a flow of electric power from the pumping mechanism 5400, thereby placing the pumping mechanism 5400 in a substantially powered off configuration. In other words, the third operating state and/or third configuration can be associated with the pumping mechanism 5400 being turned off and/or otherwise not drawing or pushing water into and/or through the pen assembly 5300. For example, in some embodiments, it may be desirable to place the pumping mechanism 5400 in the third operating state and/or configuration when a natural current of the body of water provides sufficient flow of water into and/or through the pen assembly 5300, thereby saving and/or otherwise not wasting electric power.

In other instances, however, it may be desirable to place the pumping mechanism 5400 in the second operating state despite the natural current of the body of water providing a sufficient flow of water into and/or through the pen assembly 5300. More specifically, the controller may place the pumping mechanism 5400 in the second operating state to push a flow of water into the pen assembly 5300 in a direction that is opposite a direction of the flow of the natural current. As such, the flow of water into and/or through a portion of the pen assembly 5300 in opposing directions can increase a volumetric flow rate of nutrient-rich water into the pen assembly 5300, which can facilitate the development of the aquatic animals disposed therein.

Although not shown in FIGS. 11-20, in some embodiments, the water flow systems 5100 can include, for example, two pumping mechanisms 5400, with a first pumping mechanism 5400 coupled to the first pen 5300*a* and a second pumping mechanism 5400 coupled to the fifth pen 5300*e*. In other words, the water flow systems 5100 can include pumping mechanisms 5400 disposed at opposite end of the pen assembly 5300. As described above, the controller can be configured to provide a control signal and/or a flow of electric power to each of the pumping mechanisms 5400 to selectively control and/or enhance a flow of water through the pen assemblies 5300. For example, in some embodiments, the controller can be configured to send a control signal and/or electric power to the first pumping mechanism 5400 to place the first pumping mechanism 5400 in the first operating state or the second operating state and can withhold electric power from the second pumping mechanism 5400 such that the second pumping mechanism 5400 is in the third operating state and/or is otherwise powered off. Accordingly, the first pumping mechanism 5400 can operate in substantially the same manner described above.

In some instances, the controller can also send a signal to the second pumping mechanism 5400 that is indicative of an instruction to control access to and/or through the pump openings of the fifth pen 5300*e* (as described in detail above). For example, in some embodiments, it may be desirable for the pump openings of the fifth pen 5300*e* to be substantially closed or occluded (e.g., by louvres or the like) while the first pumping mechanism 5400 is in the first or second operating state and the second pumping mechanism 5400 is in the third operating state. In other embodiments, it may be desirable for the pump openings of the fifth pen 5300*e* to be open/accessible and/or at least partially open/accessible while the first pumping mechanism 5400 is in the first or second operating state and the second pumping mechanism 5400 is in the third operating state. Thus, the first pumping mechanism 5400 can provide a flow of water through the pen assembly 5300 as described in detail above.

While the first pumping mechanism 5400 is described as being placed in the first or second operating state while the second pumping mechanism 5400 is in the third operating state, it should be understood that the operating states can be reversed. That is to say, the controller can send a control signal and/or a flow of electric power to the second pumping mechanism 5400 to place the second pumping mechanism 5400 in the first operating state or the second operating state and can withhold electric power from the first pumping mechanism 5400 such that the first pumping mechanism 5400 is in the third operating state. Moreover, the controller can be configured to send a signal to the first pumping mechanism 5400 that is indicative of an instruction to control access to and/or through the pump openings 5390 of the first pen 5300*e* (as described in detail above). Thus, the second pumping mechanism 5400 can provide a flow of water through the pen assembly 5300 as described in detail above.

In some instances, the controller can send a control signal and/or a flow of electric power to both the first pumping mechanism 5400 and the second pumping mechanism 5400 that places each of the pumping mechanisms 5400, for example, in the second state. As described above, the pumping mechanisms 5400 can be configured to provide a flow of water into the pen assembly 5300 via the pump openings 5390 (e.g., of the first pen 5300*a*) and the pumping mechanism 5400, through the pen assembly 5300, and out of the pen assembly 5300 via the inlets of the pens 5300*a*-5300*e*. In other words, the pumping mechanism 5400 can be configured to push a flow of water into the pen assembly 5300 when in the second operating state. In this example, with the controller placing each of the two pumping mechanisms in the second operating state, the pumping mechanisms 5400 can be configured to provide a flow of water into and through at least a portion of the pen assembly 5300 in opposing directions. As such, the flow of water into and/or through a portion of the pen assembly 5300 in opposing directions can increase a volumetric flow rate of nutrient-rich water into the pen assembly 5300, which can facilitate the development of the aquatic animals disposed therein.

In instances in which the natural current of the water provides sufficient flow into and/or through the pen assembly 5300, the controller can be configured to place both the pumping mechanism 5400 in the third operating state (e.g., powered off state). In some instances, depending on the direction of the current, the controller can send a signal to one of the pumping mechanism 5400 that is indicative of an instruction to provide access to and/or through the corresponding pump openings (e.g., to place the louvres or the like in an open state). The controller can also send a signal to the other pumping mechanism 5400 that is indicative of an instruction to close, block, and/or occlude the corresponding pump openings (e.g., the place the louvres or the like in a closed state). This arrangement can, for example, limit an amount of water that flows directly through the channels 5380 without flowing into and/or through the compartments 5340a and/or 5340b of the pens 5300a-5300e.

FIGS. 21-24 show an aquaculture system 6000 for the cultivation of aquatic animals (e.g., animals of the phylum Mollusca) according to an embodiment. The aquaculture system 6000 can include any number of water flow systems 6100, a number of anchoring systems 6600, and one or more control system 6800. In some embodiments, the aquaculture system 6000 and/or portions or aspects of the aquaculture system 6000 can be similar in form and/or function to any of the aquaculture systems 1000, 2000, 3000, 4000, and/or 5000 (or corresponding portions or aspects thereof) described in detail above. Accordingly, some such portions or aspects may not be described in further detail herein.

Figure 21:
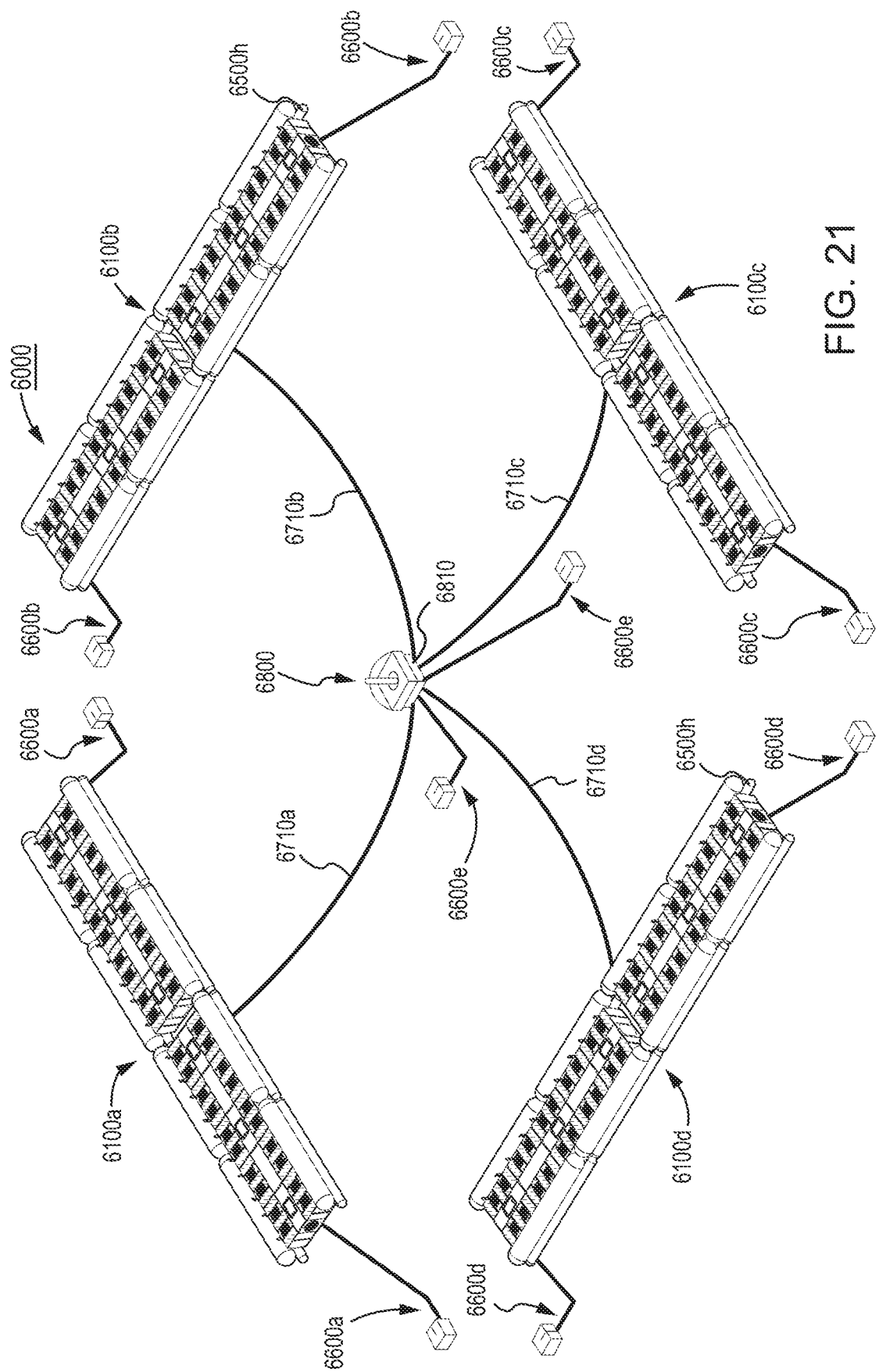
FIG. 21 is a perspective view of an aquaculture system, according to an embodiment.

As shown in FIG. 21, the aquaculture system 6000 includes a number of water flow systems 6100 that are each coupled or tethered to a pair of anchoring systems and a central buoy 5810 of the control system 5800. For example, in the embodiment shown in FIGS. 21-24, the aquaculture system 6000 includes four water flow systems—a first water flow system 6100a, a second water flow system 6100b, a third water flow system 6100c, and a fourth water flow system 6100d. In some embodiments, the arrangement of the aquaculture system 6000 can be similar to and/or substantially the same as the arrangement of the aquaculture system 3000 described above with reference to FIG. 8.

While the aquaculture system 6000 is shown in FIG. 21 as including four water flow systems 6100a-6100d disposed in a particular arrangement, in other embodiments, the aquaculture system 6000 can include any suitable number of water flow systems 6100 arranged in any suitable manner. Moreover, each of the water flow systems 6100 included in the aquaculture system 6000 can be operably coupled to the anchoring system 6600 and the control system 6800, as described in further detail herein. In other embodiments, each water flow system 6100 can be coupled to an independent anchoring system and/or an independent control system (e.g., similar to the aquaculture system 3000 described above with reference to FIG. 8).

The water flow systems 6100 included in the aquaculture system 6000 can be any suitable shape, size, and/or configuration. In some embodiments, the water flow systems 6100 can be substantially similar in at least form and/or function to any of the water flow systems 1100, 2100, and/or 5100, and/or the water flow assemblies 3120 or 4120 described herein. More specifically, the water flow systems 6100 can be similar in at least form and/or function to the water flow systems 5100 described above with reference to FIGS. 11-20 and can be arranged in a manner similar to the arrangement of the aquaculture system 3000 described above with reference to FIG. 8. In some embodiments, the arrangement of the aquaculture system 6000 can be such that each water flow system 6100 is substantially the same. In other embodiments, the aquaculture system 6000 can include two or more different types of water flow systems and/or two or more water flow systems having different configurations.

Figure 22:
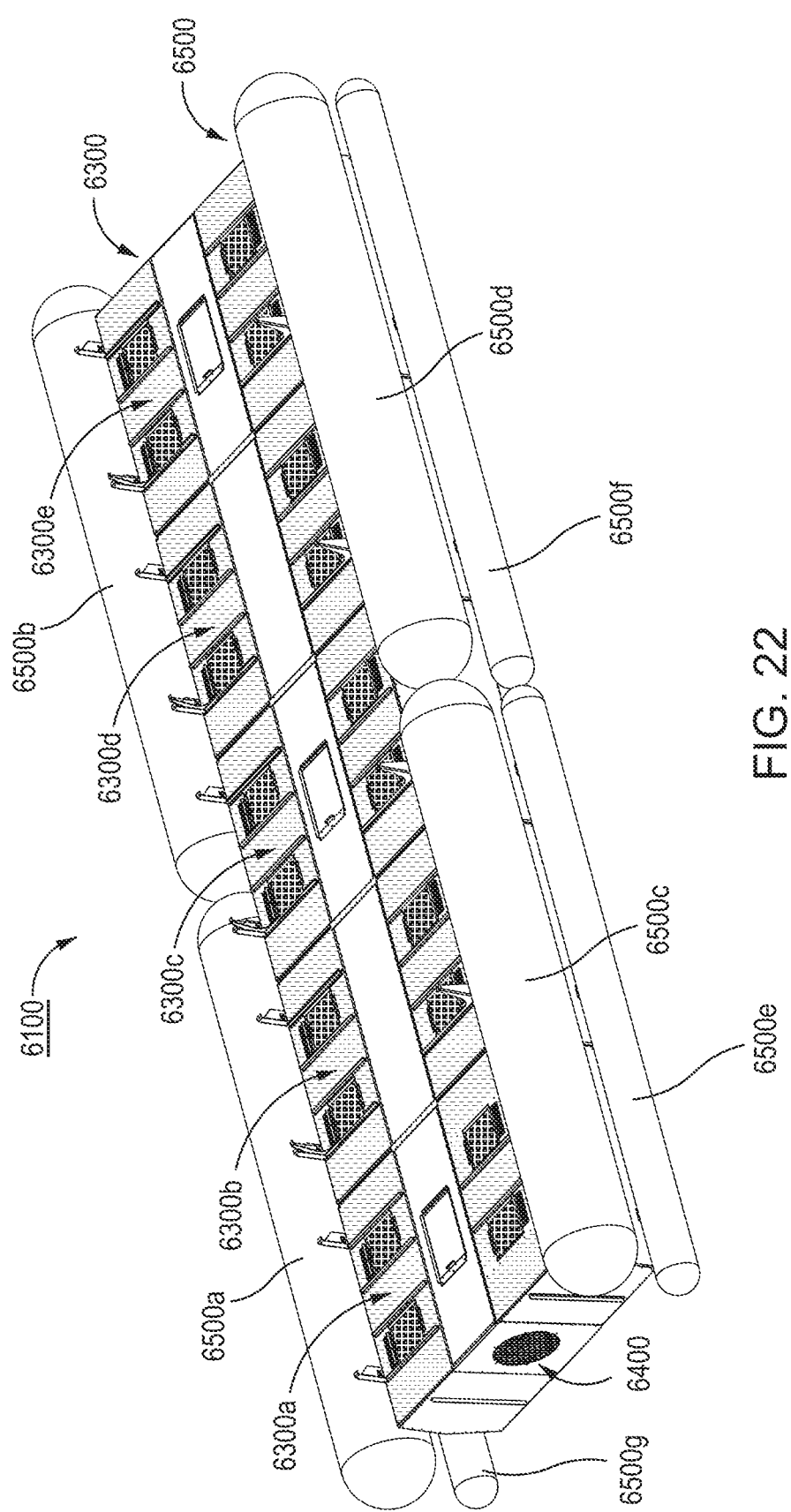
FIG. 22 is a perspective view of a water flow system included in the aquaculture system of FIG. 21.
Figure 23:
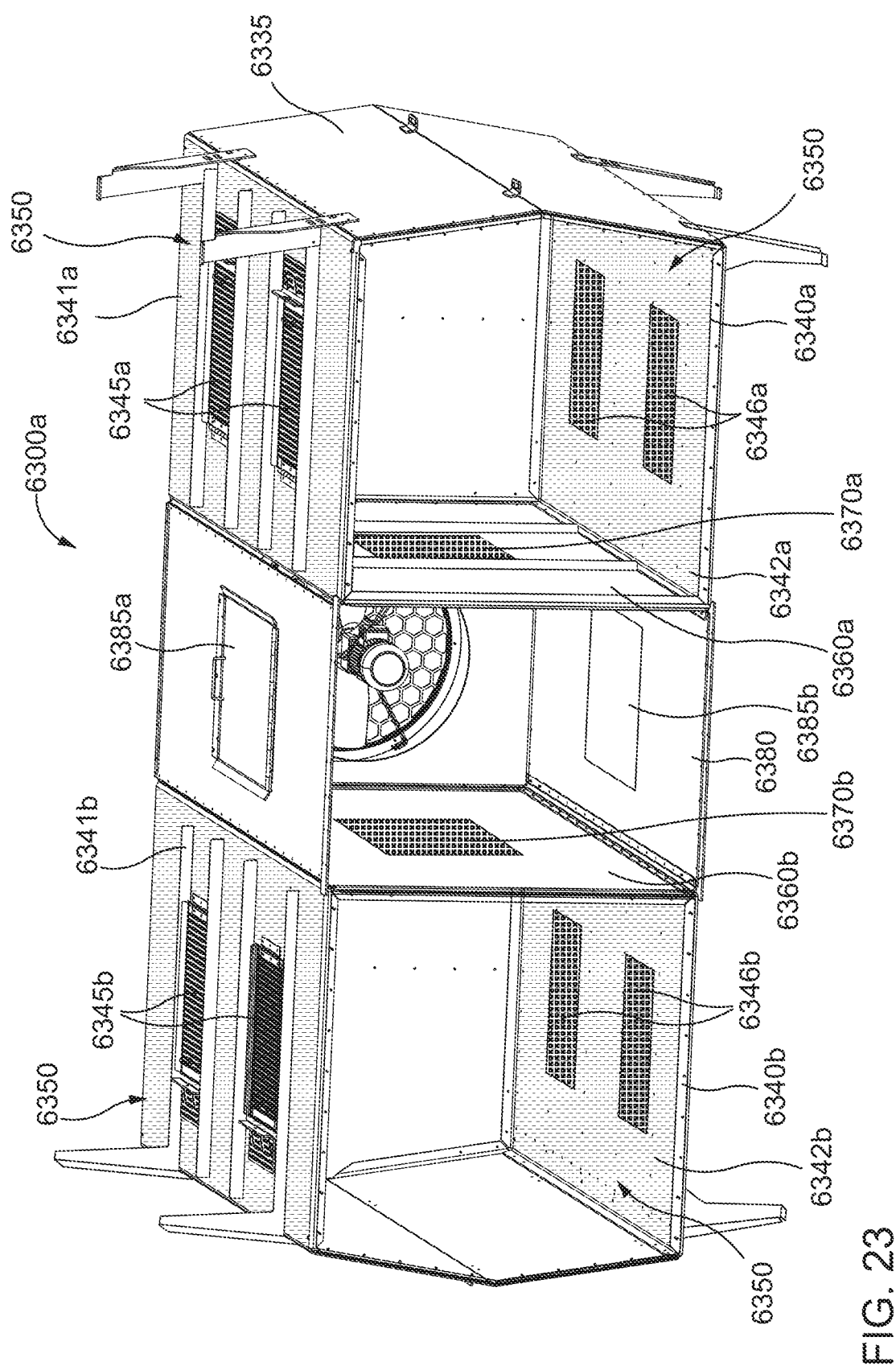
FIGS. 23 and 24 are a front perspective view and a top view, respectively, of a first pen included in the water flow system of FIG. 22.
Figure 24:
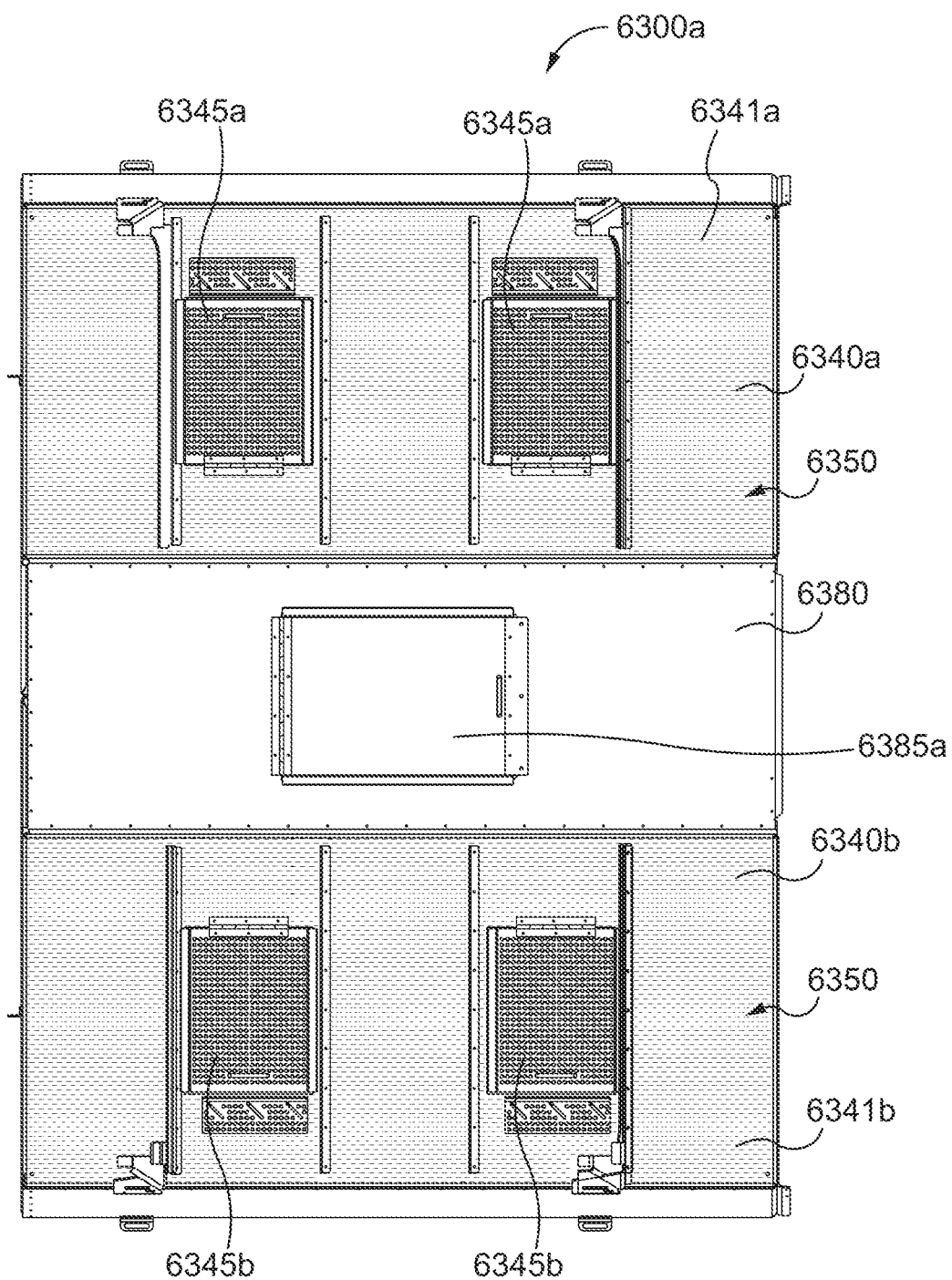

In the embodiment shown in FIGS. 21-24, each of the water flow systems 6100a-6100d is substantially the same. As such, the following description of the water flow system 6100 shown in FIGS. 22-24 is intended to apply to each of the water flow systems 6100a, 6100b, 6100c, and 6100d shown in FIG. 21. Moreover, as described above, the water flow system 6100 can be substantially similar to the water flow systems 5100 described above with reference to FIGS. 11-20. Thus, certain components, features, and/or aspects of the water flow system 6100 are identified below but are not described in further detail herein.

As shown in FIG. 22, the water flow system 6100 includes a pen assembly 6300, a pumping mechanism 6400, and a set of buoyancy tanks 6500. The pen assembly 6300 can include any number of pens or pen portions that can be coupled together to collectively form the pen assembly 6300. As described in further detail herein, the pen assembly 6300 is configured to be coupled to the pumping mechanism 6400 and to one or more buoyancy tanks 6500 on a first side of the pen assembly 6300 and to one or more buoyancy tanks 6500 on a second side of the pen assembly 6300 opposite the first side.

The pen assembly 6300 includes a first pen 6300a, a second pen 6300b, a third pen 6300c, a fourth pen 6300d, and a fifth pen 6300e. The pen assembly 6300 can include a first end portion at which the first pen 6300a is disposed and a second end portion at which the fifth pen 6300e is disposed. As shown, the pens 6300a, 6300b, 6300c, 6300d, and 6300e are coupled in series and aligned such that a longitudinal axis of each pen 6300a-6300e is substantially coaxial. In other words, the pens 6300a-6300e can be coupled together and/or aligned such that a common longitudinal axis of the pen assembly 6300 extends through each of the pens 6300a-6300e.

In general, each of the pens 6300a-6300e can be similar to and/or substantially the same as the pens 5300a-5300e, respectively, described in detail above. For example, the pens 6300a-6300e can be formed from a relatively thin material that encloses or substantially encloses an inner volume. The pens 6300a-6300e and/or a set of exterior walls forming an outer surface of the pens 6300a-6300e can have a polygonal cross-sectional shape such as, but not limited to, a rectangular shape, a pentagonal shape, a hexagonal shape, a heptagonal shape, an octagonal shape, a nonagonal shape, a decagonal shape, and/or any other suitable shape. Moreover, each of the pens 6300a-6300e can have substantially the same cross-sectional shape.

FIGS. 23 and 24 illustrate details of the first pen 6300a. As described above, the first pen 6300a can be disposed at, for example, the first end portion of the pen assembly 6300. As shown in FIG. 23, the first pen 6300a includes a set of exterior walls 6335 that collectively define an inner volume of the first pen 6300a. In some embodiments, the first pen 6300a and/or the exterior walls 6335 of the first pen 6300a can have a monocoque construction or arrangement that can reduce or limit an amount of external structural support otherwise used to support the first pen 6300a. As shown, the first pen 6300a includes a first partition 6360a and a second partition 6360b that partition, separate, and/or otherwise form a first compartment 6340a, a second compartment 6340b, and a channel 6380 of the first pen 6300a. More specifically, the first partition 6360a and the second partition 6360b can be arranged within the first pen 6300a such that the channel 6380 is disposed between the first compartment 6340a and the second compartment 6340b.

The first compartment 6340a and the second compartment 6340b can be substantially similar in form and/or function to the first compartment 5340a and the second compartment 5340b, respectively, of the first pen 5300a. For example, as shown in FIG. 23, the first compartment 6340a includes a first wall or surface 6341a (e.g., a top wall or surface) and a second wall or surface 6342a (e.g., a bottom wall or surface). The first wall or surface 6341a (referred to herein as the "first wall") of the first compartment 6340a can include a set of access ports 6345a. The second wall or surface 6342a (e.g., the bottom wall or surface) is disposed opposite the first wall 6341a and is configured to define and/or enclose a portion of the first compartment 6340a. The first partition 6360a of the first pen 6300a is configured to separate and/or partition the first compartment 6340a from the channel 6380. The first partition 6360a defines a set of openings 6370a (e.g., holes, apertures, perforations, louvres, etc.) configured to allow a flow of water or fluid between the first compartment 6340a and the channel 6380.

The second compartment 6340b includes a first wall or surface 6341b (e.g., a top wall or surface) and a second wall or surface 6342b (e.g., a bottom wall or surface). The first wall or surface 6341b (referred to herein as the "first wall") of the second compartment 6340b can include a set of access ports 6345b. The second wall or surface 6342b (e.g., the bottom wall or surface) is disposed opposite the first wall 6341b and is configured to define and/or enclose a portion of the second compartment 6340b. The second partition 6360b of the first pen 6300b is configured to separate and/or partition the second compartment 6340b from the channel 6380. The second partition 6360b defines a set of openings 6370b (e.g., holes, apertures, perforations, louvres, etc.) configured to allow a flow of water or fluid between the second compartment 6340b and the channel 6380.

Each of the first compartment 6340a and the second compartment 6340b can differ from the first compartment 5340a and the second compartment 5340b, respectively, by forming the first walls 6341a and 6341b and the second walls 6342a and 6342b from a mesh material, grate material, and/or any other material defining a number of openings, as shown in FIGS. 23 and 24. The material (referred to herein for simplicity as "mesh material") can include a set of openings, apertures, holes, pores, perforations, etc. configured to provide a flow of water into the first compartment 6340a and the second compartment 6340b. Said another way, the mesh material and/or perforations or holes formed by the mesh material can be and/or can define a set of inlets 6350. As described above with reference to the compartments 5340a and 5340b, the inlets 6350 can have a size and/or shape that is at least partially based on a size, shape, and/or stage of development of the aquatic animals configured to be disposed within the compartment 6340a and 6340b. Thus, the inlets 6350 can allow a flow of water into or out of the compartments 6340a and 6340b.

In addition, each of the first compartment 6340a and the second compartment 6340b can further differ from the first compartment 5340a and the second compartment 5340b, respectively, by forming and/or including a set of access ports 6346a and 6346b, respectively in the second walls 6342a and 6342b, respectively, as shown in FIG. 23. The arrangement and/or configuration of the access ports 6346a and 6346b can be substantially similar to the arrangement and/or configuration of the access portions 6345a and 6345b formed by and/or included in the first walls 6345a and 6345b, respectively.

As shown in FIG. 23, the channel 6380 is disposed between the first compartment 6340a and the second compartment 6340b and extends, for example, between (and through) a first end and a second end of the first pen 6300a. In some embodiments, the channel 6380 can be substantially enclosed on five sides, with a sixth side that is open to, for example, a channel of the second pen 6300b. As shown in FIGS. 23 and 24, a portion of the exterior wall 6335 forming the channel 6380 includes and/or can define an access port 6385. The access port 6385 can be configured to provide an operator with access to the channel 6380. Accordingly, in some embodiments, the access port 6385 can be similar in at least form and/or function to the access port 5385 of the first pen 5300a and thus, is not described in further detail herein.

As shown in FIG. 23, the arrangement of the first pen 6300a is such that the pumping mechanism 6400 is coupled to a wall defining a portion of the channel 6380. In other words, the pumping mechanism 6400 is coupled to the first pen 6300a and is in fluid communication with the channel 6380. The pumping mechanism 6400 can be coupled to a wall or surface of the first pen 6300a, which in turn, defines a set of pump openings 6390. As such, the pumping mechanism 6400 can placed in an operating state and/or conditions that facilitate a flow of water into or out of the channel 6380 via the set of pump openings 6390.

The first pen 6300a can be configured to function in substantially the same manner as the first pen 5300a and thus, is not described in further detail herein. The second pen 6300b, the third pen 6300c, the fourth pen 6300d, and the fifth pen 6300e can be substantially similar and form and/or function to the second pen 5300b, the third pen 5300c, the fourth pen 5300d, and the fifth pen 5300e, respectively. The pens 6300b-6300e can differ from the pens 5300b-5300e in substantially the same manner described above with reference to the first pen 6300a. Accordingly, the pen assembly 6300 is not described in further detail herein.

The pumping mechanism 6400 of the water flow system 6100 is coupled to the first pen 6300a. The pumping mechanism 6400 can be used to generate a flow of water through at least a portion of the water flow system 6100, which in turn, can replenish nutrient-rich water for the developing aquatic animals. As shown, the pumping mechanism 6400 is coupled to a portion of the exterior walls 6335 of the first pen 6300a and aligned with and/or otherwise disposed adjacent to the pump openings 6390 defined by the portion of the exterior walls 6335 of the first pen 6300a. In other embodiments, the water flow system 6100 can include multiple pumping mechanisms 6400, as described in detail above with reference to the water flow systems 5100.

The pumping mechanism 6400 can be any suitable pump or flow generator including, but not limited to, one or more rotary pumps, one or more reciprocating pumps, one or more centrifugal pumps, one or more paddle wheel systems, one or more propellers or impellers, and/or the like. In other embodiments, the pumping mechanism 6400 can be any suitable machine, device, system, and/or feature configured to generate a pressure differential operable to cause a fluid (e.g., water) to flow from an area of relatively higher pressure to an area of relatively lower pressure. Moreover, the arrangement and/or configuration of the pumping mechanism 6400 can be such that the pumping mechanism 6400 remains operational when completely submerged or only partially submerged in a body of water. The pumping mechanism 6400 can be operably coupled to the control system 6800, which in turn, can be configured to provide a flow of electrical power and/or one or more operating signals to the pumping mechanism 6400 to place the pumping mechanism 6400 in a desired operating state and/or condition. As such, the pumping mechanism 6400 can be substantially similar in form and/or function to the pumping mechanism 5400 and is therefore not described in further detail herein.

The buoyancy tanks 6500 of the water flow system 6100 are coupled to the pen assembly 6300 and are configured to provide floatation for the water flow system 6100. The buoyancy tanks 6500 can be coupled to the pen assembly 6300 in any suitable manner and/or in any suitable arrangement such as any of those described above. The water flow system 6100 can include any number of buoyancy tanks 6500. For example, in the embodiment shown in FIGS. 21-24, the water flow system 6100 can include eight buoyancy tanks 6500a-6500h. The buoyancy tanks 6500a-5500h can be coupled to the pen assembly 6300 and/or otherwise disposed in any suitable arrangement and/or configuration. For example, the buoyancy tanks 6500 can be arranged in substantially the same manner as the buoyancy tanks 5500. For example, the two buoyancy tanks 6500a and 6500b are coupled to the pen assembly 6300 on a first side of the longitudinal axis (defined by the pen assembly 6300) at or near an upper portion of the pen assembly 6300 (see e.g., FIG. 22), the two buoyancy tanks 6500c and 6500d are coupled to the pen assembly 6300 on a second side of the longitudinal axis, opposite the first side, at or near the upper portion of the pen assembly 6300 (see e.g., FIG. 22), the two buoyancy tanks 6500e and 6500f are coupled to the pen assembly 6300 on the second side of the longitudinal axis at or near a lower portion of the pen assembly 6300 (see e.g., FIG. 22), and the two buoyancy tanks 6500g and 6500h are coupled to the pen assembly 6300 on the first side of the longitudinal axis at or near the lower portion of the pen assembly 6300 (see e.g., FIGS. 21 and 22). Each of the buoyancy tanks 6500 can be any suitable shape, size, and/or configuration such as any of those described herein.

The buoyancy tanks 6500 are configured to contain a volume of fluid (e.g., a gas or a liquid) to provide a desired amount of floatation to or for the water flow system 6100 and/or to place the water flow system 6100 and/or at least the pen assembly 6300 in a desired orientation. For example, the buoyancy tanks 6500 can be configured to contain and/or at least temporarily contain a volume of air (or other gas or fluid) to control and/or adjust a depth of the water flow system 6100 within the body of water, as described above with reference to FIGS. 7A-7C. For example, each of the buoyancy tanks 6500a-6500h can be coupled to and/or otherwise in fluid communication with a portion of the control system 6800 that is configured to transfer a volume of air, gas, and/or fluid between the buoyancy tanks 6500 and the portion of the control system 6800. As such, in some instances, the portion of the control system 6800 can adjust, change, and/or otherwise increase or decrease a volume of air in the buoyancy tanks 6500 to change an amount of floatation provided to the water flow system 6100 and/or to rotate, flip, rock, gyrate, shake, etc. the water flow system 6100 about the longitudinal axis of the pen assembly 6300. Accordingly, the buoyancy tanks 6500 can be substantially similar in form and/or function to the buoyancy tanks 5500 and therefore are not described in further detail herein.

The control system 6800 of the aquaculture system 6000 can be any suitable configuration and can include any suitable component, assembly, device, mechanism, and/or the like associated with controlling one or more portions of the aquaculture system 6000. As shown in FIG. 21 the control system 6800 can include a buoy 6810 that is separate from the water flow systems 6100 and that is configured to house and/or otherwise contain at least a portion of the control system 6800. The buoy 6810 and thus, the control system 6800, can be in communication with (e.g., electrical communication, fluid communication, and/or the like) and/ or can otherwise be connected to each of the water flow systems 6100a, 6100b, 6100c, and 6100d via one or more cables 6710a, 6710b, 6710c, and 6710d, respectively, as described above with reference to the aquaculture system 3000.

In some embodiments, the control system 6800 can be substantially similar in form and/or function to the control system 5800 described above with reference to FIGS. 18-20. Accordingly, the control system 6800 can be configured to provide electric power to one or more portions of the aquaculture system 6000, monitor one or more system parameters and/or states the of the water flow systems 6100a-6100d, send signals to and/or receive signals from any suitable external control device, electronic device, system, service, etc., and/or adjust one or more parameters, states, configurations, etc. of the aquaculture system 6000 to facilitate the development of the aquatic animals disposed within the water flow systems 6100a-6100d, as described in detail above with reference to the control system 5800.

While the aquaculture system 6000 is generally similar in form and/or function to the aquaculture system 5000, the arrangement of the anchoring system 6600 of the aquaculture system 6000 can differ from the arrangement of the anchoring system 5600 of the aquaculture system 5000. For example, each of the water flow systems 6100a-6100d and the buoy 6810 of the control system 6800 can be independently coupled to a pair of anchoring systems. Specifically, as shown in FIG. 21, the water flow system 6100a can be independently coupled to a pair of anchoring systems 6600a, the water flow system 6100b can be independently coupled to a pair of anchoring systems 660b, the water flow system 6100c can be independently coupled to a pair of anchoring systems 6600c, the water flow system 6100d can be independently coupled to a pair of anchoring systems 6600d, and the buoy 6810 of the control system 6800 can be independently coupled to a pair of anchoring systems 6600e. In some embodiments, each of the anchoring systems 6600a-6600e can include a pair of anchors or moorings and a pair of tethers configured to tether the anchors or moorings to the respective water flow system 6100a-6100d and/or buoy 6810 of the control system 6800. In some instances, independently coupling the water flow systems 6100a-6100d and the buoy 6810 of the control system 6800 to the pair of anchoring systems 6600a-6600e, respectively, can limit and/ or reduce an amount of movement of the water flow systems 6100a-6100d and the control system 6800 relative to, for example, the anchoring system 5600 described above with reference to the aquaculture system 5000. Accordingly, at least parts and/or portions of the arrangement and/or configuration of the aquaculture system 6000 can be similar to or substantially the same as the arrangement and/or configuration of the aquaculture systems 3000 and/or 6000 described above and thus are not described in further detail herein.

Figure 25:
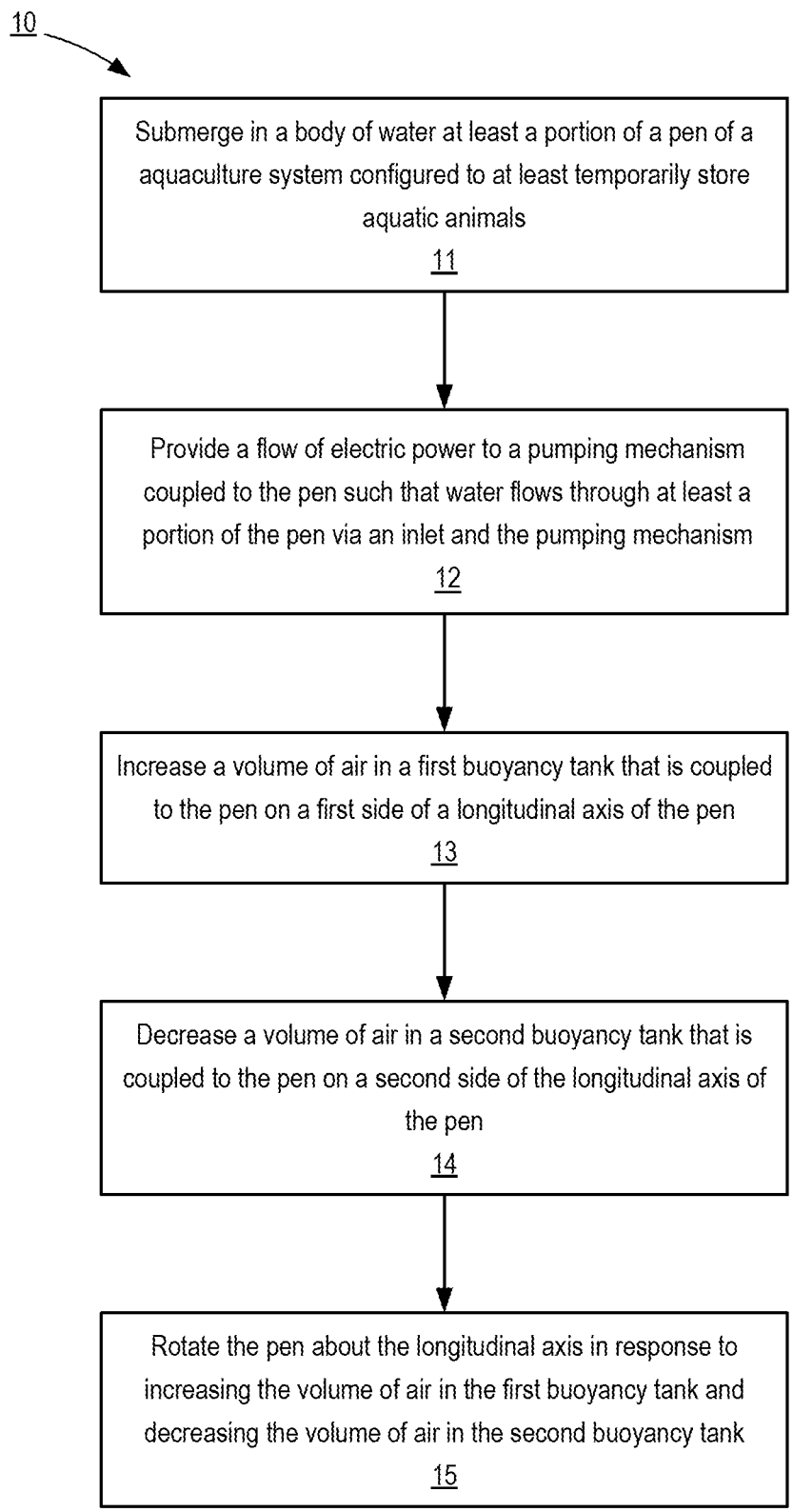
FIG. 25 is a flow chart illustrating a method of using an aquaculture system, according to an embodiment.

FIG. 25 illustrates a flowchart describing a method 10 of using an aquaculture system to facilitate the development of aquatic animals (e.g., animals of the phylum Mollusca). The aquaculture system can be substantially similar to any of the aquaculture systems 1000, 2000, 3000, 4000, 5000, and/or 6000 described above. As such, the aquaculture system can include, for example, at least a pen and/or pen assembly, a pumping mechanism, one or more buoyancy tanks, and a control system/power system.

As shown, the method 10 includes submerging in a body of water at least a portion of a pen (or pen assembly) configured to at least temporarily store the aquatic animals, at 11. In some embodiments, for example, the aquaculture system can include a pen or pen assembly such as the pens 1300, 2300, 5300, and/or 6300 described in detail above. As such, the pen and/or pen assembly can include a number of compartments configured to contain the aquatic animals. Each of the compartments is physically separated from but in fluid communication with a channel of the pen such that water can flow therebetween, as described in detail above.

A flow of electric power is provided to the pumping mechanism coupled to the pen such that water flows into the pen via an inlet and flows out of the pen via the pumping mechanism, at 12. For example, as described above the compartments of the pen can include any number of inlets configured to allow a flow of water into and/or out of the compartment. In addition, a partition can be configured to physically separate the compartments from the channel of the pen but each partition can include one or more openings configured to allow a flow of water therethrough. In some embodiments, the pumping mechanism can be coupled to the pen at or near the channel such that operation of the pumping mechanism generates a pressure differential within the channel sufficient to facilitate a flow of water therethrough.

As described in detail above, the control system of the aquaculture system can be configured to control the pumping mechanism. For example, the control system can send a control signal and/or at least a flow of electric power to the pumping mechanism, which, in response, can rotate a propeller and/or otherwise initiate the pumping mechanism to generate the flow of water through the pen. Moreover, the pen and the pumping mechanism can be in an upweller configuration such that, in response to the operation of the pumping mechanism, water flows into the compartments of the pen, through the channel, and out of the pen via the pumping mechanism. In some instances, the flow of the water through the pen can provide and/or replenish nutrient-rich water within the pen that can facilitate the development of the aquatic animals disposed therein. Furthermore, in response to an instruction and/or one or more criterion/criteria being satisfied, control system can be configured to send a control signal and/or at least a flow of electric power to the pumping mechanism that can transition the pumping mechanism from a first configuration (e.g., the upweller configuration) to a second configuration (e.g., a downweller configuration). In some instances, when in the second configuration, the pumping mechanism can be configured to provide a flow into the pen in a substantially opposite direction. For example, the pumping mechanism can be configured to generate a flow of water that flows into the pen via the pumping mechanism, through the channel, and one or more of the compartments of the pen, and out of the pen via the inlets, as described in detail above with reference to, for example, the pumping mechanism 5400. In other instances, the control system may withhold a flow of electric power from the pumping mechanism to place the pumping mechanism in a third state or configuration (e.g., a powered off state) in which water flows through the pen in response to a natural current of the water.

A volume of air in a first buoyancy tank is increased, at 13, and a volume of air in a second buoyancy tank is decreased, at 14. As described above with reference to, for example, the aquaculture system 5000, in response to an instruction and/or one or more criterion/criteria being satisfied, the control system can be configured to provide a flow of air between the first buoyancy tank and the control system and the second buoyancy tank and the control system. In some embodiments, the control system can include, for example, a compressor, blower, and/or any suitable plumbing to allow a transfer of air between the control system and the buoyancy tanks of the aquaculture system. Moreover, the arrangement of the aquaculture system can be such that the first buoyancy tank is coupled to the pen (or pen assembly) on a first side of a longitudinal axis defined by the pen (or pen assembly) and the second buoyancy tank is coupled to the pen (or pen assembly) on a second side of the longitudinal axis opposite the first side.

The pen is rotated about the longitudinal axis in response to increasing the volume of air in the first buoyancy tank and decreasing the volume of air in the second buoyancy tank, at 15. For example, as described in detail above with reference to the aquaculture system 5000, in some instances, it may be desirable to rotate the pen 180° about the longitudinal axis. In some instances, rotating the pen can be associated with and/or can otherwise place the pen in a downweller configuration. In other instances, the pen can remain in the upweller configuration regardless of the orientation of the pen. In some instances, the control system can be configured to adjust the volume of air in the buoyancy tanks in an alternating manner, which can be operable to rock, gyrate, shake, and/or otherwise partially rotate the pen about the longitudinal axis. In some such instances, the rocking of the pen can be operable to redistribute at least a portion of the aquatic animals contained in the pen. In other instances, the control system can be configured to adjust the volume of air in the buoyancy tanks to place the pen in a non-horizontal orientation. For example, the control system can adjust the volume of air in the buoyancy tanks such that the compartments on a first side of the channel are submerged in the water while the compartments on a second side of the channel are substantially above the water (or vice versa). In some instances, placing the pen in such an orientation can facilitate, for example, the harvesting of the aquatic animals from the compartments disposed outside of or above the water, as described in detail above.

As described in detail above with reference to the aquaculture systems 1000, 2000, 3000, 4000, 5000, and/or 6000, in some instances, it may be desirable to adjust a volume and/or pressure of air or fluid in one or more buoyancy tanks to adjust an amount of floatation provided to or for a water flow system and/or to adjust or change an orientation of the water flow system. In some instances, a controller of an aquaculture system can be configured to adjust the volume and/or pressure of air or fluid in the buoyancy tanks in one or more specific ways and/or in one or more specific sequences to place the water flow system in a desired position.

For example, FIGS. 26A-26G illustrate a water flow system 7100 according to an embodiment. The water flow system 7100 can be substantially similar to any of the water flow systems and/or water flow assemblies described herein. For example, in some embodiments, the water flow system 7100 can be substantially similar to and/or the same as the water flow systems 5100 and/or 6100 described in detail above. Accordingly, the water flow system 7100 includes a pen assembly 7300 having any number of individual pens or pen portions (not shown), at least one pumping mechanism 7400, and a set of buoyancy tanks 7500*a*-7500*d*. The water flow system 7100 can be in communication with a control system configured to control the operating states of the pumping mechanism 7400 and/or the set of buoyancy tanks 7500*a*-7500*d*, as described in detail above with reference to at least the control system 5800.

In the embodiment shown in FIGS. 26A-26G, the water flow system 7100 includes a first buoyancy tank 7500*a*, a second buoyancy tank 7500*b*, a third buoyancy tank 7500*c*, and a fourth buoyancy tank 7500*d*. As shown, the first buoyancy tank 7500*a* can be coupled to, for example, a first side of the pen assembly 7300 at or near an upper portion thereof (e.g., an upper left corner, as shown in FIGS. 26A-26G). The second buoyancy tank 7500*b* can be coupled to, for example, a second side of the pen assembly 7300

(opposite the first side) at or near the upper portion thereof (e.g., an upper right corner, as shown in FIGS. 26A-26G). The third buoyancy tank 7500c can be coupled to, for example, the second side of the pen assembly 7300 at or near a lower portion thereof (e.g., a lower right corner, as shown in FIGS. 26A-26G). The fourth buoyancy tank 7500d can be coupled to, for example, the first side of the pen assembly 7300 at or near the lower portion thereof (e.g., a lower left corner as shown in FIGS. 26A-26G).

Figure 26A:
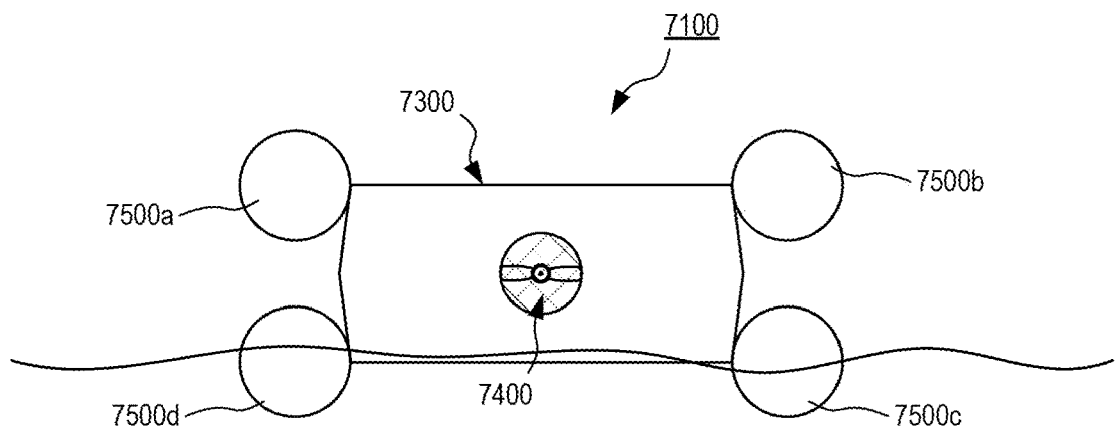
FIGS. 26A-26G are schematic illustrations showing a water flow system in various configurations based at least in part on a fill volume of one or more buoyancy tanks.

In some instances, it may be desirable to adjust a volume and/or pressure of air or fluid in one or more of the buoyancy tanks 7500a-7500d to place the water flow system 7100 in, for example, a drying position such that substantially the entire pen assembly 7300 is above the surface of the water in which the water flow system 7100 is disposed, as shown in FIG. 26A. For example, placing the water flow system 7100 in the drying position can allow for harvesting of the aquatic animals and/or maintenance of one or more portions of the water flow system 7100 (as described in detail above). In such instances, the controller can be configured to provide a volume of air or fluid in the buoyancy tanks 7500a-7500d such that each buoyancy tank 7500a-7500d is substantially filled. In this manner, the third buoyancy tank 7500c and the fourth buoyancy tank 7500d (e.g., the buoyancy tanks disposed at or near the lower portion of the pen assembly 7300) can provide a sufficient amount of floatation to place the pen assembly 7300 at, near, and/or above the surface of the water, as shown in FIG. 26A.

Figure 26B:
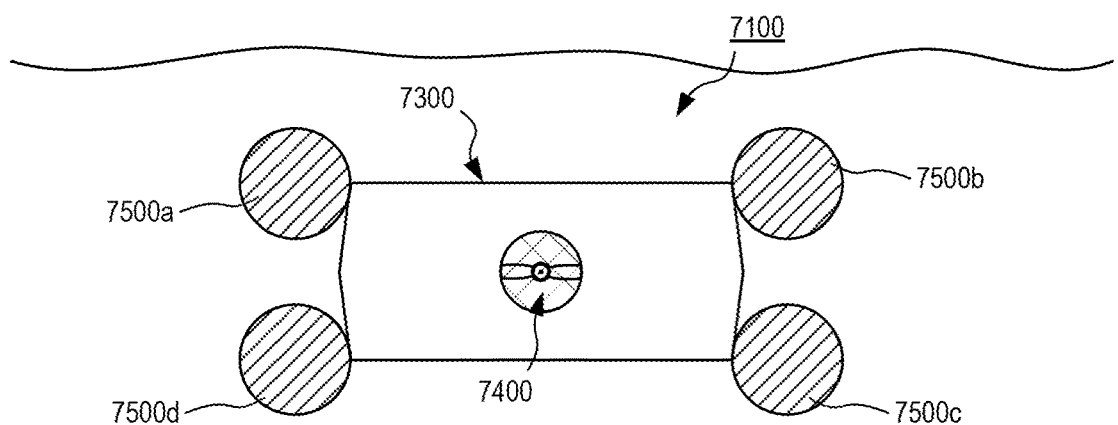

In some instances, it may be desirable to adjust a volume and/or pressure of air or fluid in one or more of the buoyancy tanks 7500a-7500d to place the water flow system 7100 in, for example, a submerged position such that the entire water flow system 7100 is submerged and/or otherwise below the surface of the water in which the water flow system 7100 is disposed, as shown in FIG. 26B. For example, placing the water flow system 7100 in the submerged position can protect the water flow system 7100 in the event of severe and/or extreme local weather conditions (as described in detail above). In such instances, the controller can be configured to adjust a volume of air or fluid to the buoyancy tanks 7500a-7500d such that each buoyancy tank 7500a-7500d is partially filled and/or substantially evacuated of air or fluid. In this manner, the buoyancy tanks 7500a-7500d provide a limited amount of floatation to place the water flow system 7100 in a position below the surface of the water, as shown in FIG. 26B.

Figure 26C:
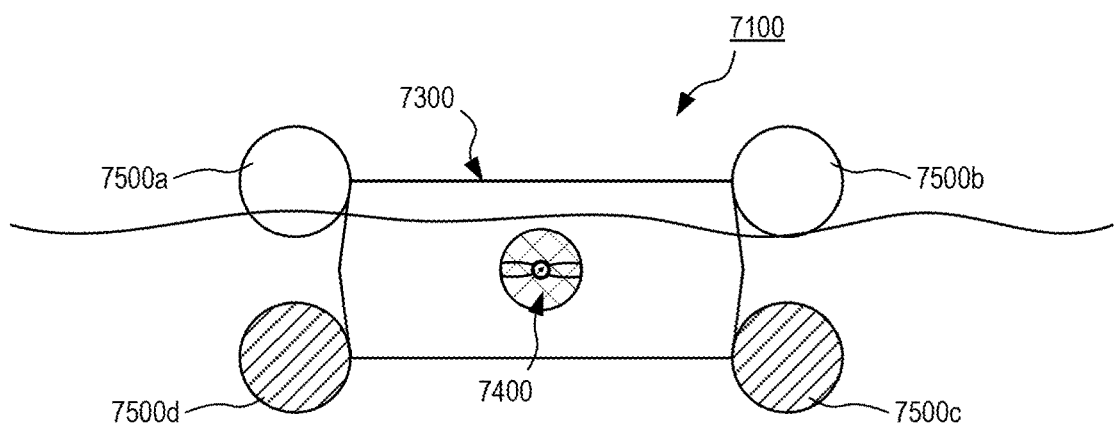

In some instances, it may be desirable to adjust a volume and/or pressure of air or fluid in one or more of the buoyancy tanks 7500a-7500d to place the water flow system 7100 in, for example, a normal, standard, and/or growing position such that most or substantially all of the pen assembly 7300 is submerged and/or otherwise below the surface of the water in which the water flow system 7100 is disposed, as shown in FIG. 26C. For example, the pen assembly 7300 can be sufficiently submerged such that the pumping mechanism 7400 is below the surface of the water. In some instances, such a position can be desirable for the development and/or growth of the aquatic animals configured to be disposed within the pen assembly 7300 (as described in detail above). In such instances, the controller can be configured to adjust a volume of air or fluid in the buoyancy tanks 7500a-7500d such that each of the first buoyancy tank 7500a and the second buoyancy tank 7500b is substantially filled and each of the third buoyancy tank 7500c and the fourth buoyancy tank 7500d is partially filled and/or substantially evacuated of air or fluid. With the first buoyancy tank 7500a and the second buoyancy tank 7500b substantially filled, the buoyancy tanks 7500a and 7500b can float near, at, or on the surface of the water, as shown in FIG. 26C. Each of the third buoyancy tank 7500c and the fourth buoyancy tank 7500d can be partially filled with air or fluid to provide a relatively small amount of floatation or can be substantially evacuated or not filled, thereby providing little to no amount of floatation.

FIGS. 26D-26G illustrate a sequence of adjusting the volume and/or pressure in at least one of the buoyancy tanks 7500a-7500d to rotate the water flow system 7100 about a longitudinal axis of the pen assembly 7300, as described in detail above with reference to the aquaculture system 5000. In some instances, it may be desirable to rotate the water flow system 7100 and/or at least the pen assembly 7300 thereof to facilitate the development and/or growth of the aquatic animals disposed in the pens and/or to redistribute the aquatic animals within the pens. While the sequence is described herein as providing rotation about a longitudinal axis of the pen assembly 7300 it should be understood that a similar sequence can be performed to rotate the water flow system about an axis that is perpendicular to the longitudinal axis (e.g., a lateral axis of the pen assembly 7300), as described above with reference to the aquaculture system 5000.

Figure 26D:
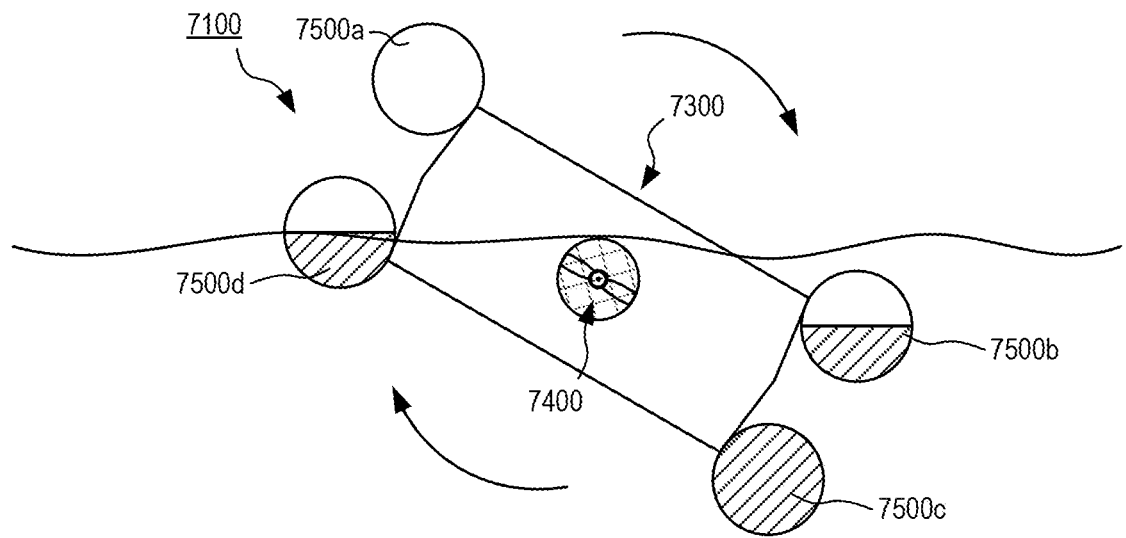
Figure 26E:
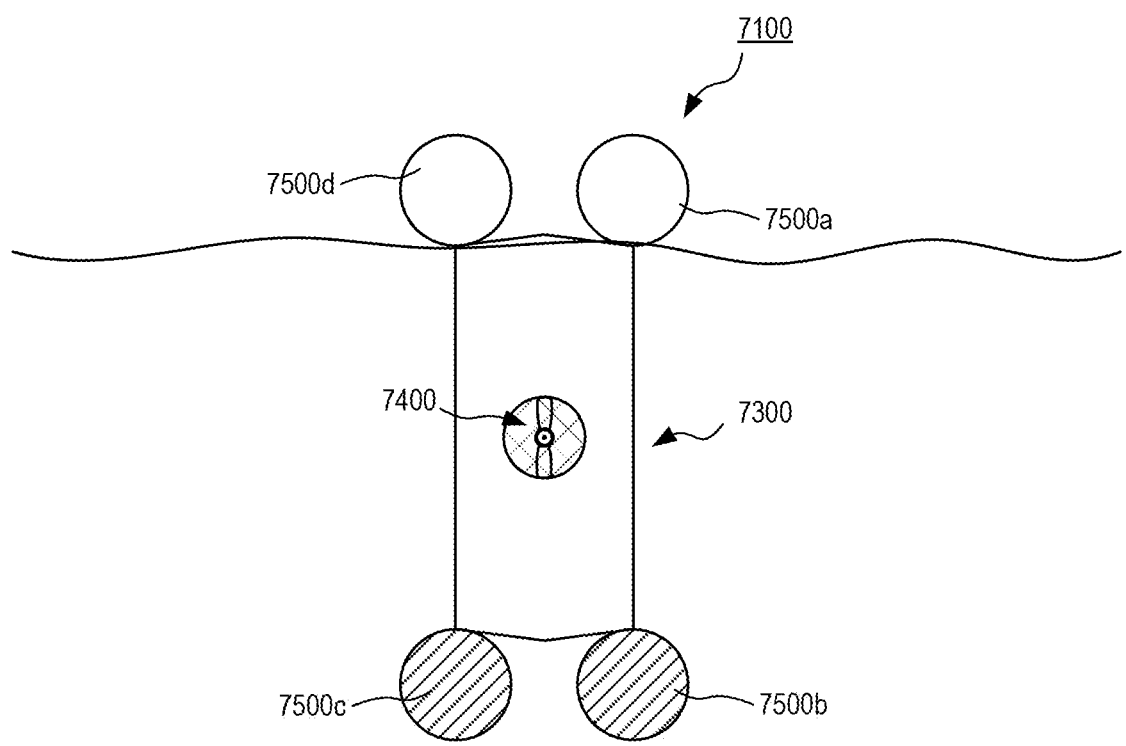
Figure 26F:
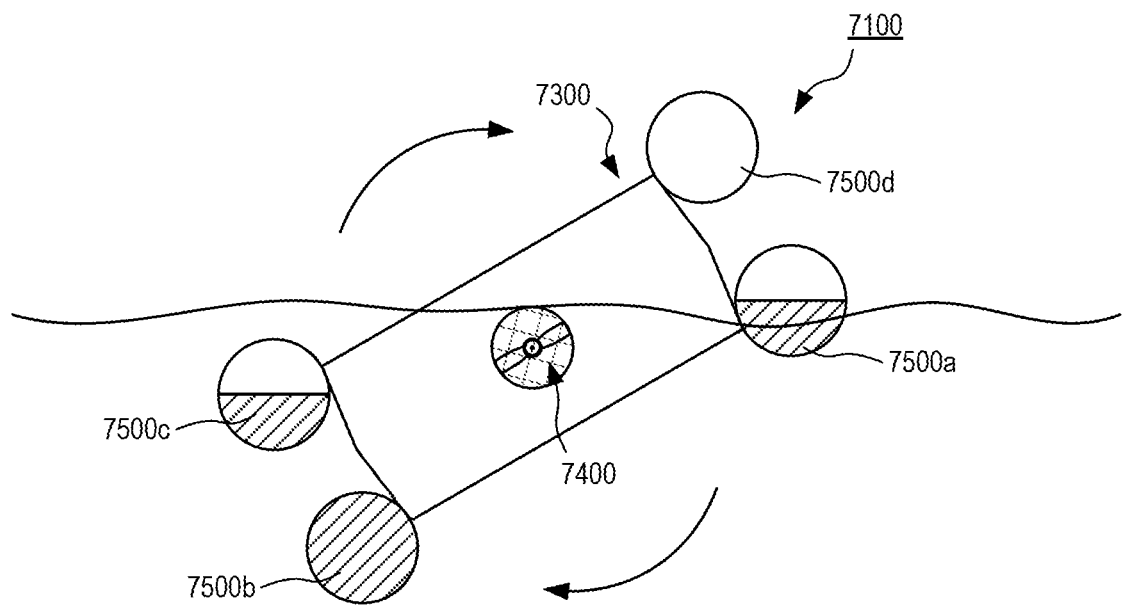
Figure 26G:
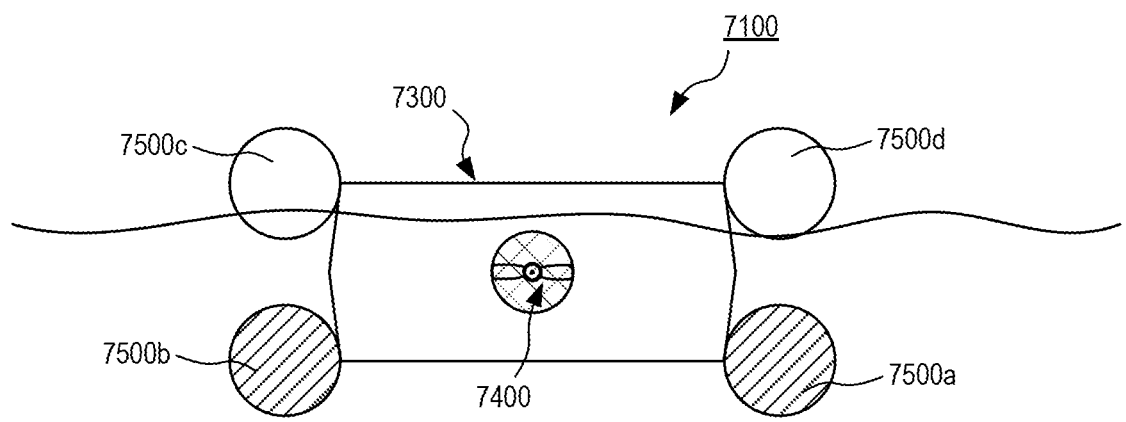

In some instances, the controller can adjust a volume and/or pressure of air or fluid in one or more of the buoyancy tanks 7500a-7500d to initiate a rotation of the water flow system 7100 from the normal, standard, and/or growing position (see FIG. 26C) to, for example, a flipped growing position (see FIG. 26G). In such instances, the controller can be configured to adjust a volume of air or fluid in the buoyancy tanks 7500a-7500d such that the first buoyancy tank 7500a is substantially filled, the second buoyancy tank 7500b is partially filled, the third buoyancy tank 7500c is substantially evacuated and/or not filled, and the fourth buoyancy tank 7500d is partially filled, as shown in FIG. 26D. As such, the buoyancy tanks 7500a-7500d provide an asymmetric amount of floatation that can be sufficient to initiate a rotation of the water flow system 7100 about the longitudinal axis. While each of the second buoyancy tank 7500b and the fourth buoyancy tank 7500d is described as being partially filled it should be understood that the buoyancy tanks 7500b and 7500d can include substantially the same volume of air or fluid or can include different volumes of air or fluid. Moreover, in some instances, the volume of air or fluid in at least the second buoyancy tank 7500b and the fourth buoyancy tank 7500d can be actively controlled and/or adjusted as the water flow system 7100 further rotates about the longitudinal axis. With the third buoyancy tank 7500c being substantially evacuated or not filled, the third buoyancy tank 7500c provides little to no amount of floatation.

As the water flow system 7100 rotates, the controller can continue to dynamically adjust a volume of air or fluid in the buoyancy tanks 7500a-7500d. For example, FIG. 26E illustrates the water flow system 7100 in a position in which the first buoyancy tank 7500a and the fourth buoyancy tank 7500d are substantially filled and the second buoyancy tank 7500b and the third buoyancy tank 7500c are substantially evacuated and/or not filled. With the first buoyancy tank 7500a and the fourth buoyancy tank 7500d substantially filled, the buoyancy tanks 7500a and 7500d can float near, at, or on the surface of the water, as shown in FIG. 26E. Each of the second buoyancy tank 7500b and the third buoyancy tank 7500c can be substantially evacuated or not filled, thereby providing little to no amount of floatation.

The controller can continue to dynamically adjust a volume of air or fluid in the buoyancy tanks 7500a-7500d to continue the rotation of the water flow system 7100 about the longitudinal axis. FIG. 26F, for example, illustrates the water flow system 7100 in a position in which the first buoyancy tank 7500a and the third buoyancy tank 7500d are partially filled, the second buoyancy tank 7500b is substantially evacuated and/or not filled, and the fourth buoyancy tank 7500d is substantially filled. As such, the buoyancy tanks 7500a-7500d provide an asymmetric amount of floatation that can be sufficient to continue the rotation of the water flow system 7100 about the longitudinal axis. While each of the first buoyancy tank 7500a and the third buoyancy tank 7500c is described as being partially filled, it should be understood that the buoyancy tanks 7500a and 7500c can include substantially the same volume of air or fluid or can include different volumes of air or fluid. Moreover, in some instances, the volume of air or fluid in at least the first buoyancy tank 7500a and the third buoyancy tank 7500c can be actively controlled and/or dynamically adjusted as the water flow system 7100 further rotates about the longitudinal axis. With the second buoyancy tank 7500b being substantially evacuated or not filled, the second buoyancy tank 7500d provides little to no amount of floatation.

FIG. 26G illustrates the water flow system 7100 in the flipped growing position. For example, the controller can continue to dynamically adjust a volume of air or fluid in the buoyancy tanks 7500a-7500d to place the water flow system 7100 in the flipped growing position in which each of the third buoyancy tank 7500c and the fourth buoyancy tank 7500d is substantially filled and each of the first buoyancy tank 7500a and the second buoyancy tank 7500b is substantially evacuated and/or not filled. In the flipped growing position, the pen assembly 7300 can be sufficiently submerged such that the pumping mechanism 7400 is below the surface of the water. With the third buoyancy tank 7500c and the fourth buoyancy tank 7500d substantially filled, the buoyancy tanks 7500c and 7500d can float near, at, or on the surface of the water, as shown in FIG. 26G. With each of the first buoyancy tank 7500a and the second buoyancy tank 7500b being substantially evacuated or not filled, the buoyancy tanks 7500a and 7500b providing little to no amount of floatation. In some instances, the flipped growing position can be desirable for the development and/or growth of the aquatic animals configured to be disposed within the pen assembly 7300 (as described in detail above). In this manner, the water flow system 7100 can be rotated, for example, 180° about the longitudinal axis from the normal, standard, and/or growing position (FIG. 26C) to the flipped growing position (FIG. 26G).

While the sequence is described above with reference to FIGS. 26C-26G as rotating the water flow system 7100 180° about the longitudinal axis, it should be understood that the controller can adjust the volume and/or pressure of air or fluid within the buoyancy tanks 7500a-7500d in any suitable sequence to rotate the water flow system 7100 any desired amount and/or in any desired direction. Moreover, in some instances, the controller can adjust the volume and/or pressure of air or fluid within the buoyancy tanks 7500a-7500d to rotate the water flow system 7100 in alternating directions. In some instances, rotating the water flow system 7100 in alternating directions can, for example, redistribute at least some of the aquatic animals disposed in the pens, as described in detail above with reference to at least the aquaculture system 5000.

In some embodiments, any of the aquaculture systems 1000, 2000, 3000, 4000, 5000, 6000, and/or 7000 can be constructed or substantially constructed on land and then transported to the initial use location by any suitable method, subcomponents thereof can be constructed or substantially constructed on land and then transported to the initial use location for further assembly, or can be assembled or substantially assembled at or nearby the initial use location. In some embodiments, the aquaculture systems 1000, 2000, 3000, 4000, 5000, 6000, and/or 7000 can be constructed or substantially constructed on land and then moved to the initial use location by way of the on-board propulsion device.

While various implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the implementations described herein. More generally, those skilled in the art will readily appreciate that all parameters and configurations described herein are provided by way of example only and that other equivalents to the specific implementations described herein may be realized. It is, therefore, to be understood that the foregoing implementations are presented by way of example only and that, within the scope of the appended claims and equivalents thereto, implementations may be practiced other than or in addition to those specifically described and claimed. Certain implementations of the present disclosure may be directed to each individual feature, system, article, and/or method described herein. In addition, any combination of two or more such features, systems, articles, and/or methods, if such features, systems, articles, and/or methods are not mutually inconsistent, is included within the scope of the present disclosure.

Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments described herein.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, an FPGA, an ASIC, and/or the like. Software modules (executed on hardware) can be expressed in a variety of software languages (e.g., computer code), including C, C++, Java™, Ruby, Visual Basic™, Python™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools, and/or combinations thereof (e.g., Python™). Additional examples of computer code include, but are not limited to, control signals, encrypted code, and compressed code. In some instances, software, hardware, or a combination thereof can be used in any suitable controller, control system, and/or the like implementing any suitable control scheme such as, for example, a proportional-integral-derivative (PID) controller, and/or the like.

What is claimed:

1. An aquaculture system, comprising:
a pen configured to be disposed in a body of water, the pen having a first compartment, a second compartment, and a channel disposed therebetween, the pen configured to at least temporarily store aquatic animals during development in the first compartment and the second compartment, the pen defining a longitudinal axis;
a control system configured to receive electric power from a power source;
a pumping mechanism coupled to the pen, the pumping mechanism configured to provide a flow of water through the pen in response to receiving electric power from the control system; and
a set of buoyancy tanks coupled to the pen and configured to place the pen in a desired position in the body of water, the set of buoyancy tanks including at least a first buoyancy tank coupled to a first side of the pen and at least a second buoyancy tank coupled to a second side of the pen, the second side opposite the first side,
a portion of the control system being in fluid communication with the set of buoyancy tanks and configured to adjust a volume of fluid in at least one buoyancy tank from the set of buoyancy tanks in response to a first input, the pen being moved from a first position in which the pen is partially submerged in the body of water to a second position in which the pen is fully submerged in the body of water in response to the control system adjusting the volume of fluid in the buoyancy tank, and
the control system configured to adjust the volume of fluid in at least one of the first buoyancy tank or the second buoyancy tank in response to a second input to rotate the pen 180 degrees about the longitudinal axis to move the pen between a first orientation and a second orientation.

2. The aquaculture system of claim 1, further comprising:
an anchoring system coupled to the pen, the anchoring system configured to restrict a movement of the pen in the body of water.

3. The aquaculture system of claim 1, wherein the aquatic animals are mollusks, the pen includes an exterior wall defining a portion of the first compartment and an interior wall defining a portion of the first compartment and a portion of the channel, the exterior wall defining a first plurality of perforations and the interior wall defining a second plurality of perforations, the first plurality of perforations and the second plurality of perforations configured to allow a flow of water into or out of the pen, a size of each perforation from the plurality of perforations being based at least in part on an average size of the mollusks configured to be at least temporarily stored in the first compartment.

4. The aquaculture system of claim 3, wherein the pumping mechanism is in fluid communication with the channel configured to transition between a first state in which the pumping mechanism provides the flow of water through the pen in a first flow direction from the body of water, through the first plurality of perforations and the first compartment, through the second plurality of perforations and the channel, and toward the pumping mechanism, and a second state in which the pumping mechanism provides the flow of water through the pen in a second flow direction opposite the first flow direction from the body of water, through the pumping mechanism and the channel, through the second plurality of perforations and the first compartment, and toward the first plurality of perforations when the pumping mechanism is in the second state.

5. The aquaculture system of claim 4, wherein the exterior wall is a first exterior wall and the interior wall is a first interior wall, the pen includes a second exterior wall defining a portion of the second compartment and a second interior wall defining a portion of the second compartment and a portion of the channel, the second exterior wall defining a third plurality of perforations and the second interior wall defining a fourth plurality of perforations, the third plurality of perforations and the fourth plurality of perforations configured to allow a flow of water into or out the pen, a size of each perforation from the third and fourth plurality of perforations being based at least in part on an average size of the mollusks configured to be at least temporarily stored in the second compartment.

6. The aquaculture system of claim 5, wherein the pumping mechanism in the first state provides a flow of water through the pen in the first flow direction from the body of water, through the third plurality of perforations and the second compartment, through the fourth plurality of perforations and the channel, and toward the pumping mechanism, and the pumping mechanism in the second state provides a flow of water through the pen in the second flow direction opposite the first flow direction from the body of water, through the pumping mechanism and the channel, through the fourth plurality of perforations and the second compartment, and toward the third plurality of perforations.

7. The aquaculture system of claim 1, wherein the pumping mechanism is at least partially submerged in the body of water when in the pen is in the first position.

8. The aquaculture system of claim 1, wherein the pen is fully submerged below a surface of the body of water at a depth between 1 meter and 10 meters when in the second position.

9. The aquaculture system of claim 1, wherein the input received by the control system includes data associated with a current weather condition received from a weather service, the control system being configured to adjust the volume of fluid in the at least one buoyancy tank from the set of buoyancy tanks in response to the data received from the weather service indicating that a location of the aquaculture system is within an area of severe local weather.

10. The aquaculture system of claim 1, wherein the volume of fluid in the at least one buoyancy tank from the set of buoyancy tanks when the pen is in the first position is greater than the volume of fluid in the at least one buoyancy tank from the set of buoyancy tanks when the pen is in the second position.

11. The aquaculture system of claim 1, wherein the control system is configured to adjust the volume of fluid in the at least one buoyancy tank from the set of buoyancy tanks to place the pen in a third position different from the first position and the second position, the pen being disposed above a surface of the body of water when in the third position.

12. An aquaculture system, comprising:

a pen having a first compartment, a second compartment, and a channel disposed therebetween, the pen configured to at least temporarily store aquatic animals during development in the first compartment and the second compartment, the pen configured to be disposed in a body of water such that water is allowed to flow therethrough, the pen defining a longitudinal axis;

a first buoyancy tank coupled to a first side of the pen, the first buoyancy tank configured to at least temporarily contain a volume of fluid;

a second buoyancy tank coupled to a second side of the pen opposite the first side, the second buoyancy tank configured to at least temporarily contain a volume of fluid; and a control system in fluid communication with the first buoyancy tank and the second buoyancy tank, the control system configured to adjust a volume of fluid in at least one of the first buoyancy tank or the second buoyancy tank to adjust at least one of an amount of the pen submerged below a surface of the body of water or an orientation of the pen relative to the longitudinal axis, the pen configured to rotate 180 degrees about the longitudinal axis between a first orientation and a second orientation when the control system adjusts the orientation of the pen.

13. The aquaculture system of claim 12, wherein the control system is configured to receive a flow of electric power from a power source, the system further comprising:

a pumping mechanism coupled to the pen and in fluid communication with the channel, the pumping mechanism configured to provide a flow of water through at least the channel in response to receiving a flow of electric power from the control system.

14. The aquaculture system of claim 13, wherein the pen includes an exterior wall and an interior wall that collectively define a portion of the first compartment, the exterior wall defining a first plurality of perforations, the interior wall being disposed between the first compartment and the channel and defining a second plurality of perforations, and the pumping mechanism is configured to transition between a first state in which the pumping mechanism provides the flow of water through the pen in a first flow direction from the body of water, through the first plurality of perforations and the first compartment, through the second plurality of perforations and the channel, and toward the pumping mechanism, to a second state in which the pumping mechanism provides the flow of water through the pen in a second flow direction opposite the first flow direction from the body of water, through the pumping mechanism and the channel, through the second plurality of perforations and the first compartment, and toward the first plurality of perforations.

15. The aquaculture system of claim 14, wherein the exterior wall is a first exterior wall and the interior wall is a first interior wall, the pen includes a second exterior wall and a second interior wall that collectively define a portion of the second compartment, the second exterior wall defining a third plurality of perforations, the second interior wall being disposed between the second compartment and the channel and defining a fourth plurality of perforations, and the pumping mechanism in the first state provides a flow of water through the pen in the first flow direction from the body of water, through the third plurality of perforations and the second compartment, through the fourth plurality of perforations and the channel, and toward the pumping mechanism, and the pumping mechanism in the second state provides a flow of water through the pen in the second flow direction opposite the first flow direction from the body of water, through the pumping mechanism and the channel, through the fourth plurality of perforations and the second compartment, and toward the third plurality of perforations.

16. The aquaculture system of claim 12, wherein the control system is configured to adjust the volume of fluid in the first buoyancy tank and the second buoyancy tank to move the pen between a first position and a second position relative to the surface of the body of water, the pen being partially submerged below the surface of the body of water when in the first position, the pen being fully submerged below the surface of the body of water when in the second position.

17. The aquaculture system of claim 16, wherein the volume of fluid in each of the first buoyancy tank and the second buoyancy tank when the pen is in the first position is greater than the volume of fluid in each of the first buoyancy tank and the second buoyancy tank when the pen is in the second position.

18. The aquaculture system of claim 17, wherein the control system is configured to adjust the volume of fluid in the first buoyancy tank and the second buoyancy tank to move the pen to a third position in which the pen is disposed above the surface of the body of water.

19. The aquaculture system of claim 12, further comprising:
   a third buoyancy tank coupled to the first side of the pen, the first buoyancy tank and the third buoyancy tank being in a stacked arrangement relative to the pen; and
   a fourth buoyancy tank coupled to the second side of the pen, the second buoyancy tank and the fourth buoyancy tank being in a stacked arrangement relative to the pen.

20. The aquaculture system of claim 19, wherein the control system is configured to adjust the volume of fluid in each of the first buoyancy tank, the second buoyancy tank, the third buoyancy tank, and the fourth buoyancy tank to move the pen between a first position, a second position, and a third position relative to the surface of the body of water, the pen being partially submerged below the surface of the body of water when in the first position, the pen being fully submerged below the surface of the body of water when in the second position, and the pen being disposed above the surface of the body of water when in the third position.

21. The aquaculture system of claim 19, wherein the control system is configured to adjust the volume of fluid in each of the first buoyancy tank, the second buoyancy tank, the third buoyancy tank, and the fourth buoyancy tank to adjust the orientation of the pen between the first orientation and the second orientation,
   the volume of fluid in each of the first buoyancy tank, the second buoyancy tank, the third buoyancy tank, and the fourth buoyancy tank being adjusted in a predetermined sequence to rotate the pen 180 degrees about the longitudinal axis to move the pen between the first orientation and the second orientation.

22. An aquaculture system, comprising:
   a pen having a first compartment, a second compartment, and a channel disposed therebetween, the pen configured to at least temporarily store aquatic animals during development in the first compartment and the second compartment, the pen configured to be disposed in a body of water such that water is allowed to flow therethrough, the pen defining a longitudinal axis;
   a first buoyancy tank configured to at least temporarily contain a volume of fluid and coupled to a first side of the pen;
   a second buoyancy tank configured to at least temporarily contain a volume of fluid and coupled to a second side of the pen opposite the first side;
   a third buoyancy tank configured to at least temporarily contain a volume of fluid and coupled to the first side of the pen in a stacked arrangement with the first buoyancy tank relative to the pen;
   a fourth buoyancy tank configured to at least temporarily contain a volume of fluid and coupled to the second side of the pen in a stacked arrangement with the second buoyancy tank relative to the pen; and
   a control system in fluid communication with each of the buoyancy tanks, the control system configured to:
      in response to a first input, adjust a volume of fluid in at least one of the buoyancy tanks to adjust an amount of the pen submerged below a surface of the body of water, and
      in response to a second input, adjust a volume of fluid in each of the first buoyancy tank, the second buoyancy tank, the third buoyancy tank, and the fourth buoyancy tank in a predetermined sequence to rotate the pen 180 degrees about the longitudinal axis between a first orientation and a second orientation.

* * * * *